(12) United States Patent
Dhamija et al.

(10) Patent No.: US 12,340,335 B2
(45) Date of Patent: Jun. 24, 2025

(54) AUTOMATED COLLABORATION SKILLS ASSESSMENT

(71) Applicant: SRI International, Menlo Park, CA (US)

(72) Inventors: Svati Dhamija, Sunnyvale, CA (US); Amir Tamrakar, Princeton, NJ (US); Nonye M. Alozie, Redwood City, CA (US); Elizabeth McBride, Oakland, CA (US); Ajay Divakaran, Monmouth Junction, NJ (US); Anirudh Som, Plainsboro, NJ (US); Sujeong Kim, Hyattsville, MD (US); Bladimir Lopez-Prado, Union City, CA (US)

(73) Assignee: SRI International, Menlo Park, CA (US)

( * ) Notice: Subject to any disclaimer, the term of this patent is extended or adjusted under 35 U.S.C. 154(b) by 241 days.

(21) Appl. No.: 17/348,588

(22) Filed: Jun. 15, 2021

(65) Prior Publication Data

US 2021/0390492 A1 Dec. 16, 2021

Related U.S. Application Data

(60) Provisional application No. 63/039,074, filed on Jun. 15, 2020.

(51) Int. Cl.
*G06Q 10/0639* (2023.01)
*G06N 3/045* (2023.01)
(Continued)

(52) U.S. Cl.
CPC ....... *G06Q 10/06398* (2013.01); *G06N 3/045* (2023.01); *G06N 3/049* (2013.01);
(Continued)

(58) Field of Classification Search
CPC .......... G06Q 10/06398; G06Q 10/103; G06N 20/00; G06N 3/045; G06N 3/049; G06V 20/41
(Continued)

(56) References Cited

U.S. PATENT DOCUMENTS

| 7,505,621 | B1 * | 3/2009 | Agrawal | G06V 40/172 382/226 |
| 2014/0003660 | A1 * | 1/2014 | Leng | G06V 40/107 382/103 |

(Continued)

OTHER PUBLICATIONS

Explaining First Impressions: Modeling, Recognizing, and Explaining Apparent Personality from Videos (Year: 2019).*

(Continued)

*Primary Examiner* — Charles Guiliano
*Assistant Examiner* — Po Han Lee
(74) *Attorney, Agent, or Firm* — Shumaker & Sieffert, P.A.

(57) ABSTRACT

In some examples, a computer-implemented collaboration assessment model identifies actions of each of two or more individuals depicted in video data, identify, based at least on the identified actions of each of the two or more individuals depicted in the video data, first behaviors at a first collaboration assessment level, identify, based at least on the identified actions of each of the two or more individuals depicted in the video data, second behaviors at a second collaboration assessment level different from the first collaboration assessment level, and generate and output, based at least on the first behaviors at the first collaboration assessment level and the second behaviors at the second collaboration assessment level, an indication of at least one of an assessment of a collaboration effort of the two or more individuals or respective assessments of individual contri- (Continued)

butions of the two or more individuals to the collaboration effort.

20 Claims, 35 Drawing Sheets

(51) Int. Cl.
    *G06N 3/049*      (2023.01)
    *G06N 20/00*      (2019.01)
    *G06Q 10/10*      (2023.01)
    *G06V 20/40*      (2022.01)

(52) U.S. Cl.
    CPC ........... *G06N 20/00* (2019.01); *G06Q 10/103* (2013.01); *G06V 20/41* (2022.01)

(58) Field of Classification Search
    USPC ....................................................... 705/7.42
    See application file for complete search history.

(56) References Cited

U.S. PATENT DOCUMENTS

| | | | | |
|---|---|---|---|---|
| 2014/0143183 | A1* | 5/2014 | Sigal | G06N 20/00 706/12 |
| 2018/0001206 | A1* | 1/2018 | Osman | A63F 13/798 |
| 2018/0005161 | A1* | 1/2018 | Cong | G06Q 10/06398 |
| 2018/0349704 | A1* | 12/2018 | Mehrseresht | G06F 18/295 |
| 2019/0251366 | A1* | 8/2019 | Zhong | G06V 20/41 |

OTHER PUBLICATIONS

Alexandron et al., "Towards a General Purpose Anomaly Detection Method to Identify Cheaters in Massive Open Online Courses", EdArXiv, Jun. 2, 2020, 4 pp.

Alozie et al., "Automated Collaboration Assessment Using Behavioral Analytics", International Society of Learning Sciences, Jan. 2020, 8 pp.

Alozie et al., "Collaboration Conceptual Model to Inform the Development of Machine Learning Models Using Behavioral Analytics", American Educational Research Association, Apr. 2020, 9 pages.

Anaya eta l., "Application of machine learning techniques to analyse student interactions and improve the collaboration process", Expert Systems with Applications, vol. 38, No. 2, Feb. 2011, pp. 1171-1181.

Beckham et al., "Unimodal Probability Distributions for Deep Ordinal Classification", Proceedings of the 34th International Conference on Machine Learning, Aug. 2017, pp. 411-419.

Bicker et al., "Effects of Cooperative Interactions on Verbal Communication", Paper submitted to ACM CHI 99, Nov. 1998, 8 pp.

Bousmalis et al., "Spotting Agreement and Disagreement: A Survey of Nonverbal Audiovisual Cues and Tools", IEEE, Sep. 10-12, 2009, 9 pp.

Chawla et al., "Smote: Synthetic Minority Over-sampling Technique", Journal of Artificial Intelligence Research, Jun. 2, 2002, pp. 321-357.

Chollet et al., "Keras", Retrieved from: https://keras.io/, Accessed on Jun. 8, 2022, 5 pp.

Daggett et al., "Common Core State Standards Initiative", International Center for Leadership in Education, Aug. 2010, 10 pp.

Davidson et al., "Boundary crossings: Cooperative learning, collaborative learning, and problem-based learning. Journal on excellence in college teaching", Journal on Excellence in College Teaching, Jul. 1, 2014, pp. 7-56.

Fawaz et al., "Deep learning for time series classification: a review", Data Mining and Knowledge Discovery, Mar. 2, 2019, 44 pp.

Genolini et al., "KmL: A package to cluster longitudinal data", Computer methods and programs in biomedicine, vol. 104, No. 3, Dec. 2011, pp. e112-e121.

Godwin et al., "Classroom activities and off-task behavior in elementary school children", in Proceedings of the Annual Meeting of the Cognitive Science Society, vol. 35, No. 35, Jul. 31-Aug. 3, 2013, 6 pp.

Guo et al., "Collaboration analysis using object detection", The 12th International Conference on Educational Data Mining, Jul. 2-5, 2019, pp. 695-698.

He et al., "Deep residual learning for image recognition", Proceedings of the IEEE Conference on Computer Vision and Pattern Recognition (CVPR), Jun. 27-30, 2016, pp. 770-778.

Hernandez-Blanco et al. "A Systematic Review of Deep Learning Approaches to Educational Data Mining", Complexity, May 12, 2019, pp. 1-22.

Hou et al., "Squared Earth Mover's Distance-based Loss for Training Deep Neural Networks", arXiv preprint arXiv:1611.05916, Apr. 3, 2017, 9 pp.

Huang et al., "Identifying Collaborative Learning States Using Unsupervised Machine Learning on Eye-Tracking, Physiological and Motion Sensor Data", Proceedings of The 12th International Conference on Educational Data Mining (EDM), Jul. 2-5, 2019, pp. 318-323.

Kang et al., "Collaborative Problem-Solving Process in a Science Serious Game: Exploring Group Action Similarity Trajectory", International Educational Data Mining Society, Jul. 2019, pp. 336-341.

Kingma et al., "ADAM: A Method for Stochastic Optimization", International Conference for Learning Representations, Dec. 2014, pp. 1-14.

Krajcik et al., "Project-based Learning", The Cambridge Handbook of the Learning Sciences, 2006, pp. 317-333. (Applicant points out, in accordance with MPEP 609.04(a), that the year of publication, 2006, is sufficiently earlier than the effective U.S. filing date, so that the particular month of publication is not in issue.).

Lai et al., "Skills for Today: What We Know about Teaching and Assessing . Collaboration", ERIC, Accessed on Jun. 7, 2022, 2 pp.

Levesque et al., "On acting together", Proceedings of the 8th National Conference on Artificial Intelligence (AAAI 90), vol. 1, Jul. 1990, pp. 94-99.

Loughry et al., "Development of a Theory-Based Assessment of Team Member Effectiveness", Educational and Psychological Measurement, vol. 67, No. 3, Jun. 1, 2007, pp. 1-36.

Lubold et al., "Acoustic-Prosodic Entrainment and Rapport in Collaborative Learning Dialogues", Proceedings of the 2014 ACM Workshop on Multimodal Learning Analytics and Grand Challenge, Nov. 2014, pp. 5-12.

Lundberg et al., "A Unified Approach to Interpreting Model Predictions", 31st Conference on Neural Information Processing Systems (NIPS 2017), Dec. 2017, pp. 1-10.

Reilly et al. "Predicting the Quality of Collaborative Problem Solving through Linguistic Analysis of Discourse", International Educational Data Mining Society, Paper presented at the International Conference on Educational Data Mining (EDM), Jul. 2-5, 2019, pp. 149-157.

Ribeiro et al., "'Why Should I Trust You?': Explaining the Predictions of Any Classifier", KDD '16: Proceedings of the 22nd ACM SIGKDD International Conference on Knowledge Discovery and Data Mining, Aug. 9, 2016, pp. 1135-1144.

Rotherham et al., "21st-century skills", American Educator, vol. 34, No. 1, 2010, pp. 17-20. (Applicant points out, in accordance with MPEP 609.04(a), that the year of publication, 2010, is sufficiently earlier than the effective U.S. filing date, so that the particular month of publication is not in issue.).

Selvaraju et al., "Grad-CAM: Visual Explanations From Deep Networks via Gradient-Based Localization", 2017 EEE International Conference on Computer Vision (ICCV), Oct. 22-29, 2017, pp. 618-626.

Smith-Jentsch et al., "Guided Team Self-Correction: Impacts on Team Mental Models, Processes, and Effectiveness", Small Group Research, vol. 39, No. 3, Jun. 1, 2008, pp. 303-327.

Soller et al., "A Machine Learning Approach to Assessing Knowledge Sharing During Collaborative Learning Activities", International Society of the Learning Sciences (ISLS), Jan. 2002, pp. 128-137.

(56) References Cited

OTHER PUBLICATIONS

Som et al., "A Machine Learning Approach to Assess Student Group Collaboration Using Individual Level Behavioral Cues", ECCV 2020 workshop on Imbalance Problems in Computer Vision, Sep. 2, 2020, 16 pp.

Som et al., "Towards Explainable Student Group Collaboration Assessment Models Using Temporal Representations of Individual Student Roles", 14th International Conference on Educational Data Mining, Jun. 17, 2021, 5 pp.

Spikol et al., "Using Multimodal Learning Analytics to Identify Aspects of Collaboration in Project-Based Learning", PA: International Society of the Learning Sciences, vol. 1, Jun. 2017, pp. 263-270.

Taggar et al., "Problem-Solving Team Behaviors: Development and Validation of BOS and a Hierarchical Factor Structure", Small Group Research, vol. 32, No. 6, Dec. 1, 2001, pp. 698-726.

Talavera et al., "Mining Student Data to Characterize Similar Behavior Groups In Unstructured Collaboration Spaces. In Workshop on artificial intelligence in CSCL", 16th European conference on artificial intelligence, Jan. 2004, pp. pp. 17-23.

Tamrakar et al., "Evaluation of low-level features and their combinations for complex event detection in open source videos", 2012 IEEE Conference on Computer Vision and Pattern Recognition, Jun. 16-21, 2012, pp. 3681-3688.

Thulasidasan et al. "On Mixup Training: Improved Calibration and Predictive Uncertainty for Deep Neural Networks", Presented at the ICML 2019 Workshop on Uncertainty and Robustness in Deep Learning, Jun. 14, 2019, 12 pp.

Vrzakova et al., "Focused or Stuck Together: Multimodal Patterns Reveal Triads' Performance in Collaborative Problem Solving", Proceedings of the Tenth International Conference on Learning Analytics & Knowledge, Mar. 2020, pp. 295-304.

Wang et al., "Time Series Classification from Scratch with Deep Neural Networks: A Strong Baseline", 2017 International joint conference on neural networks (IJCNN), May 14-19, 2017, pp. 1578-1585.

Zhang et al., "mixup: Beyond Empirical Risk Minimization", ICLR 2018, Apr. 30-May 3, 2018, pp. 13 pp.

\* cited by examiner

DISTRIBUTION OF LEVEL A CODES

[E] EFFECTIVE
[S] SATISFACTORY
[P] PROGRESSIVE
[NI] NEEDS IMPROVEMENT
[WI] WORKING INDEPENDENTLY

FIG. 10

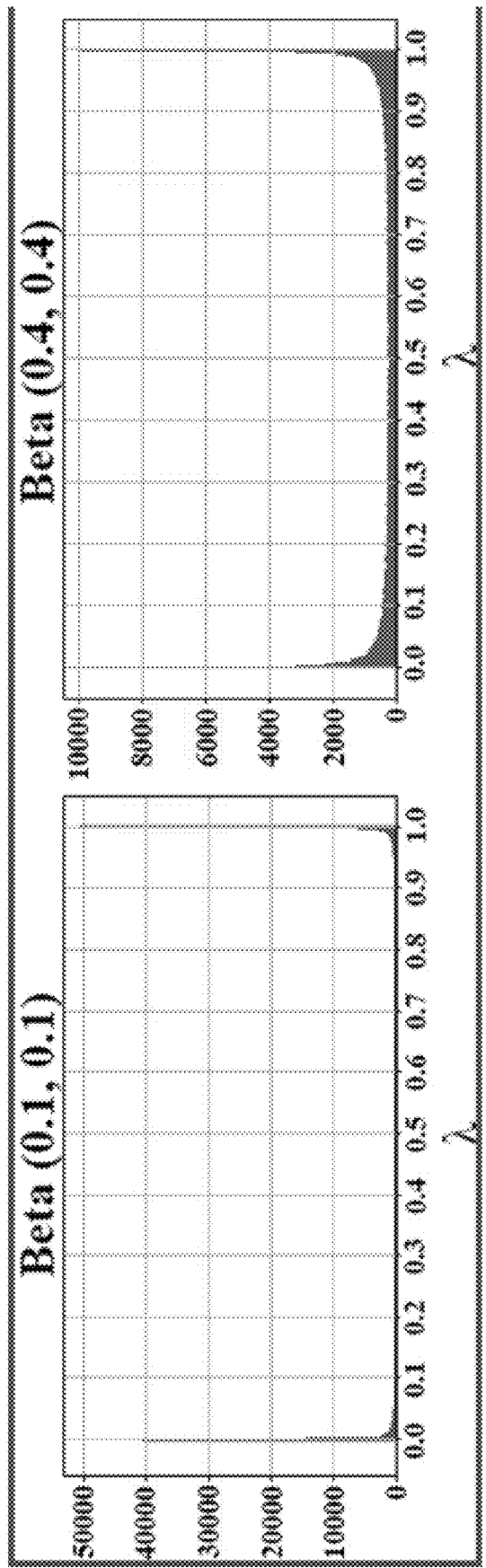
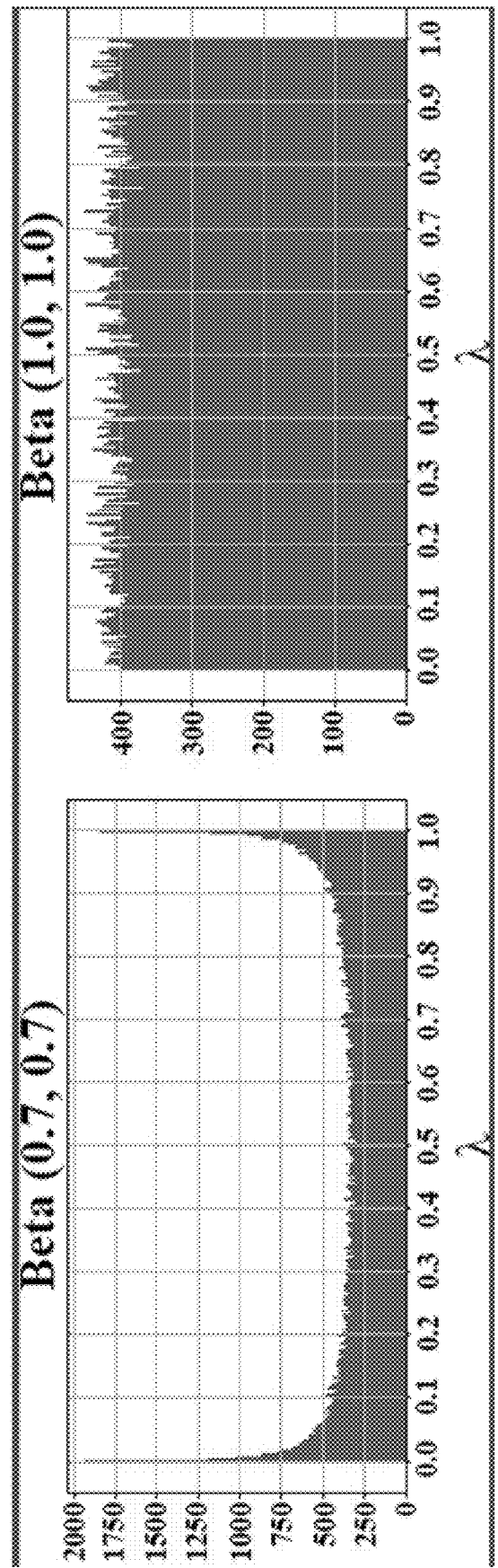
FIG. 11A
FIG. 11B
FIG. 11C
FIG. 11D

Filter width = 2, Total filters (n) = 1

Filter width = 4, Total filters (n) = 1

AUTOMATED COLLABORATION SKILLS ASSESSMENT

This application claims the benefit of U.S. Provisional Patent Application No. 63/039,074, filed on Jun. 15, 2020, and entitled "AUTOMATED COLLABORATION SKILLS ASSESSMENT," which is incorporated herein by reference in its entirety.

TECHNICAL FIELD

This disclosure relates to computing systems, and in particular, to machine learning systems.

BACKGROUND

Collaboration is identified as a required and necessary skill for students to be successful in the fields of Science, Technology, Engineering and Mathematics (STEM). However, it is difficult for teachers to provide constructive feedback and instill collaborative skills using instructional methods. This can be attributed to the growing student population and limited teaching staff in K-12 classrooms.

SUMMARY

Systems and techniques are disclosed for a collaboration assessment system that applies machine learning to automatically and objectively evaluate a collaboration effort of two or more individuals. The evaluation of the collaboration effort may include an evaluation of the effort as a whole as well as an evaluation of the individual contributions of the two or more individuals to the collaboration effort. As detailed below, a computing system executes a machine learning system having a hierarchical collaboration assessment model having a plurality of machine learning models. In some examples, the hierarchical collaboration assessment model is trained to receive, as input, video data depicting the collaboration effort and evaluate the effort according to ordered sets of classification codes from a standardized rubric. In contrast to other machine learning models, the hierarchical collaboration assessment model described herein is architected to expose outputs computed by each of the levels and thus to provide explainable insights between the levels, such that justifications for decisions made by the machine learning models are more readily ascertainable.

The techniques described herein further include improved methods of training the machine learning models. As one example, the systems of this disclosure are configured to augment a set of training data for the machine learning models by intelligently generating additional "pseudo-data" for under-represented categories or classification codes of the training data.

As another example, the techniques of this disclosure include using functions or algorithms to train the machine learning models based not only on whether the classification codes selected by the models were "correct" or "incorrect," but also on the relative degree of "correctness," or in other words, the number of classification codes between the "correct" (e.g., ground truth) code and the incorrect code selected by the model.

In some examples, a collaboration assessment system is configured to evaluate a collaboration effort of two or more individuals, the collaboration assessment system comprising: an image capture device configured to obtain video data; a computation engine comprising processing circuitry configured to execute a machine learning system comprising a hierarchical collaboration assessment model having a plurality of machine learning models, wherein the machine learning system is configured to process the video data to identify actions of each of the two or more individuals depicted in the video data, wherein the machine learning system is configured to apply a first model of the hierarchical collaboration assessment model to identify, based at least on the actions of each of the two or more individuals depicted in the video data, first behaviors at a first collaboration assessment level, and wherein the machine learning system is configured to apply a second model of the hierarchical collaboration assessment model to identify, based at least on the actions of each of the two or more individuals depicted in the video data, second behaviors at a second collaboration assessment level different from the first collaboration assessment level, and wherein the machine learning system is configured to generate and output, based at least on the first behaviors at the first collaboration assessment level and the second behaviors at the second collaboration assessment level, an indication of at least one of an assessment of a collaboration effort of the two or more individuals or respective assessments of individual contributions of the two or more individuals to the collaboration effort.

In some examples, a method includes identifying, by processing circuitry of a computation engine, actions of each of two or more individuals depicted in video data, identifying, by a first machine-learning model of the computation engine and based at least on the identified actions of each of the two or more individuals depicted in the video data, first behaviors at a first collaboration assessment level, identifying, by a second machine-learning model of the computation engine and based at least on the identified actions of each of the two or more individuals depicted in the video data, second behaviors at a second collaboration assessment level different from the first collaboration assessment level, and generating and outputting, by the computation engine based at least on the first behaviors at the first collaboration assessment level and the second behaviors at the second collaboration assessment level, an indication of at least one of an assessment of a collaboration effort of the two or more individuals or respective assessments of individual contributions of the two or more individuals to the collaboration effort.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 10 depicts two confusion matrices illustrating potential classification bias in the outputs of training data for the collaboration assessment system of FIG. 1A.

FIGS. 11A-11D are graphs of example Beta probability distributions, for four different values of the a variable, of the $\lambda$ parameter of mixup-augmentation equations to address potential classification bias by a collaboration assessment system.

Like reference characters refer to like elements throughout the figures and description.

DETAILED DESCRIPTION

Collaboration is identified as a required and necessary skill for students to be successful in all manners of education and especially important in the fields of science, technology, engineering and mathematics (STEM). However, it is difficult for teachers to provide constructive feedback and instill collaborative skills using instructional methods. This can be attributed to the growing student population and limited teaching staff in K-12 classrooms. As described herein, systems and techniques that include highly transparent (e.g., "explainable") machine learning-based models can help address this problem. For instance, the systems of this disclosure include one or more relatively low-complexity, temporal-convolutional-neural-network (CNN), deep-learning (DL) models configured to receive, as input, temporal representations (e.g., video and/or audio-video data) depicting two or more individuals engaged in a collaboration effort and output an evaluation or assessment of the effort, as well as of the individuals engaged in the effort. For instance, the models may be trained to select, based on the input data, from among an ordered or ranked set of categories or classification codes descriptive of the collaboration effort and the individual roles. The models herein may be highly "transparent," in that the outputs of a plurality of sub-modules, executing different models of a hierarchical collaboration assessment model, may be readily available to a user to provide valuable insight into the models' decision-making process.

In some examples, the models herein may be trained with a set of training data that includes video or audio-video data depicting a collaborative effort between two or more individuals, wherein the training data has been manually annotated to indicate relevant actions, behaviors, and roles of the two or more individuals engaged in the collaboration. Such annotations may help inform the applicability of dynamically changing feature representations for the collaboration assessment and how they affect the overall performance.

The techniques of this disclosure further include the use of graphical visualization models to help understand and interpret relevant temporal-based indices that contribute to the deep-learning models' decision-making. Additionally, in some examples, the training data and/or input data for the models may include audio-video data, video-only data, or a particular combination thereof, providing for a number of benefits and practical applications, detailed further below. For instance, in some examples, a set of feature representations collected in a video-only setting may be mapped to a set of collaboration-quality labels (e.g., classification codes) obtained in an audio-video setting to enhance the overall performance of the system.

Figure 1A:
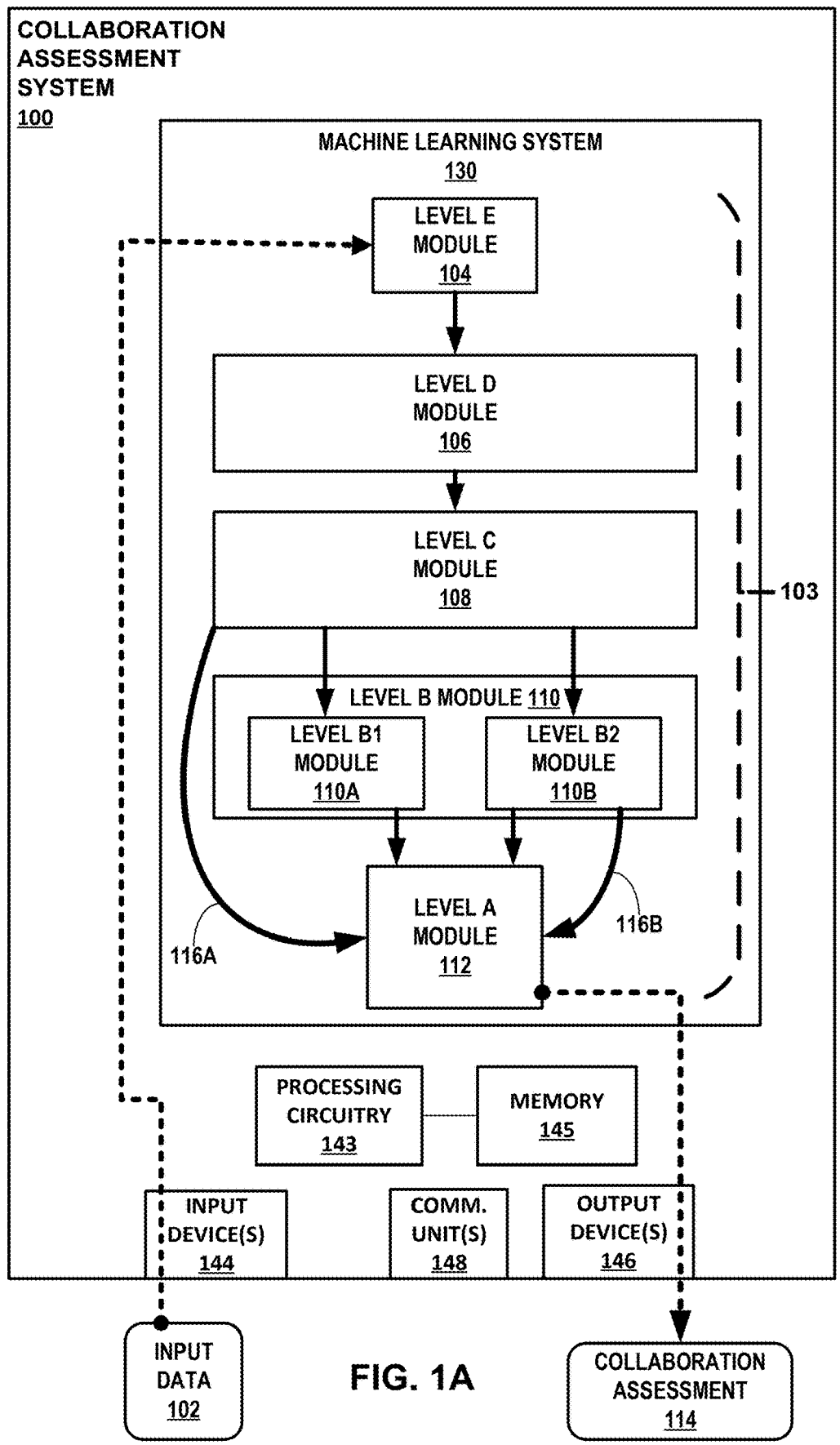
FIG. 1A is a conceptual block diagram illustrating a system for assessing a collaboration effort between two or more individuals.

FIG. 1A is a conceptual block diagram illustrating a computer-implemented collaboration assessment system 100 for evaluating a collaboration effort of two or more individuals engaged in a collaborative effort or task. System 100 is configured to receive image-based input data 102, e.g., in the form of video data (e.g., "video only" data), audio-video data, or a particular combination thereof. Input data 102 depicts two or more individuals performing a collaborative task, as depicted in the illustrative examples shown in FIGS. 1B and 1C. Based on the received image-based input data 102, system 100 determines and outputs a collaboration assessment 114 that objectively evaluates the collaboration effort of the two or more individuals. For instance, the assessment 114 may include a graded rubric or other indication that ranks the collaboration effort as a whole and/or the individual contributions of the two or more individuals. In some examples, system 100 is configured to "classify" the collaborative effort by determining or selecting the rankings from a predetermined set of categories, or "classification codes."

Collaboration assessment system 100 may be implemented via any suitable computing system, such as one or more server computers, workstations, mainframes, appliances, cloud computing systems, and/or other computing systems that may be capable of performing operations and/or functions described in accordance with one or more aspects of the present disclosure. In some examples, collaboration assessment system 100 may include a cloud computing system, server farm, and/or server cluster (or portion thereof) that provides services to client devices and other devices or systems. In other examples, collaboration assessment system 100 may represent or be implemented through one or more virtualized compute instances (e.g., virtual machines, containers) of a data center, cloud computing system, server farm, and/or server cluster.

Memory 145 may store information for processing during operation of collaboration assessment system 100. In some examples, memory 145 may include temporary memories, meaning that a primary purpose of the one or more storage devices is not long-term storage. Memory 145 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Memory 145, in some examples, also include one or more computer-readable storage media. Memory 145 may be configured to store larger amounts of information than volatile memory. Memory 145 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 145 may store program instructions and/or data associated with machine learning system 130 described in accordance with one or more aspects of this disclosure.

Processing circuitry 143 and memory 145 may provide an operating environment or platform for collaboration assessment system 100. Processing circuitry 143 may execute instructions and memory 145 may store instructions and/or data of machine learning system 130. The combination of processing circuitry 143 and memory 145 may retrieve, store, and/or execute the instructions and/or data of one or more applications, modules, or software. Processing circuitry 143 and memory 145 may also be operably coupled to one or more other software and/or hardware components, including, but not limited to, one or more of the components illustrated in FIG. 1A.

Collaboration assessment system 100 may perform the described operations using software, hardware, firmware, or a mixture of hardware, software, and firmware residing in and/or executing at collaboration assessment system 100. Collaboration assessment system 100 may execute machine learning system 130 with multiple processors or multiple devices. Collaboration assessment system 100 may execute machine learning system 130 as one or more virtual machines and/or container executing on underlying hardware. Machine learning system 130 may execute as one or more services of an operating system or computing platform. Machine learning system 130 may execute as one or more executable programs at an application layer of a computing platform.

One or more input devices 144 of collaboration assessment system 100 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 146 of collaboration assessment system 100 may generate, transmit, or process output. Examples of output are tactile, audio, visual, and/or video output. Output devices 146 may include a display, sound card, video graphics adapter card, speaker, presence-sensitive screen, one or more USB interfaces, video and/or audio output interfaces, or any other type of device capable of generating tactile, audio, video, or other output. Output devices 146 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, collaboration assessment system 100 may include a presence-sensitive display that may serve as a user interface device that operates both as one or more input devices 144 and one or more output devices 146.

One or more communication units 148 of collaboration assessment system 100 may communicate with devices external to collaboration assessment system 100 (or among separate computing devices of collaboration assessment system 100) by transmitting and/or receiving data, and may operate, in some respects, as both an input device and an output device. In some examples, communication units 148 may communicate with other devices over a network. In other examples, communication units 148 may send and/or receive radio signals on a radio network such as a cellular radio network. Examples of communication units 148 include a network interface card (e.g., an Ethernet card), an optical transceiver, a radio frequency transceiver, a GPS receiver, or any other type of device that can send and/or receive information. Other examples of communication units 148 may include Bluetooth®, GPS, 3G, 4G, and Wi-Fi® radios found in mobile devices as well as Universal Serial Bus (USB) controllers and the like.

In some examples in accordance with this disclosure, system 100 includes an ordered plurality of data-processing modules 104-112, with each subsequent module configured to receive, as input, the output of the previous module to perform higher-level data-processing than the previous module. In some examples, but not all examples, any or all of modules 104-112 may include one or more deep-learning (DL), artificial-intelligence (AI), or machine learning (ML) based models or algorithms. In such "hierarchical" or "nested" types of module configurations, the output(s) of each module may be made available to a user (e.g., via a graphical representation or other indication output via output device(s) 146), advantageously providing for substantial transparency (e.g., explainability) of system 100. For instance, as detailed further below, the outputs of one or more of modules 104-112 may be subsequently analyzed to provide a basis, justification, or insight into classification code(s) selected by system 100 while generating assessment 114.

Figure 1B:
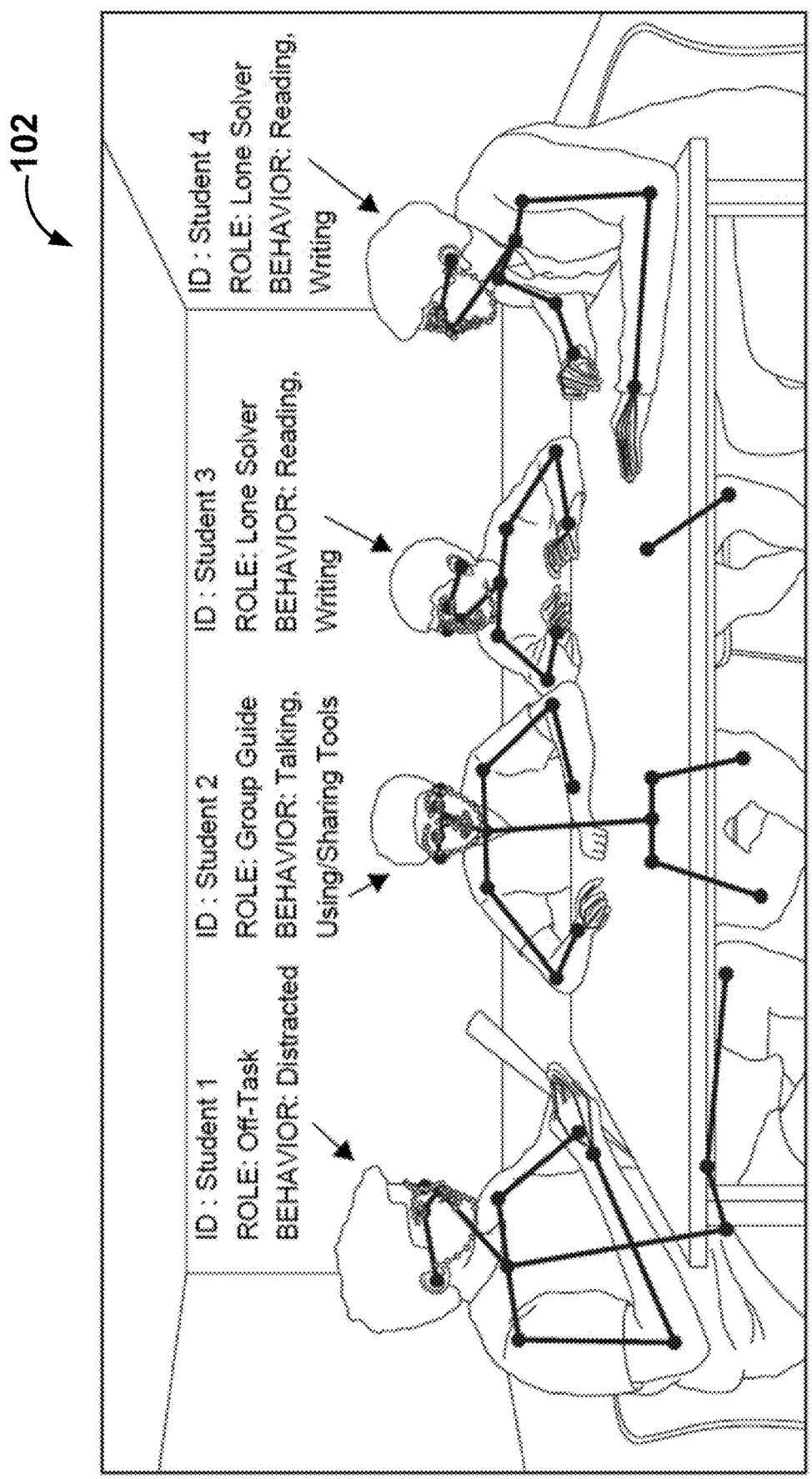
FIGS. 1B and 1C are illustrations depicting examples of input video data that may be analyzed by the collaboration assessment system of FIG. 1A.
Figure 1C:
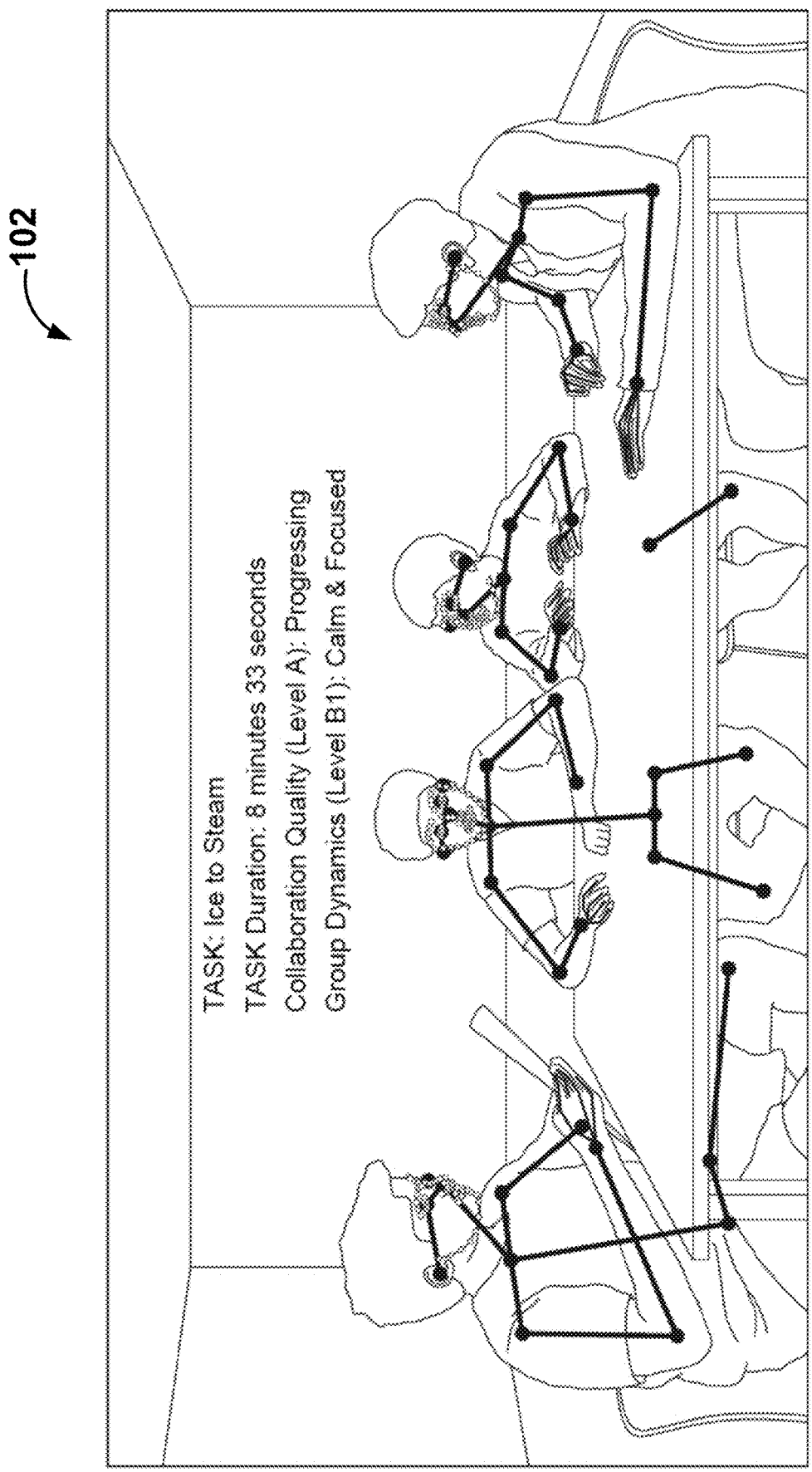

In the example configuration depicted in FIG. 1A, system 100 includes five nested levels of modules 104-112, however, in other examples, system 100 may include more, fewer, or different modules than those illustrated. For instance, a first "Level E" module 104 is configured to receive input data 102 and perform low-level analytics or "tracking" on the video and/or audio-video data. For instance, Level E module 104 may be configured to identify low-level features like facial features and body poses of the two or more individuals depicted in the video data 102. Examples of this low-level body-pose and facial-feature tracking performed by Level E module 104 is illustrated in FIGS. 1B and 1C.

As shown in FIG. 1A, a second "Level D" module 106 is configured to receive indications of the low-level body-pose and facial-feature tracking, as output from Level E module 104, and determine or identify one or more bodily movements and/or facial expressions performed by the two or more individuals. Some non-limiting examples of bodily movements and facial expressions identifiable by Level E module 104 include mouth movements (e.g., talking, reading out loud); reading silently; writing; using tape, a pencil, or scissors; nodding; pointing; moving materials; flipping pages; standing up; moving a chair or table; looking toward a speaking individual; mimicking a body position or movement of another individual; moving a hand; smiling; frowning; and the like. In some examples, module 106 includes a first machine learning model trained to identify the bodily movements and facial features by selecting and assigning "annotations" or "codes" from a first predetermined set of classification codes (or "Level D codes"). For instance, the previous list of examples of bodily movements and facial expressions may represent categories of Level D codes that Level D module 106 is configured to identify and annotate. In some examples, information like joint attention and engagement is encoded at Level D.

In some examples, based on the assigned annotations, Level D module 106 may be configured to generate Level D output data. Level D output data may include a plurality of datasets, each of which may include (1) an indication of an assigned annotation; (2) a relative magnitude or confidence value for the annotation; (3) a corresponding timestamp for the annotation; and/or (4) an "identifier" indicating the individual person to whom the annotation is assigned. As detailed further below, system 130 may be configured to aggregate these types of individual datasets (e.g., across the duration of input data 102) into any of three different types of data formats: (1) a temporal data representation (e.g., FIGS. 3A and 4A); (2) a histogram data representation (e.g., FIGS. 3B and 4B); or (3) a spatio-temporal data representation (e.g., FIGS. 15A-15D). Accordingly, although each is described below as a singular "module," it is to be understood that any of the subsequent data-processing modules 108-112 of machine learning system 130 may inherently include up to three distinct types of sub-modules, wherein each sub-module is configured to receive and process a different one of these three types of data formats.

A third "Level C" module 108 is configured to receive the Level D output data from Level D module 106 (e.g., representations of annotated bodily movements and facial expressions) and identify, based on the Level D output data, individual "behaviors" of the two or more individuals and/or interactions between the two or more individuals. Non-limiting examples of behaviors and interactions identifiable by Level C module 108 include talking, reading, writing, using or working with materials, setting up a space for the collaboration effort, listening or paying attention, explaining or sharing ideas with the group, problem-solving or negotiation, recognizing or inviting other contributions, assigning group roles and responsibilities, comforting or encouraging another individual, doing nothing or withdrawing from the group, agreeing with another individual, joking or laughing, being off-task or distracted, disagreeing with another individual, arguing with another individual, boasting or seeking attention, engaging with environmental factors not associated with the collaboration effort, and waiting.

Figure 4A:
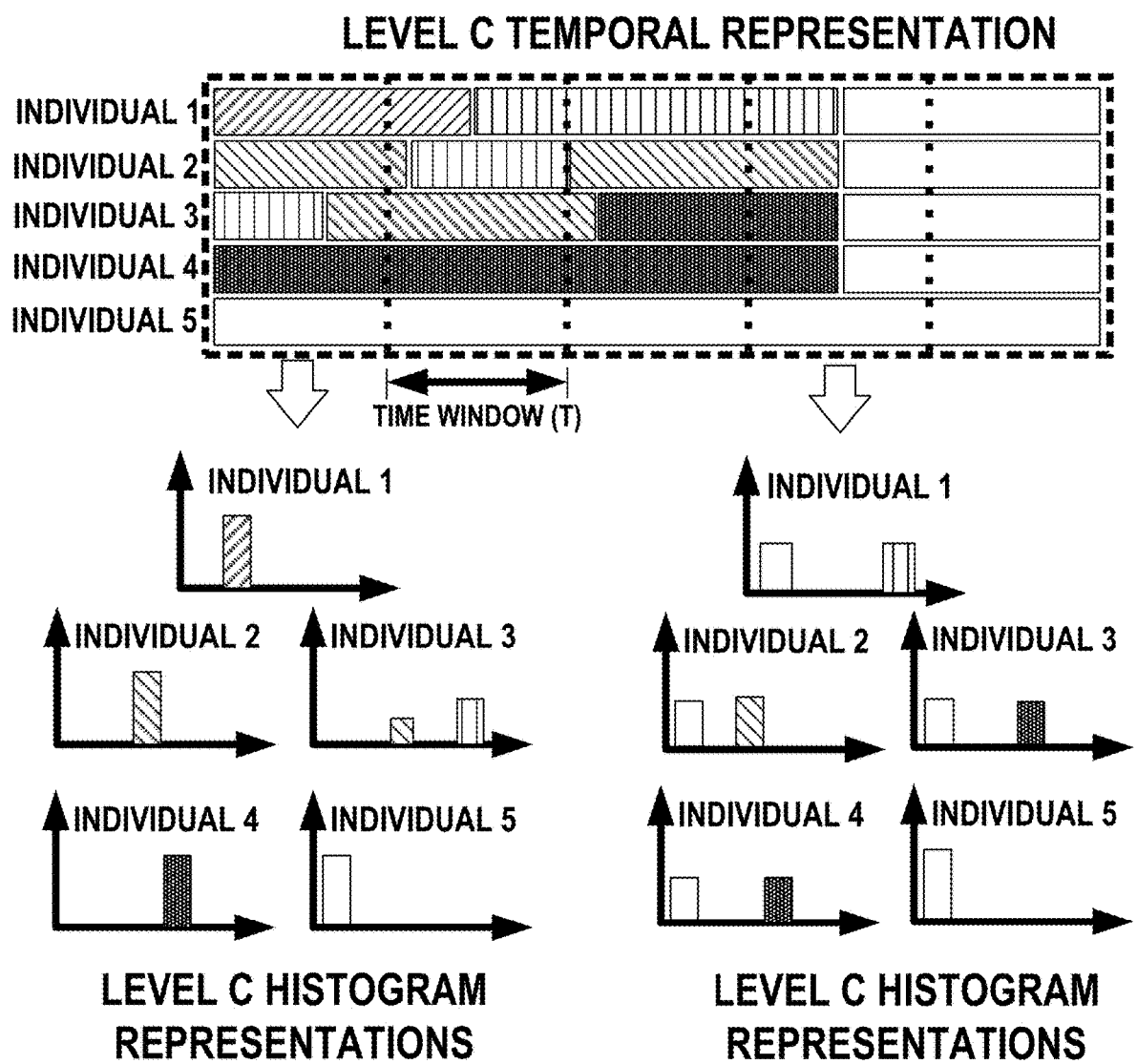
FIG. 4A is a conceptual diagram, including a chart and bar graphs, illustrating an example "Level C" temporal representation for a group of four individuals involved in a collaborative effort.
Figure 4B:
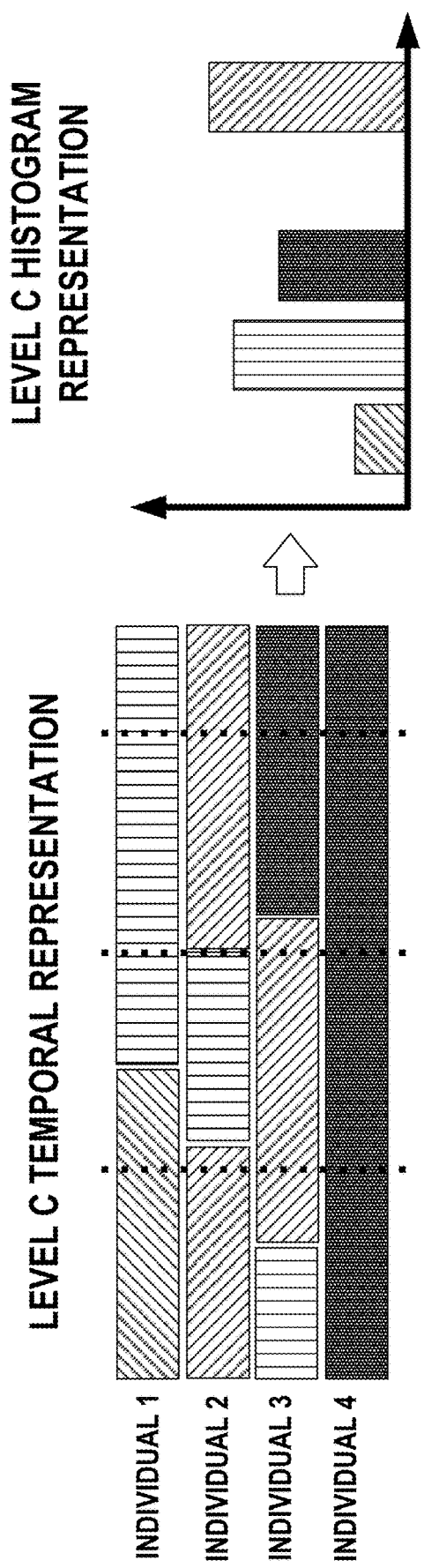
FIG. 4B depicts an example combined histogram feature generation for the temporal-based Level C codes shown in FIG. 4A.

In some examples, Level C module 108 includes a second machine learning model trained to identify the behaviors and interactions by selecting and assigning annotations from a second predetermined set of classification codes (or "Level C codes"). As used herein, Level C codes are used to identify Level C "features" (e.g., the individual behaviors or interactions). Similar to Level D module 106, Level C module 108 may aggregate the identified features, e.g., across the extent or duration of the received data, into a Level C temporal representation (FIG. 4A), a Level C spatio-temporal representation, and/or a Level C histogram representation (FIG. 4B).

A fourth "Level B" module 110 includes two sub-modules 110A, 110B, each configured to receive the Level C output of Level C module 108. "Level B1" sub-module 110A is configured to determine (e.g., categorize or label) a "group dynamic" among the two or more individuals, whereas "Level B2" sub-module 110B is configured to determine (e.g., categorize or label) individual "roles" of the two or more individuals.

For instance, sub-module 110A may include a third machine learning model trained to identify features (or "Level B1 codes") indicating an overall dynamic among the two or more individuals throughout the collaboration effort. In some examples, the Level B1 codes may be based on, or structured according to, a taxonomic hierarchy of categories. As one example, a first category of Level B1 codes may indicate a degree of interdependence of the two or more individuals. This first category may include Level B1 codes such as "high interdependence" (e.g., equal distribution of labor and participation), "medium interdependence" (e.g., varied distribution of labor and participation), and "low interdependence" (e.g., skewed distribution of labor and participation). A second category of Level B1 codes may indicate a "demeanor" of the group. The "demeanor" category may include two sub-categories: (1) Level B1 codes indicating how goal-oriented the group is, such as "social (task-oriented or completion-oriented)," "in a hurry (or rushed)," and "one person dominating;" and (2) Level B1 codes indicating a "mood" of the group, such as "calm/focused/relaxed," "argumentative/contentious," "hyperactive/unfocused," or "disinterested."

"Level B2" sub-module 110B is configured to determine (e.g., categorize or label) an assumed "role" of each of the two or more individuals involved in the collaboration effort. For instance, sub-module 110B may include a fourth machine learning model trained to select a label (or "Level B2 code") describing each individual's participation in the collaboration effort. Similar to the Level B1 codes, the Level B2 codes may be based on, or structured according to, a taxonomic hierarchy of categories. A first category of Level B2 codes indicates an individual's ability to build content and knowledge, including roles such as "contributor," "follower," and "lone solver." A second category of Level B2 codes indicates an individual's ability to manage another individual in the group, including roles such as "contributor," "group guide," "conflict resolver," and "conflict instigator." A third category of Level B2 codes indicates the "null" role of an individual who is not contributing, such as "working off-task" or "distracted."

A fifth "Level A" module 112 is configured to receive, as input, at least the group-dynamic output of Level B1 module 110A and the individual-role outputs of Level B2 module 110B. Based on these received inputs, Level A module 112 is configured to determine (e.g., select) a "Level A classification code" for indicating the overall ability of the two or more individuals to work together during the collaboration effort. As detailed further below, the available categories of Level A classification codes may form an ordinal (e.g., ordered or ranked) scale, ranging from an indication of a "good" collaboration effort at one end of the scale, to an indication of a "bad" collaboration effort at the opposite end of the scale. One example of an ordered set of Level A codes includes "Effective," "Satisfactory," "Progressing," "Needs Improvement," and "Working Independently."

Additionally or alternatively to assigning a Level A classification code for the collaborative effort as a whole, in a similar way, Level A module 112 may be configured to determine, based on the received inputs, a Level A classification code for each individual involved in the collaborative effort, e.g., an objective assessment of the individual contributions of each individual.

In some examples, system 100 includes a deep-learning model configured to map temporal representations of the individual-behavior outputs of Level C module 108 to Level A module 112, as indicated by curved arrow 116A in FIG. 1A. Similarly, in some examples, but not all examples, system 100 includes a deep-learning model configured to map temporal representations of the individual-role outputs of Level B2 module 110B to Level A module 112, as indicated by curved arrow 116B. For instance, as shown and described below with respect to FIG. 10, system 100 may include one or more Multi-Layer Perceptron (MLP) deep-learning models trained to evaluate or predict a collaboration "quality" (e.g., ranking of effort) based on individual roles (Level B2 110B) and on individual behaviors (Level C 108), as indicated by curved arrows 116 in FIG. 1A.

As described above, in some examples, these MLP models are configured to receive simple histogram representations as the input data format (e.g., as compared to the temporal and spatio-temporal data formats). When taken alone, these simple histogram representations and MLP models may provide sufficient collaboration-classification performance, however, they lack the additional transparency, explainability, or interpretability provided by the additional nested modules 104-112 of system 100. For instance, as detailed further below, system 100 is configured to not only generate a collaboration assessment 114, but also to enable associated (visual) representations and models to help capture and understand which roles and behaviors exhibited by the individual students contributed the most toward the categorization decisions of system 100.

In some examples, input data 102 may include video (e.g., video-only) data, audio-video data, and/or a combination thereof. The use of different types and combinations of input data 102 may produce significant differences in classification performance by system 100. For instance, in some examples, a set of feature-label pairs collected in the video-only input data 102 may result in a significantly lower collaboration-classification performance by system 100 (e.g., by Level A module 112), as compared to the use of audio-video input data 102. This may be attributable, for example, to relatively poorer-quality annotations that may be created based on video-only training data used to train the models of system 100. As detailed further below, however, a third type of "cross-modal" input data 102 may be created and used to bridge the performance differences between the video-only input data 102 and audio-video input data 102. In one example of cross-modal input data 102, Level-B2 and Level-C "features" from the video-only setting may be directly mapped to Level-A "labels" collected in the audio-video setting.

As described above, any or all of modules 104-112 of system 100 may include one or more machine learning models trained to perform the applicable analytics, labeling, and/or classification for that level. Any of these machine learning models may be initially (and/or iteratively) trained with a set of training data. In some examples in accordance with this disclosure, system 100 is configured to "augment" either the training data, the model-training process, or both, in order to improve the precision of the training and accordingly, the resulting classification-performance of system 100.

For instance, in some cases, a set of training data may be "imbalanced," in that, when the training data submitted as input into machine learning system 130, the resulting output 114 of Level A classification codes from Level A module 112 includes one particular category (or a limited subset of categories) of Level A classification codes that are overwhelmingly over-represented (or in other examples, a category or label is over-represented in the outputs from any of the lower-level modules 104-110). As one illustrative example, the training input data may be inherently biased such that the Level A classification code of "Progressing," is overwhelmingly represented, at the dearth of the other available Level A categories (e.g., "Effective," "Satisfactory," etc.).

In some such examples, system 100 may be configured to perform a "mixup augmentation" technique, which is an "over-sampling" approach in which system 100 generates semi-random "pseudo-data" (or "mixup data") to provide additional training data that is "intended" to result in the under-represented categories of classification codes. As one illustrative example, if the Level A classification code of "Effective" is substantially under-represented among the outputs of the training data, system 100 is configured to identify the limited amount of training data that actually did result in an "Effective" classification code, and then make "randomized" or "mixup" copies of that subset of the training data.

In some examples, such as when the available training data associated with the under-represented output category is substantially limited, system 100 may "mixup" the training data from the underrepresented category with additional training data "sourced" from other output categories, but only from categories that are either directly adjacent to the desired underrepresented category, or within two categories of the under-represented category. The models of system 100 may then be re-trained with the "augmented" mixup training data (or "pseudo-data").

As an illustrative example, let the numbers [1] through [5] represent the Level A classification codes of "Working Independently" through "Effective," respectively. For the edge cases [1] and [5], system 100 may be configured to "source" mixup data from up to two categories away. For instance, if [1] is the underrepresented category, system 100 may source training data from categories [2] and [3], but not [4] or [5]. Conversely, if [5] is the underrepresented category, system 100 may source additional training data from categories [3] and [4], but not [1] or [2].

For non-edge cases (e.g., categories [2] through [4]), system 100 may source training data from adjacent categories on either side of the underrepresented category. For instance, if [4] is the underrepresented category, system 100 may source training data from categories [3] and [5], but not [1] or [2].

Although any suitable mixup-augmentation technique may be used to generate the mixup data for the underrepresented category, one non-limiting example of such a technique includes the Synthetic Minority Oversampling Technique ("SMOTE"). For example, a mixup-augmentation technique may include extending a training distribution by incorporating the prior knowledge that linear interpolations of input variables x should lead to linear interpolations of the corresponding target labels y. For example, given a random pair of training samples $(x_1, y_1)$, $(x_2, y_2)$, additional samples $(\tilde{x}, \tilde{y})$ can be obtained by linearly combining the input covariate information and the corresponding class labels, as illustrated in equations (1) and (2):

$$\tilde{x} = \lambda x_1 + (1-\lambda) x_2 \qquad (1)$$

$$\tilde{y} = \lambda y_1 + (1-\lambda) y_2 \qquad (2)$$

From equations (1) and (2), $(\tilde{x}, \tilde{y})$ represents a newly generated training-data sample for $\lambda \in [0, 1]$, which, as detailed further below with respect to FIGS. 11A-11D, may be obtained using a Beta$(\alpha, \alpha)$ distribution with $\alpha \in (0, \infty)$. In some examples in accordance with this disclosure, $\alpha$ may be selected to have a value of about 0.4.

Additionally or alternatively to augmenting the training data in this way, in some examples, system 100 is configured to augment the training process for the machine learning models, as compared to other training methods for machine learning models. For instance, some typical machine-learning-model-training methods include, subsequent to the model generating an output, informing the model whether the output (e.g., the selected classification codes based on the input training data) is either "correct" or "incorrect." In this way, the ML model typically "learns" to modify future predictions "away from" incorrect answers and "toward" correct answers over time.

For instance, for some classification-type problems, the "categorical-cross-entropy loss" is a commonly used loss function for training deep-learning models. For convenience, an input variable may be denoted as x, the ground-truth label vector as y, and the predicted probability distribution as p. In one illustrative example, given a training data sample (x, y), the categorical-cross-entropy (CCE) loss may be defined as:

$$CCE_x(p,y) = -\Sigma_{i=1}^{c} y_i \log(p_i) \qquad (3)$$

Here, C represents the number of label categories and $p_i$ denotes the predicted probability of the i-th class, obtained as output from the model's softmax layer. Both y and p are of length C, with $\Sigma_i y_i = \Sigma_i p_i = 1$. From equation (3), for imbalanced datasets, the "learned" weights of the model will be biased towards classes with the largest number of samples in the training dataset. Additionally, if the label space exhibits an ordered or hierarchical structure, the categorical-cross-entropy loss focuses only on the predicted probability of the "ground-truth" (e.g., "correct") class, while ignoring the relative distance of incorrectly predicted data samples from their "true" class label, or in other words, the difference (e.g., number of categories) between the predicted-but-incorrect category and the correct-but-not-predicted category. Accordingly, such binary-based training models do not account for a relative degree of "correctness" or "incorrectness," an inherent quality only applicable when the set of predictions (e.g., selectable classification codes) available to the model are associated with a ranked order (e.g., are "ordinal" rather than fungible).

For instance, in accordance with the present disclosure, an example set of "Level A" Classification Codes 114 includes (1) "Effective," (2) "Satisfactory," (3) "Progressive," (4) "Needs Improvement," and (5) "Working Independently," which indicate a ranked order from a generally "good" collaboration assessment 114 toward a generally "bad" collaboration assessment 114. Accordingly, in examples in which Level A module 112 of system 100 incorrectly assigns a Level A classification code of "Working Independently" onto video input data 102 that actually depicts an "Effective" collaboration effort, system 100 is configured to not only inform (at least) Level A module 112 that the classification was incorrect, but also that the classification was incorrect by a full four categories, causing the appropriate machine learning model(s) involved to substantially modify the predictive process.

By comparison, in examples in which system 100 assigns a Level A classification code of "Satisfactory" to video input data 102 that actually depicts an "Effective" collaboration effort, system 100 is configured to inform (at least) Level A module 112 not only that the classification was incorrect, but also that the classification was incorrect by only one category, causing the appropriate machine learning model(s) to only slightly (or even negligibly) modify the predictive process. In one non-limiting example, system 100 may incorporate this type of relative-correctness training by using an "ordinal-cross-entropy (OCE) loss" function, as defined in equations (4) and (5):

$$OCE_x(p,y) = -(1+w) \Sigma_{i=1}^{c} y_i \log(p_i) \qquad (4)$$

$$w = |\text{argmax}(y) - \text{argmax}(p)| \qquad (5)$$

Here, (1+w) is the additional term multiplied to the regular categorical-cross-entropy loss (equation (3), above), with argmax returning the index of the maximum valued element and |.| returning the absolute value. When training a model of system 100, w=0 for correctly classified training samples, with the ordinal-cross-entropy loss behaving exactly like the categorical-cross-entropy loss. However, for misclassified samples, the ordinal-cross-entropy loss will return a higher value than the categorical-cross-entropy loss. The increase in loss is proportional to how far away the samples have been misclassified from their ground-truth labels.

The following example illustrates one non-limiting technique for generating training data for collaboration assessment system 100. A set of audio-video recordings may be collected (e.g., via the configurations illustrated in FIG. 13) from fifteen student groups across five different schools. Each group of students may be tasked with completing twelve open-ended life-science and physical-science tasks, which require the students to construct models of different science phenomena, for example. Each group may be given one hour to complete as many tasks as possible, resulting in about 15 hours of audio-video recordings. Out of the fifteen groups, thirteen groups may have four students each, one group may have three students, and the last group may have five students. For each recording, Level A and Level B2 may be manually coded by three annotators, and Level C may be manually coded by just one annotator. For instance, the coders may use an open-source annotation software, such as the ELAN annotation tool available from The Language Archive of Nijmegen, The Netherlands. To prevent any coding bias, the annotators may first code each level using video-only data (e.g., with the audio muted or removed), and subsequently may code the same recording using both the audio and the video data. For example, a total of 117 tasks may be coded by each annotator.

As described above, the "Level A" classification codes 114 represent target (e.g., final output) labels for the collaboration-classification problem. To determine the ground-truth (e.g., the "correct") Level A code across the three annotators, a majority vote (e.g., the majority-selected classification code) may be used to determine the ground-truth. The median of the three assigned codes may be used as the ground-truth for tasks where a majority is not possible. In one non-limiting example, the Level-A-code ordering depicted in Table 1, below, may be used. For example, if three coders assign "Satisfactory," "Progressing," and "Needs Improvement" codes for the same task, then "Progressing" would be used as the ground-truth label. Under each of the video-only and the audio-video settings, a majority-consensus code (other than at "Level A") may be observed rarely, e.g., for only 2 of the 117 tasks.

TABLE 1

Example rubric for Level A and Level B2 classification codes.

| Level A | Level B2 |
| --- | --- |
| Effective [E] | Group Guide (Coordinator) [GG] |
| Satisfactory [S] | (Active) Contributor [C] |
| Progressing [P] | Follower [F] |
| Needs Improvement [NI] | Conflict Resolver [CR] |
| Working Independently [WI] | Conflict Instigator (Disagreeable) [CI] |
| | Off Task (Disinterested) [OT] |
| | Lone Solver [LS] |

Figure 2:
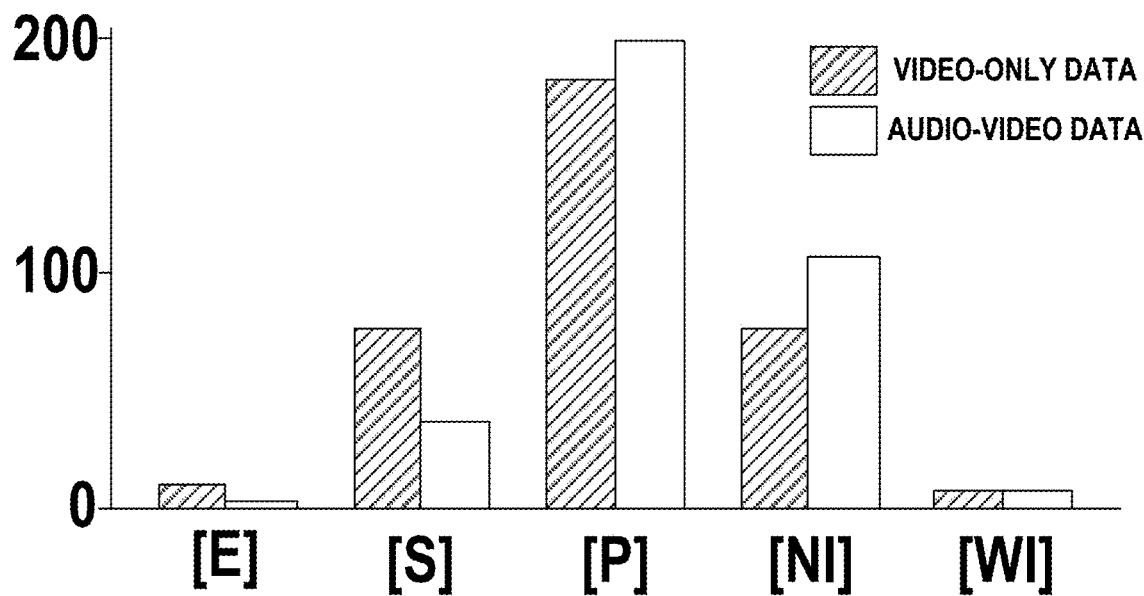
FIG. 2 is a bar graph illustrating an example distribution of "Level A" collaboration-classification codes, representing a target label distribution for a classification-type problem.

FIG. 2 is a bar graph illustrating an example relative distribution of "Level A" classification codes 114 (FIG. 1), which in some examples, represents a "target" (or final output) distribution for such classification labels. For learning-mappings from Level B2 module 110B to Level A module 112, 351 data samples (e.g., 117 tasks times 3 coders) may be used to train the machine learning models of system 100. In the case of mapping Level C module 108 to Level A module 112, each task may be coded by just one annotator, resulting in just 117 data samples. Having fewer data samples provides for a more-challenging classification problem. The distribution of the Level A labels 114 for this classification setting may be similar to the distribution shown in FIG. 2, with the difference being that each label class may now have just one-third of the samples.

Figure 3A:
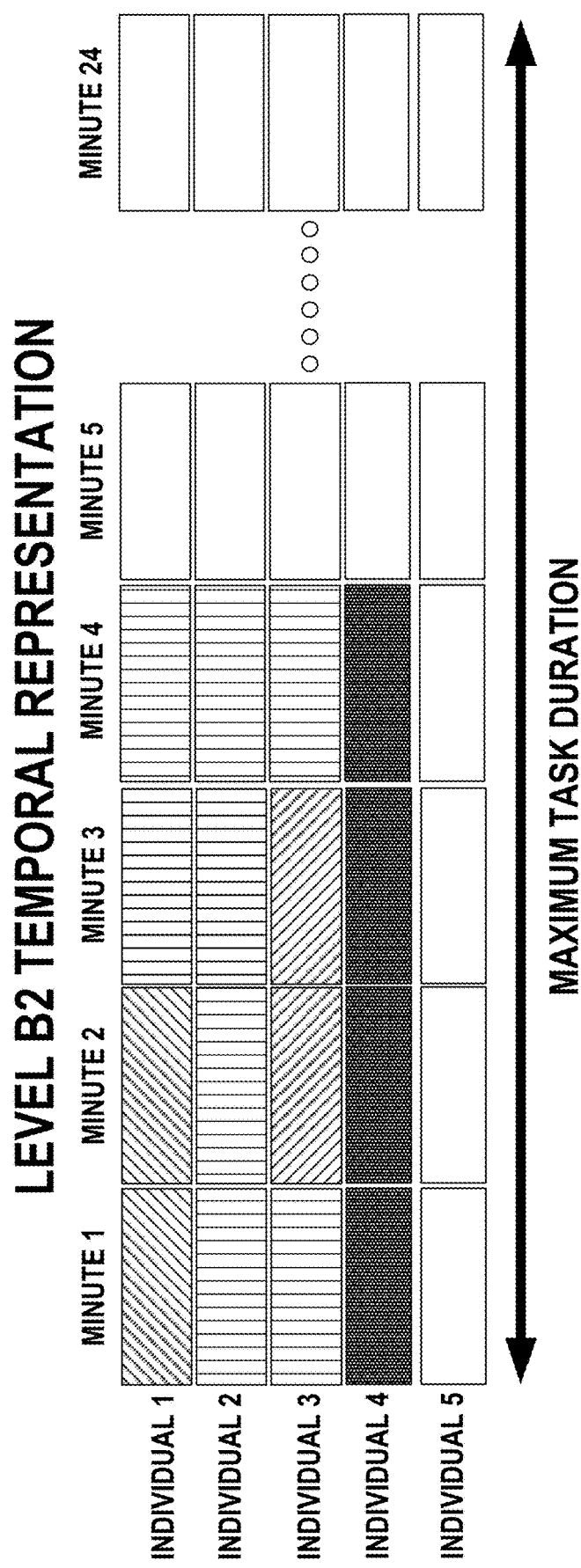
FIG. 3A is a chart illustrating an example "Level B2" temporal representation for a group of four individuals involved in a collaborative effort.

In one example dataset, the longest duration of a collaboration task may be a little under 24 minutes. Due to this, the maximum length for all collaboration tasks performed by each student group may be set to about 24 minutes. Level B2 codes may be coded using fixed-duration (e.g., about 1-minute-long) segments, whereas Level C may be coded using variable-duration segments, as illustrated in FIGS. 3A and 4A, respectively. Due to the fixed-duration (e.g., 1-minute) nature of Level B2 codes, an integer value may be assigned to each Level B2 code. This means that the seven Level B2 codes shown in Table 1, above, may be assigned values from "1" to "7." The value "0" may be used to represent segments that are not assigned a code.

As described above, Level B2 module 110B may output Level B2 features in a temporal format, a spatio-temporal format, or a histogram format. FIG. 3A is an example temporal representation of Level B2 codes, which may subsequently be submitted as input into Level A module 112. In the example Level-B2 temporal representation shown in FIG. 3A, an example group of four individuals ("students") completes a task in just 4 minutes. In this instance, the remaining 20 minutes and the $5^{th}$ student may be assigned a value of "0," as indicated by the blank cells. Thus, for each task, the Level B2 temporal feature may have a shape 24×5, where "24" represents the number of minutes and "5" represents the number of students in the group.

Figure 3B:
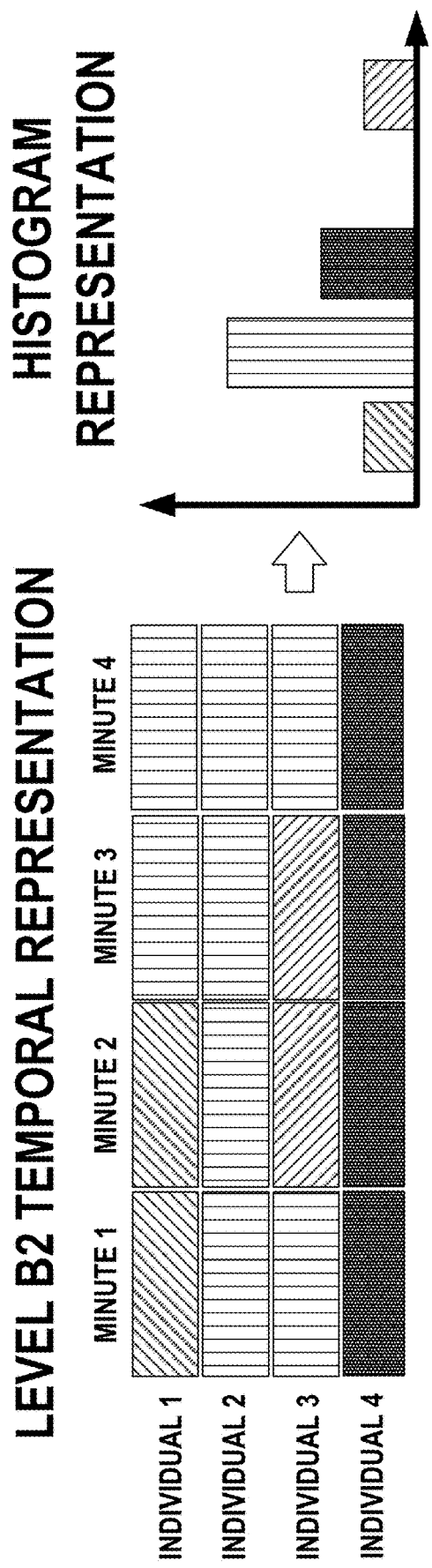
FIG. 3B depicts an example histogram feature generation for the fixed-duration, temporal-based Level B2 codes shown in FIG. 3A.

FIG. 3B depicts an example Level B2 histogram representation corresponding to the for the fixed-duration, temporal-based Level B2 codes shown in FIG. 3A. More specifically, FIG. 3B depicts a conversion of the temporal representation shown in FIG. 3A to a histogram representation. For instance, a Level B2 histogram like the one shown in FIG. 3B may be generated for each collaboration task by compiling all the Level B2 codes from all the individuals in the group.

FIG. 4A is a conceptual diagram, including a chart and bar graphs, illustrating an example Level C temporal representation for an example collaboration group, e.g., having four individuals, that finishes an assigned collaboration task within the maximum-recorded task duration (e.g., 24 minutes). As shown in FIG. 4A, for each individual (1-5) in the group and for a fixed-duration, non-overlapping time window (T), all observed Level C codes may be compiled, e.g., every 0.1 seconds, and a corresponding Level C histogram representation may be computed. In other words, a temporal representation, including variable-length segments, indicates how a histogram representation changes over time for each individual over the maximum duration of the collaboration task. Darkened/patterned segments in FIG. 4A represent different Level C codes as described in Table 2 below, and the white cells represent empty or unassigned codes.

FIG. 4B depicts an example "combined" Level C histogram representation for the temporal-based Level C codes shown in FIG. 4A. More specifically, FIG. 4B depicts a conversion of the temporal representation shown in FIG. 4A to a histogram representation. For instance, The histogram of FIG. 4B may be generated by compiling all the Level C classification codes observed after every 0.1 seconds over the duration of the task.

TABLE 2

Example rubric for Level C classification codes.
Level C Classification Codes

| Talking | Setting Group Roles/Responsibilities | Joking/Laughing |
| --- | --- | --- |
| Reading | | Horsing-Around/Roughhousing |
| Writing | Comforting/Encouraging Others (Corralling) | Showing Excessive Difference to Authority/Leader |
| Using/Working With Materials | Agreeing | Blocking Information-Sharing |
| Setting Up the Physical Space | Being Off Task/Acting Disinterested | Doing Nothing/Withdrawing |
| Listening/Paying Attention | | Engaging with Outside Environment |
| Explaining/Sharing Ideas | Disagreeing Arguing | Waiting |
| Problem Solving/Negotiation | | |
| Recognizing/Inviting Others' Contributions | Seeking Recognition/Boasting | |

In some examples, while working with Level C, an additional layer of complexity may be added. For instance, in addition to the variable-length segments, the training-data annotators may be instructed to assign both a "primary" Level C classification code and a "secondary" Level C classification code to each individual. For instance, because Level C represents individual behaviors, each individual, at any given time during the task, could exhibit more than one individual behavior. Hence, each individual may always be assigned a primary code, but may or may not be assigned a secondary code. Furthermore, the durations of the assigned primary and secondary codes could be substantially different from each other, adding to the complexity of developing a suitable temporal representation. To make things simpler, the task may be divided into fixed-duration, non-overlapping time windows of time-duration T. Within each window, all the primary and secondary classification codes observed after every 0.1 seconds may be compiled and a histogram representation for each individual may be computed, as illustrated in FIG. 4A. The resulting example feature representation would consist of a set of histograms for each individual that dynamically vary over time.

In addition to the 23 example Level C classification codes listed in Table 2 above, an unassigned or empty code may also be included, e.g., for instances when no code is assigned by the annotator, as shown by the white segments in FIG. 4A. Example time-window durations include 30 seconds, 60 seconds, and 120 seconds, and the corresponding temporal feature shapes would be grids of dimensions 47×120, 23×120, and 11×120, respectively. Here, the "120" indicates the 24-bin histograms (e.g., the 23 "Level C" codes and the 1 "unassigned" code) computed for each of the 5 individuals in the collaboration group.

The classification performance of the above temporal representations (e.g., when submitted as input data into Level A module 112) may be compared against the classification performance of simple histogram representations. For instance, histogram representations of all the classification codes may be generated, e.g., observed over the duration of the task, by pooling all the individuals together. In some such examples, only one "combined" histogram may be generated per task, per group.

While it may be straightforward to generate histograms representations for Level B2, in the case of Level C, the histogram may be generated by compiling all the Level C codes observed after every 0.1-second time interval. Once the histogram representation is generated, the graph may be normalized by dividing each frequency value by the total number of Level C codes in the histogram, thereby removing the "temporal" aspect of the task. For example, even if Group 1 takes 10 minutes to solve a task, and Group 2 takes 30 minutes to solve the same task, when the histograms are submitted as input data into Level A module 112, both groups would still be assigned the same Level-A classification code 114, despite Group 1 finishing the task sooner. The raw histogram representations of both these groups would appear different due to the difference in number of segments coded. However, normalized histograms would make them more comparable. The normalized histograms may then be used as training-data input into the machine learning models of system 100 (FIG. 1A).

For any or all of the temporal-CNN deep-learning models of FIG. 1A, a temporal residual neural network (ResNet) architecture may be used. The ResNet architecture uses skip connections between each residual block to help avoid the vanishing-gradient problem. This has previously shown state-of-the-art performance in several computer-vision applications. As used herein, an example ResNet model may include three residual blocks stacked over one another, followed by a global-average-pooling layer and a softmax layer. As one illustrative example, the number of filters for each residual block may be set to 64, 128, and 128, respectively. In some such examples, the number of learnable parameters for the Level-B2 temporal representations may be 506,949, and the number of Level-C temporal features for the different time-windows explored may be 573,189. To combine Levels B2 and C, each input may be passed through different ResNet models and concatenated their global-average-pool feature outputs before being connecting to the final softmax dense layer. The number of learnable parameters for this setting may be 1,080,133, for example.

For a baseline model, a 5-layer Multi-Layer Perceptron (MLP) model may be used. This MLP model may include one input layer, three dense middle layers and one dense output layer. The normalized histogram representations discussed above may be passed as input to the input layer. Each dense middle layer may have 500 units with rectified-linear-unit (ReLU) activation. The dense output layer may have a softmax activation, and the number of units may be equal to the total number of Level A classification codes (e.g., 5 units, in the above-described examples). Dropout layers may also be used between each layer to avoid overfitting. For example, the dropout rate after the input layer and after each of the three middle layers may be set to 0.1, 0.2, 0.2, and 0.3, respectively. Three different types of input data may be used: B2 histograms, C histograms, and a concatenation of B2 and C histograms (referred to herein as "Level B2+C" histograms). In some such examples, the number of trainable parameters for the Level B2 histogram may be 507,505; for the Level C histogram may be 515,505; and for the Level B2+C histogram may be 519,005.

The machine learning models of system 100 (FIG. 1A) described herein may be developed using, for example, Keras with a TensorFlow backend (available from the Google Brain Team). In some examples, the adaptive-moment-estimation (Adam) optimization algorithm may be used, and the models may be trained for 500 epochs. In some examples, the batch-size may be set to one-tenth of the number of training samples during any given training-test split. The best model, e.g., having the lowest test-loss for each training-test split, may be saved.

For evaluating the trained ML models of system 100, a round-robin, leave-one-group-out, cross-validation protocol may be followed. This implies that, for a dataset consisting of g student groups and for each training-test split, data from g−1 groups may be used for training, and the $g^{th}$ group is used as the test set. This may be repeated for all g groups and the average result may be reported. In the illustrative example described herein, g is equal to 14, though there may be temporal representations for each task performed by 15 student groups. This is because, in the audio-video input-data setting, all data samples corresponding to the "Effective" Level A class may be found only in one group. Similarly, for the video-only input-data setting, all samples corresponding to the "Working Independently" Level A class may also be found in just one group. Because of this and the cross-validation protocol, there may not be any test samples for the "Effective" Level A class in the audio-video input-data setting, or for the "Working Independently" Level A class in the video-only input-data setting. As described above, for mapping Level B2 module 110B to Level A module 112, there may be 351 data samples, but for mapping Level C module 108 to Level A module 112, there may be only have 117 data samples.

In some examples, the temporal ResNet models described herein may behave differently under different hyperparameter settings and loss-function variations. To compare against the MLP baseline models in the following example, the following four loss-function variations may be explored: (1) cross-entropy-loss only, (2) cross-entropy-loss with class-balancing, (3) ordinal-cross-entropy-loss only, and (4) ordinal-cross-entropy loss with class balancing. Here, "class balancing" refers to weighting each data sample by a weight that is inversely proportional to the number of data samples corresponding to the data sample's resulting Level A class label (e.g., classification code). For instance, FIGS. 5A-5D are sets of bar graphs comparing examples of different temporal-feature-weighted, F1-score performances of the classification Levels B2, C, and B2+C under different input-data settings, loss-function settings and hyperparameter settings.

Figure 5A:
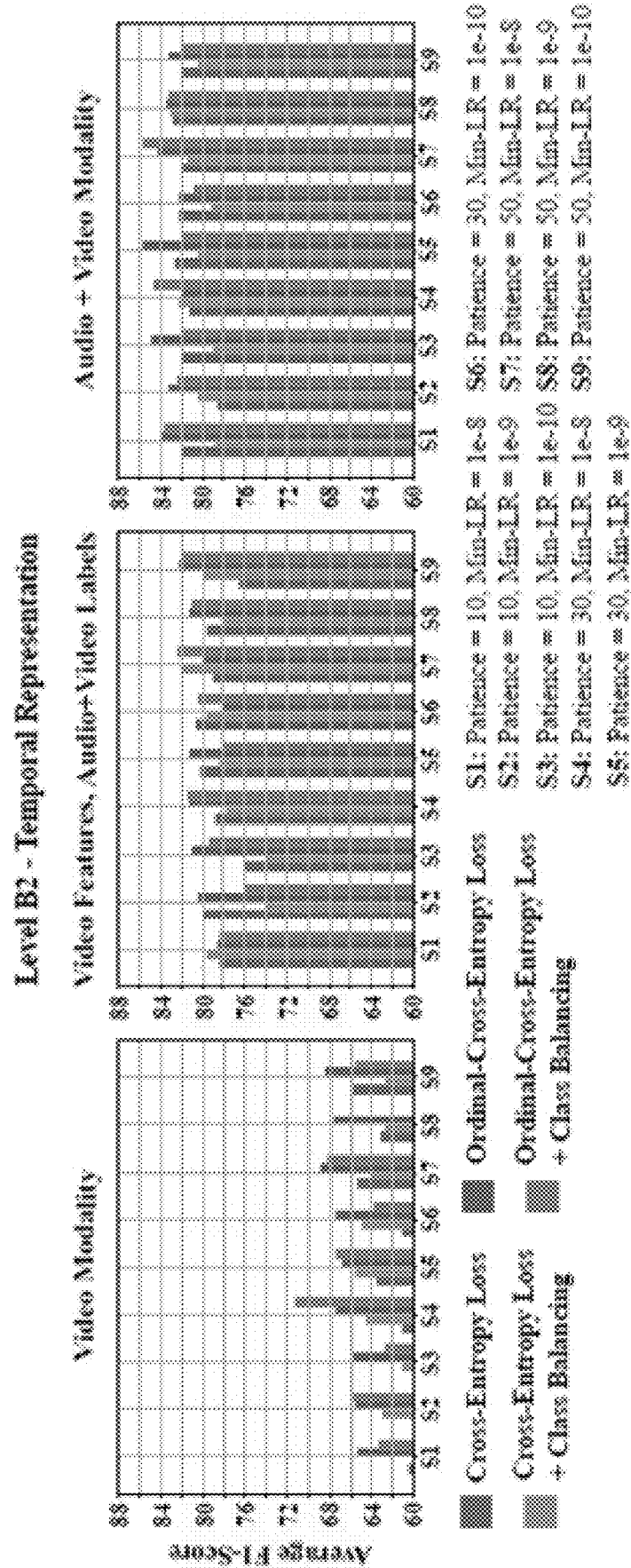
FIGS. 5A-5D are sets of bar graphs comparing examples of different feature-weighted, F1-score performances of classification Levels B2, C, and B2+C of a collaboration assessment system under different input-data settings, loss-function settings and hyperparameter settings.
Figure 5B:
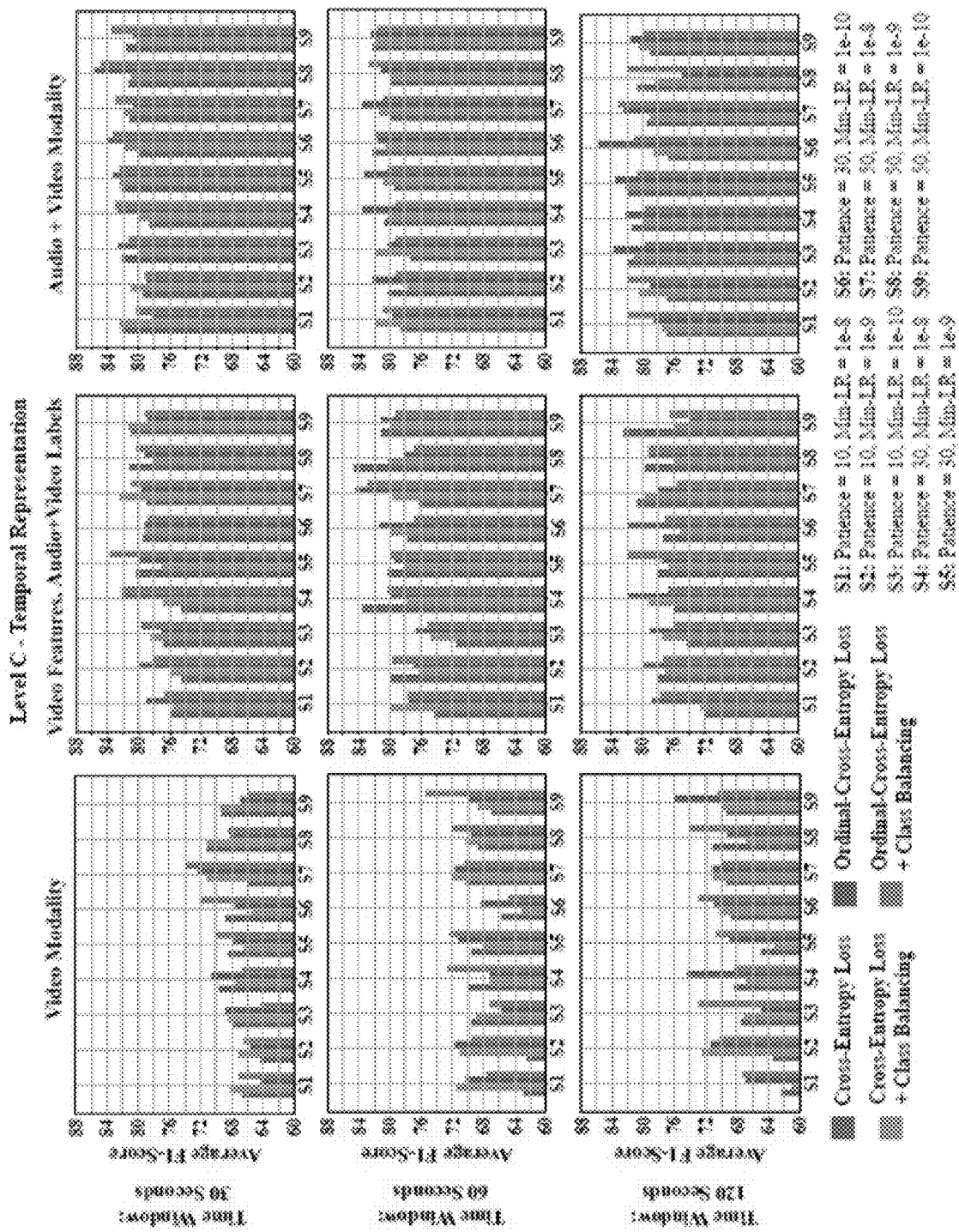

For both the video-only and the audio-video settings of input data 102, FIGS. 5A and 5B illustrate example average-weighted F1-score-classification performances under different hyperparameter settings, as indicated by S1-S9. In some examples, only the "patience" and the "minimum-learning-rate" (Min-LR) parameters may need to be varied, as these two parameters may influence the classification performance of system 100 the most. These parameters may be used to reduce the learning rate, e.g., by a factor of about 0.5, if the loss does not change after a certain number of epochs indicated by the "patience" hyperparameter. In some examples, the manual annotations made using audio-video recordings 102 may be "cleaner" (e.g., more precise and/or accurate) than the video-only recordings 102, and can be used to better-describe the individual roles (Level B2) and behaviors (Level C). Accordingly, as indicated in FIGS. 5A and 5B, the overall classification performance for system 100 using the audio-video setting may tend to be higher than for the video-only setting.

Figure 5C:
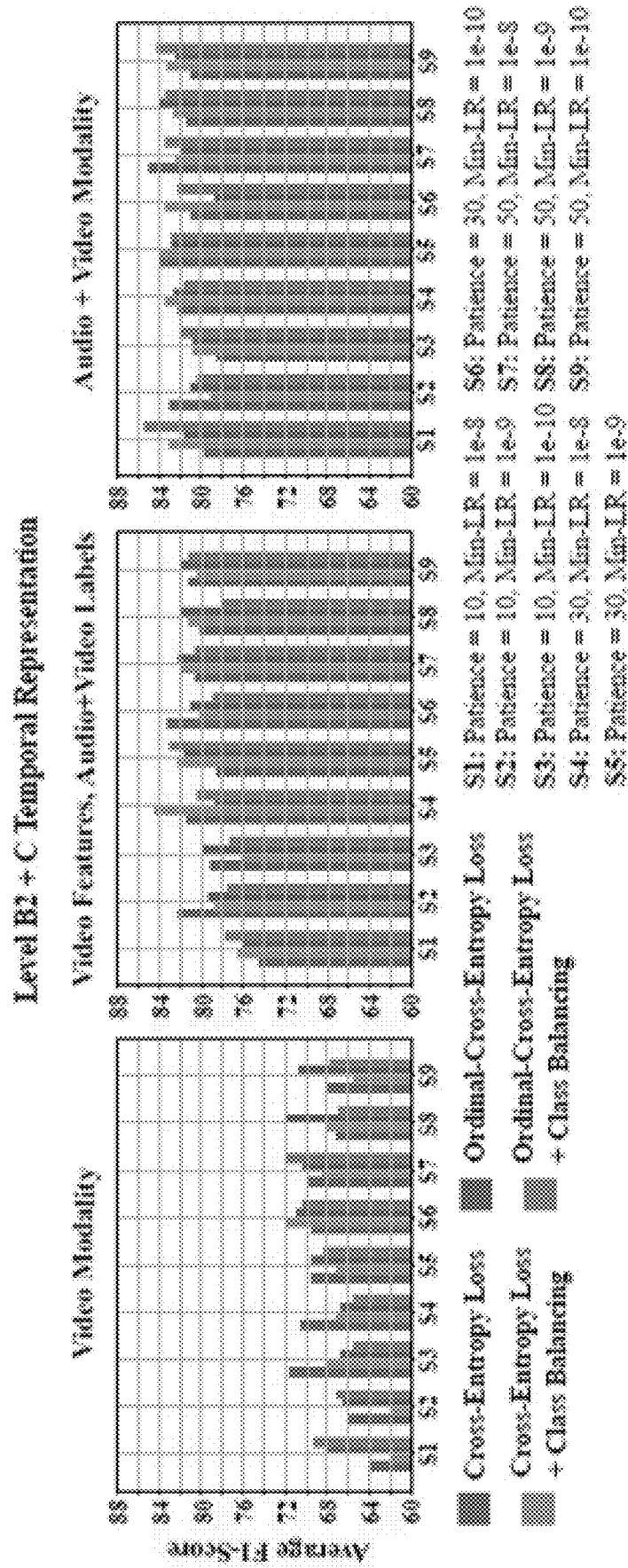

For Level-B2 temporal features (e.g., when used as input into Level A module 112), the F1-score performance may tend to remain generally consistent, with relatively few fluctuations across the different hyperparameter settings, in contrast to previous Level-B2-histogram representations (e.g., FIG. 3B), which may show more fluctuations. As shown in FIG. 5B, the same phenomenon may also be observed in the case of Level-C temporal features (e.g., when used as input into Level A module 112). However, in addition to the "patience" and the "Min-LR" hyperparameters, for Level C, the effect of different time windows T (e.g., in the Level C temporal representations) on the classification performance (e.g., of Level A module 112) may also be evaluated. For instance, setting T=30 seconds or T=60 seconds may show more stability across the different settings, as compared to when T=120 seconds. For this reason, T=60 seconds may be selected only for the Level B2+C ResNet architecture, the results of which are illustrated in FIG. 5C. For the video-only setting of input data 102, the relative performance of Level B2+C may be approximately midway between the individual Level-B2 and Level-C performances. However, little improvement in the audio-video setting may also be observed.

The example above illustrates how temporal representations with the ResNet architecture can behave under different hyperparameter settings. In the following example, the performance of the example temporal representations is compared against their histogram counterparts. For instance, the "best" example models may be selected based on the weighted F1-score. For both histogram and temporal representations, the highest performance may generally be observed in the audio-video input-data setting, followed by the cross-modal setting (e.g., Levels B and C "features" based on audio-video input data 102, and Level A "labels" based on video-only input data 102), and then by the video-only input-data setting. For almost all feature types under each input-data setting, the ordinal-cross-entropy loss (as described above with respect to equations (4) and (5), either with or without class-balancing, may tend to produce the highest-weighted F1-score performance.

Figure 5D:
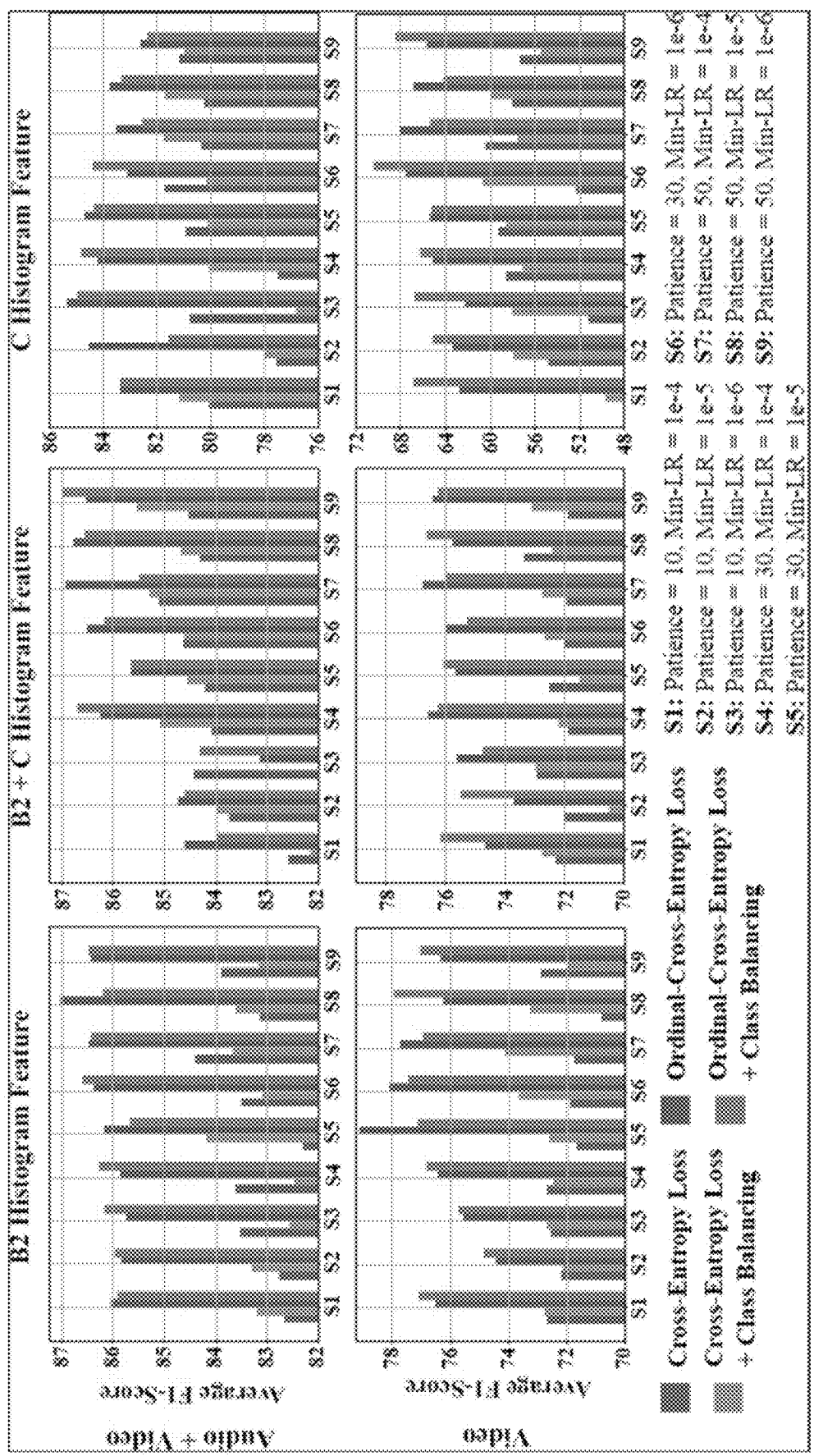

FIG. 5D is a set of bar graphs illustrating a comparison of the average weighted F1-Score performance between all four permutations of cross-entropy loss/ordinal-cross-entropy loss with and without class-balancing, for all three Levels B2, B2+C, and C, and under different parameter settings S1-S9. In some examples, only the patience and minimum-leaning-rate (Min-LR) parameters need to be varied, as these two parameters may affect classification performance the most. For instance, these parameters may be used to reduce the learning-rate by a factor of 0.5 if the loss did not change after a certain number of epochs indicated by the patience parameter. As shown in FIG. 5D, compared to the two cross-entropy-loss variants, the two ordinal-cross-entropy-loss variants may help significantly improve the F1 scores across all parameter settings. Improvements may be consistently observed across both input-data settings and for different histogram inputs. Typical class balancing (e.g., weighting) may result in only marginal improvements for both loss functions.

Although the Level B2, C, and B2+C temporal features for the audio-video setting (e.g., FIGS. 5A-5C) appear to perform slightly worse than their corresponding histogram representations (FIG. 5D), the same trends do not typically appear for the video-only input-data setting. For example, the Level B2 temporal features may result in a lower average performance than the Level B2 histogram features. However, the Level C temporal features may have a much-higher average performance than the Level C histogram features. This difference in performance could be attributed to the way the annotations are created at each level. For example, as described above, the Level B2 codes may be assigned using fixed-duration, 1-minute-long segments, whereas the Level C codes may be assigned using variable-duration segments. Based on example empirical results, simple histogram representations may be enough to represent individual roles (Level B2) and achieve a reasonably high classification performance, relative to the corresponding temporal representations. In some examples, Level C, on the other hand, can be better-modeled using temporal representations, because the behavior of each individual can vary over time and between different collaboration tasks. Accordingly, a histogram representation of these exhibited individual behaviors may tend to oversimplify the individual behaviors, thereby reducing the classification performance of system 100 when used as input into Level A module 112.

Despite the performance differences between the histogram representations and the temporal representations, the example temporal features and corresponding temporal deep-learning models of system 100 can help identify regions of the "feature space" of input data 102 that contribute the most toward the ultimate classification-code decision 114 performed by system 100. This may be advantageous, for example, for understanding which individual roles and behaviors were most influential in the assessment 114 generated by system 100. For instance, as compared to typical machine learning-based systems, which often function as fully-encapsulated or "black box" systems, the systems and techniques of this disclosure are configured to be substantially transparent, in that they enable system 100 to articulate, or equivalently, enable a user of system 100 to deduce, a reason or justification behind any particular classification-decision of system 100. These reasons or justifications, in turn, enable the determination of highly specific recommendations for improving subsequent collaboration efforts, e.g., by recommending changes to particular behaviors of an individual involved in the collaboration.

The previous two examples illustrated how temporal and histogram representations may perform under different input-data settings, and how the video-only-based features (Levels B2 and C) and labels (Level A) may tend to perform significantly worse than the audio-video-based features and labels. The following example illustrates how video-only-based "features" (e.g., annotations for Levels B2 and C) can be directly mapped to audio-video-based "labels" (e.g., annotations for Level A) to help bridge the performance gap across the two input-data settings. For instance, training deep-learning models with a combination of video-only features and audio-video labels (referred to herein as a "cross-modal" setting) can significantly reduce differences between the two modality settings. The "middle" graphs in each of FIGS. 5A-5C illustrate this concept. Similar observations may be made for the histogram representations of FIG. 5D. For instance, the cross-modal input-data setting can produce a 10-15% improvement in performance relative to the video-only setting, and only a slight reduction in performance relative to the audio-video setting. This may indicate that annotations of individual roles and behaviors created under the video-only setting already include sufficient information for system 100 to effectively modelling the group-collaboration quality. Accordingly, it may not be necessary in all cases to collect and annotate audio data for monitoring student roles and behaviors, enabling conservation of limited data-collection, annotation, and analysis resources.

However, as compared to individual roles and behaviors, the assessment of higher-level group collaboration can be a more-complicated process. Accordingly, annotations of a group collaboration created in a video-only setting (also referred to herein as an "impoverished" setting due to the lack of audio data) may be noisy and less-reliable than annotations made in an audio-video setting. Despite the significant improvement in classification performance in the cross-modal input-data setting, video-only-based annotations may show reduced performance compared to audio-video-based annotations. This may result from slightly poorer annotations for Levels B2 and C created under the video-only setting. Additionally, there may relatively little difference, in terms of classification performance, between the temporal and histogram representations in the cross-modal setting, which enables simpler, more cost-effective, better-explainable (e.g., more-transparent), and higher-performance collaboration assessment models.

Figure 6:
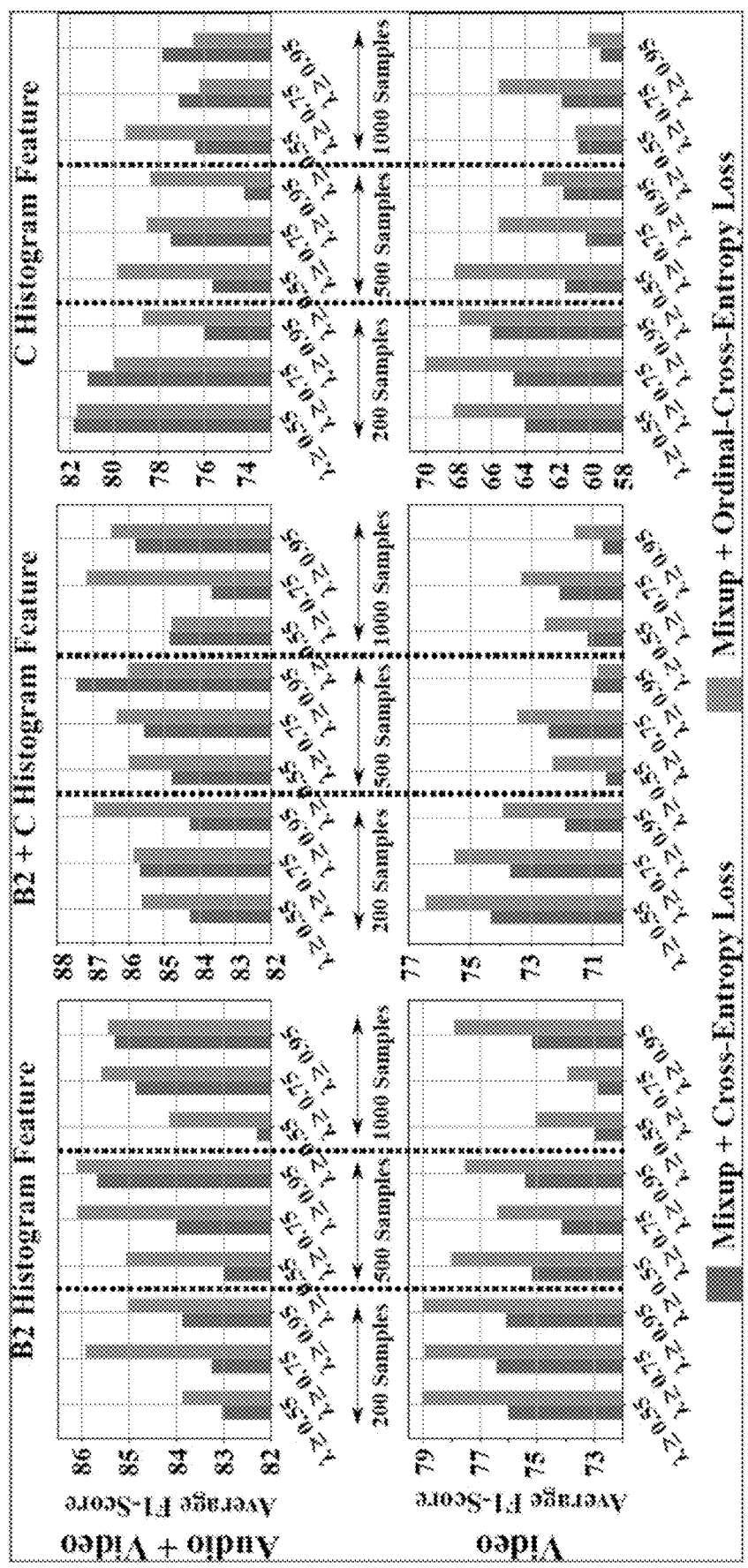
FIG. 6 is a set of bar graphs illustrating a comparison of average weighted F1-score performance using controlled mixup augmentation to reduce training-data bias, with and without ordinal-cross-entropy loss.

FIG. 6 is a set of bar graphs illustrating a comparison of average weighted F1-score (e.g., classification performance) of system 100 using controlled mixup augmentation to reduce training data bias, both with and without ordinal-cross-entropy loss. Here, 200, 500, and 1000 samples refer to the number of samples generated per class n using controlled mixup augmentation.

More specifically, FIG. 6 shows the effect of controlled mixup augmentation with and without ordinal-cross-entropy loss. Across both input-data settings (e.g., audio-video above, and video-only below), mixup augmentation with ordinal-cross-entropy loss is better than mixup augmentation with regular cross-entropy loss for all cases (Level B2 histogram, left) and for most cases (Level C histogram, right, and Level B2+C histogram, middle). This may indicate that controlled mixup augmentation and ordinal-cross-entropy loss complement each other in most cases. Having a larger n does not necessarily imply better performance. For audio-video input data 102, F1 scores may be similar, irrespective of the value of n. However, in the video-only input-data setting, F1 scores may tend to decrease as n increases. This could result from the "noisy" nature of codes assigned by the annotators due to the lack of audio data. Better performance may be observed when using $\tau=0.75$ or $\tau=0.95$ for audio-video data and $\tau=0.55$ for video-only data (Levels B2 and B2+C histograms). However, the opposite effect may be observed in the Level C histogram (right).

In the previous example, the MLP models were trained using the n samples generated per class, which did not retain the original set of training samples. This may be referred to herein as "full" mixup augmentation. In other examples, MLP models of system 100 may be trained with the original set of training samples, and only samples needed to reach n samples per class may be generated, e.g., using controlled mixup augmentation. This may be referred to herein as "limited" mixup augmentation.

For example, assume that the "Effective" Level A class already has m training samples. In such examples, n-m samples may be computed using controlled mixup to reach the required n samples per class. This process ensures that the original set of training samples is always present.

Figure 7A:
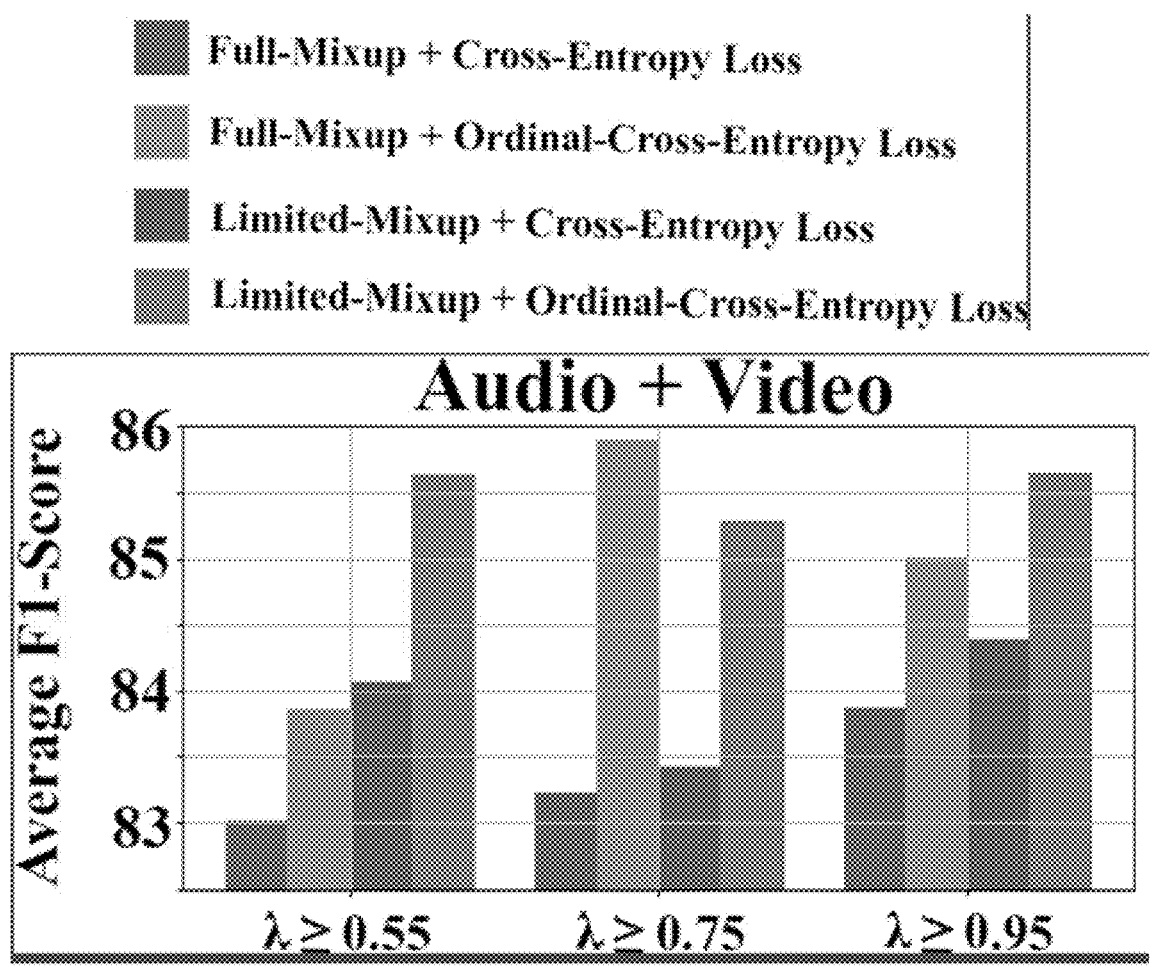
FIGS. 7A and 7B are bar graphs illustrating "full" mixup augmentation vs. "limited" mixup augmentation using different loss functions.
Figure 7B:
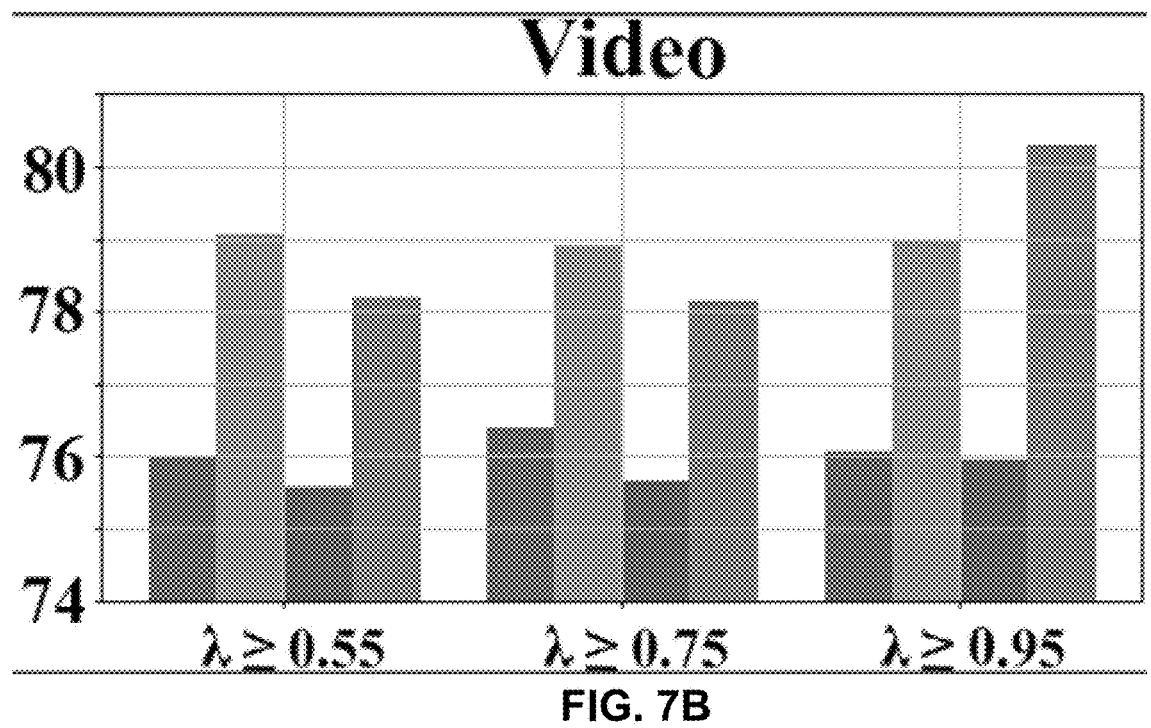

FIGS. 7A and 7B are bar graphs illustrating "full" mixup augmentation vs. "limited" augmentation mixup using different loss functions. The depicted average weighted F1-scores are only for a Level-B2 histogram feature input with n=200, because similar trends may be observed for the other levels as well. As shown in FIGS. 7A and 7B, the full and limited mixup augmentation techniques may result in similar F1-scores. Accordingly, the n samples per class may be generated using the controlled mixup-augmentation protocol described above (e.g., in equations (1) and (2)) without much noticeable difference in F1-score performance.

In some examples a graphical-visualization tool may be used in conjunction with system 100 in order to help understand (e.g., justify or explain) "important" regions in the temporal feature space of input data 102, or in other words, to highlight specific points in time within video data 102 that significantly affect decision(s) made by system 100 when generating collaboration assessment 114. One such example visualization tool is the Gradient-weighted Class Activation Mapping (Grad-CAM) tool. Grad-CAM uses class-specific gradient information, flowing into the final convolutional layer to produce a coarse localization map that highlights important regions in the feature space of input data 102. In some examples, but not all examples, Grad-CAM may be used primarily as a post-hoc model-analysis tool, rather than to train the model.

Figure 8:
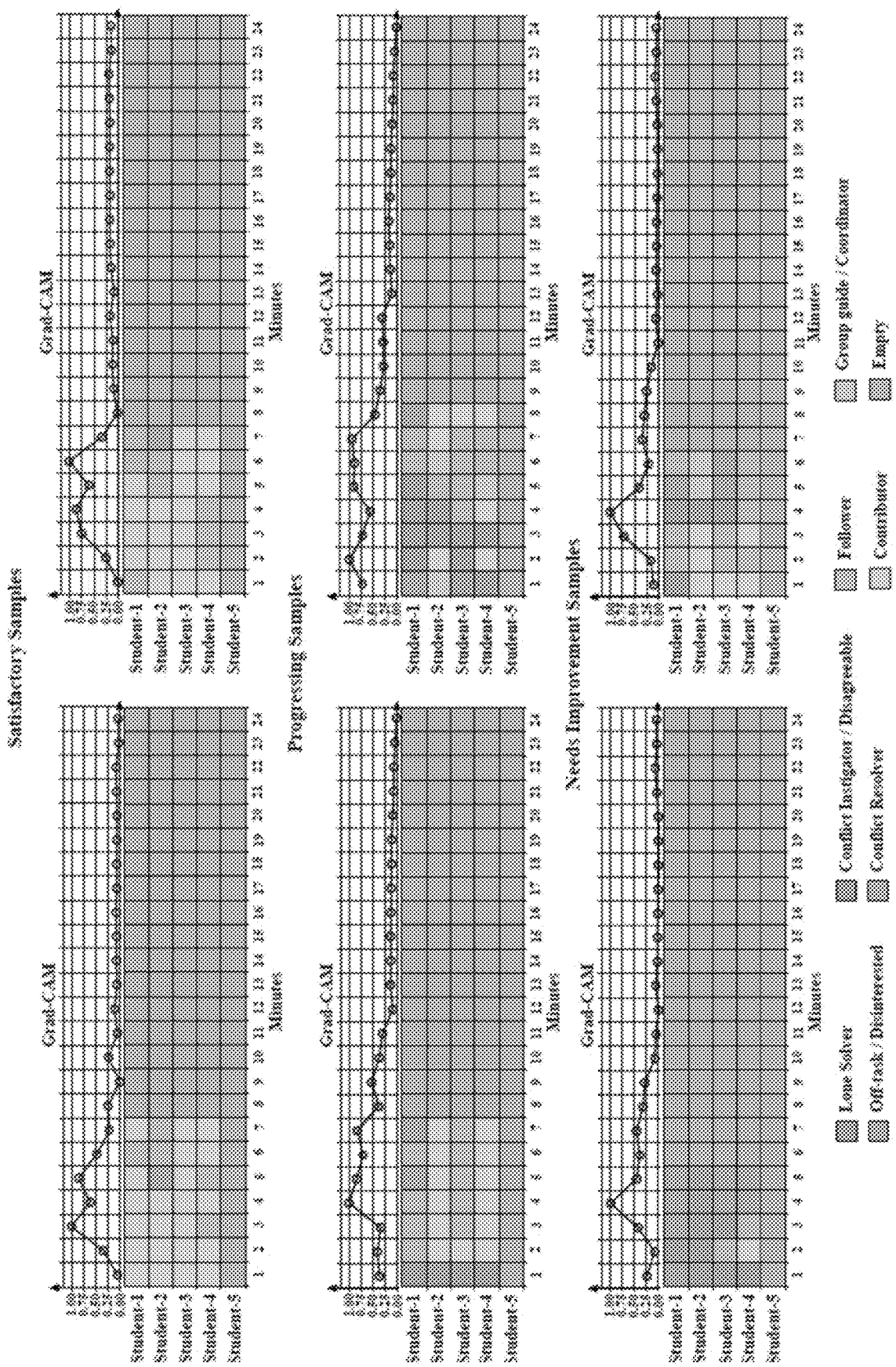
FIG. 8 illustrates example graphical visualizations for two different "Level B2" temporal samples from each of the "Satisfactory," "Progressing," and "Needs Improvement" classes of a collaboration assessment system.

FIGS. 8 and 9A-9E illustrate how Grad-CAM can be used for the classification problem. For instance, FIG. 8 illustrates example graphical visualizations (in the form of the line graph shown above each temporal representation) for two different Level-B2 samples from each of the "Satisfactory," "Progressing," and "Needs Improvement" Level A classification codes. Each sample shows an example group consisting of four individuals that completed an assigned task within about 5 to 8 minutes. As described above, the shades of the darker cells (e.g., in the upper-left region of each temporal representation) represent different Level-B2 classification codes, and the blank or white cells represent unassigned or empty codes.

One can obtain n number of Grad-CAM maps for an n-class classification problem. The samples shown in FIG. 8 correspond to the class predicted by the ResNet model, which is also the ground-truth class. As shown, the Grad-CAM line-graph representation above each temporal representation highlights (e.g., in the forms of "peaks" or local maxima) the regions in the input feature space that contributed towards the "correct" prediction (e.g., classification-code selection) by system 100.

For instance, as shown in the bottom two graphs of FIG. 8, for the input data samples 102 associated with the "Needs Improvement" Level A classification code, the Grad-CAM map indicates the highest weight or peak at a time duration around the fourth minute. For the first data sample (e.g., bottom-left graph of FIG. 8) at that time instance, the system 100 selects the Level B2 classification code for three of the individuals (e.g., Students 1, 3, and 4) to be "Off-task/Disinterested." Similarly, for the second data sample (e.g., bottom-right graph of FIG. 8), system 100 selects the Level B2 classification code for three of the individuals (e.g., Students 1, 2, and 3) to be "Lone Solver" and the fourth individual (Student 4) becomes classified as a "Follower," as compared to the previous minute, in which two of the individuals (Students 1 and 3) were "Followers" and the remaining two (Students 2 and 4) were "Contributors."

As indicated by the Grad-CAM line graphs shown in FIG. 8, relatively less importance is assigned to the empty codes (e.g., the lighter-cell regions in the temporal representations). The articulability of the changes in Level B2 classification codes across the collaboration effort, as indicated by the visualized Grad-CAM weights, illustrate the benefits of transparency and explainability of the hierarchical systems and techniques described herein.

Figure 9A:
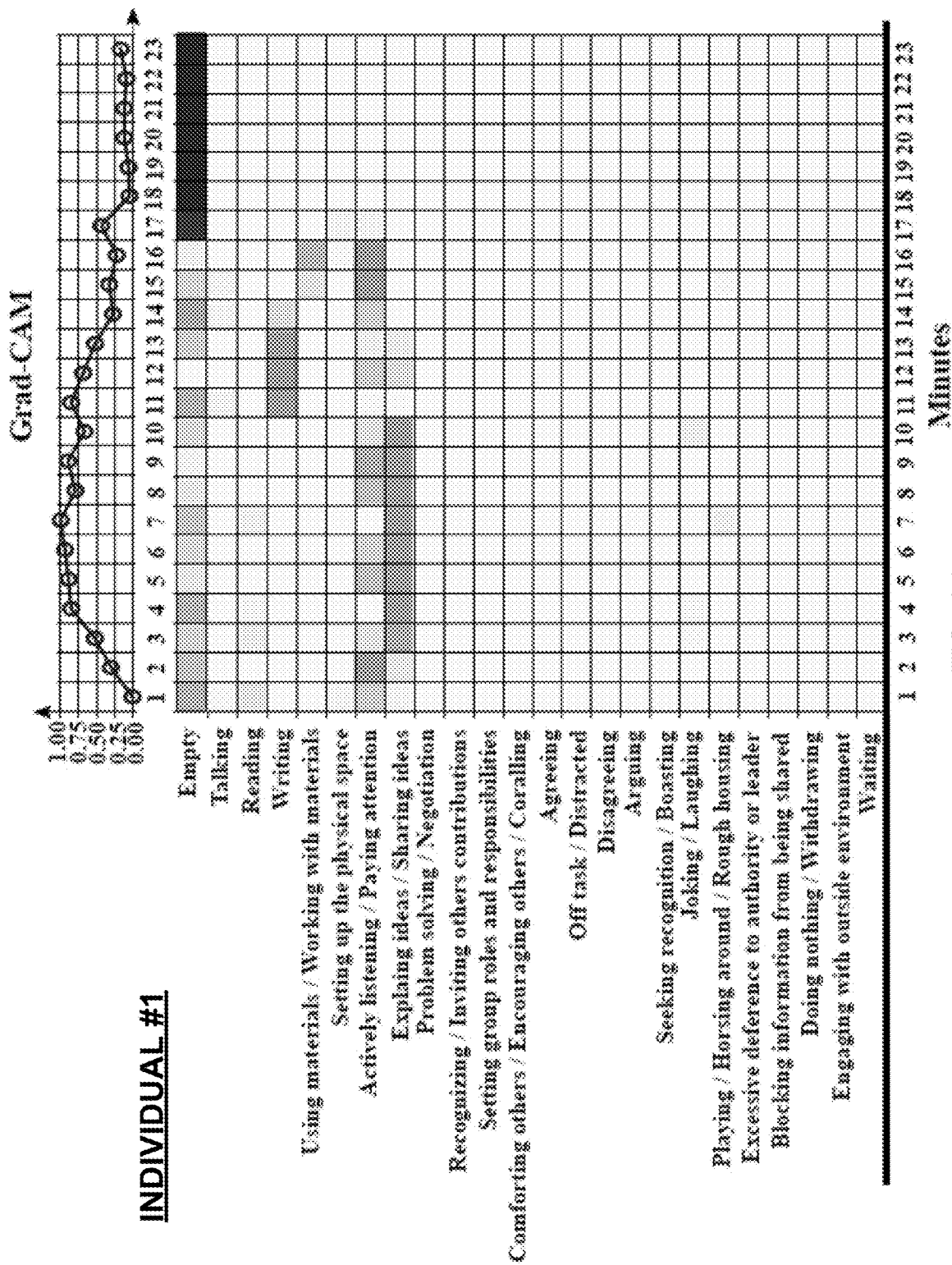
FIGS. 9A-9E illustrate an example "Level C" temporal representation sampled from a "Progressing" class of a collaboration assessment system, and corresponding to the associated graphical visualization depicted in FIG. 9A.
Figure 9B:
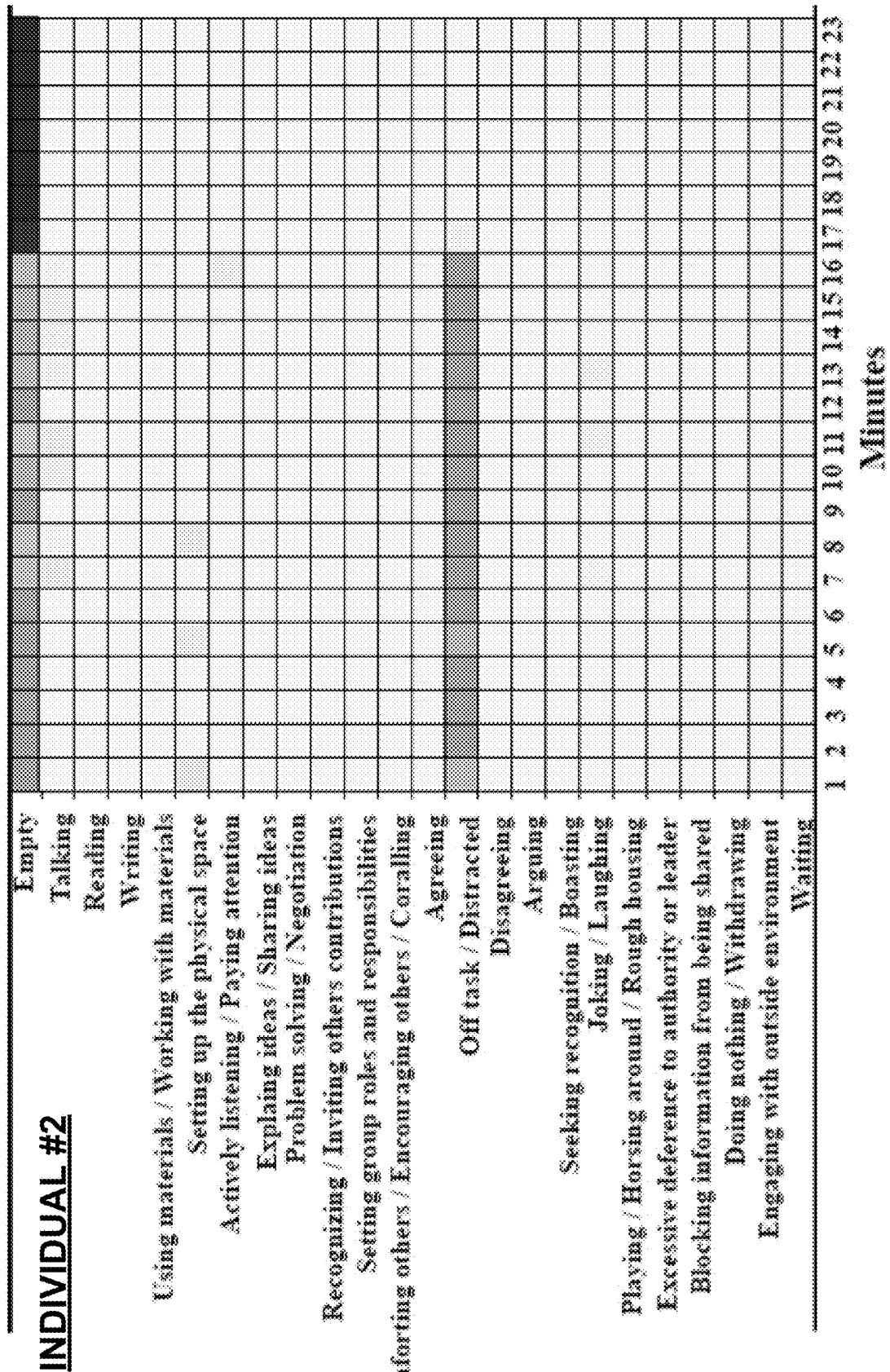
Figure 9C:
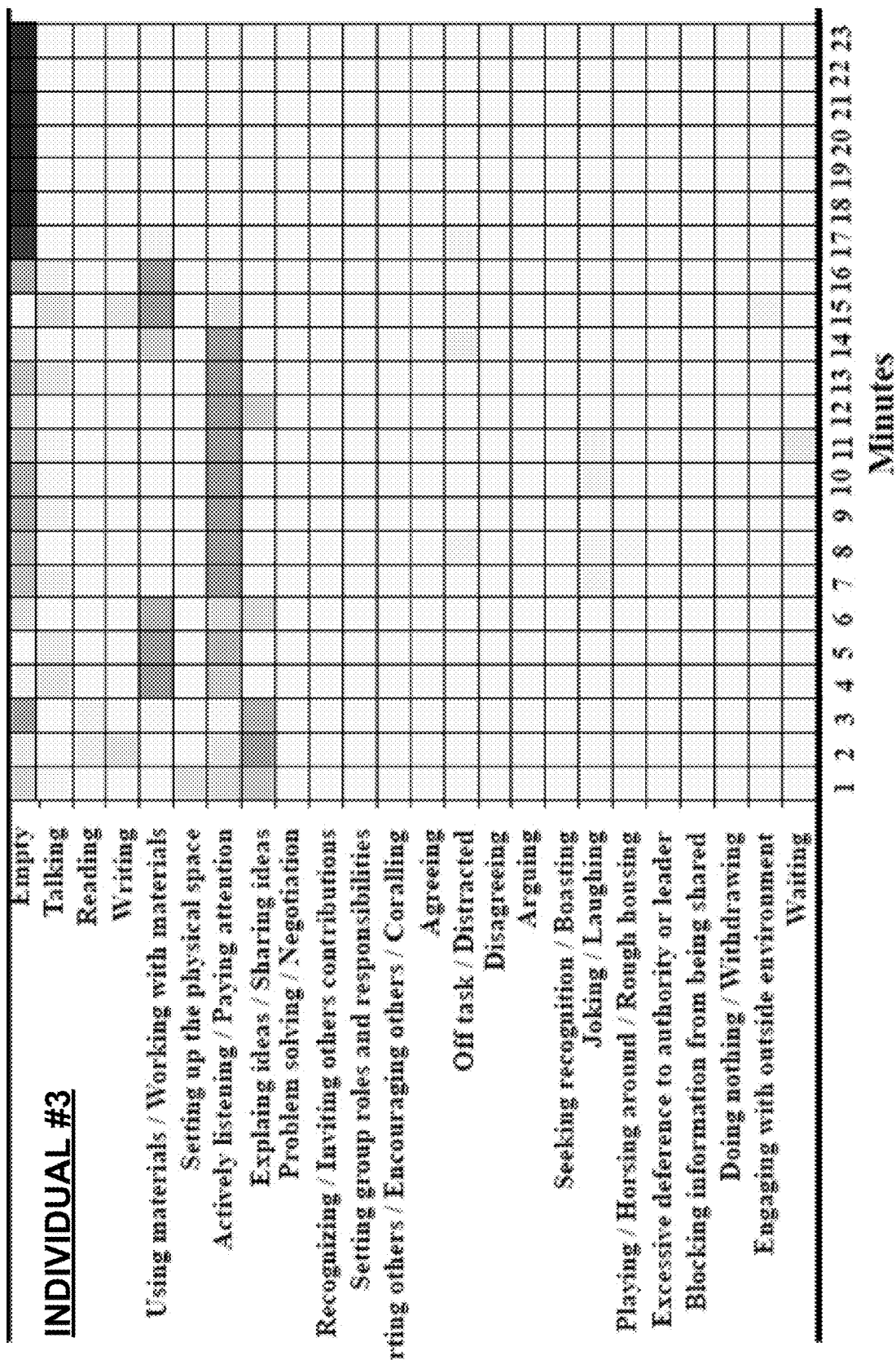
Figure 9D:
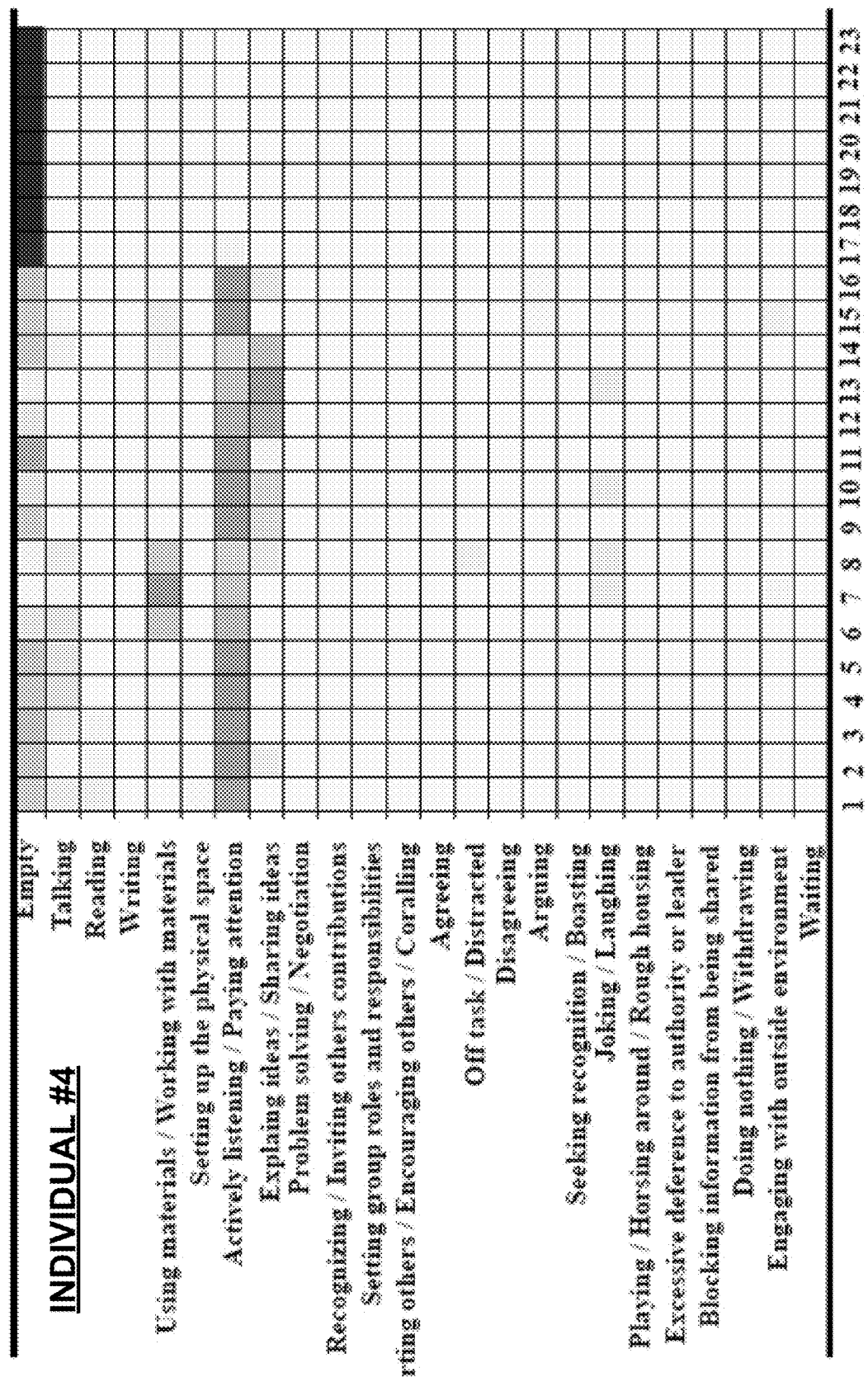
Figure 9E:
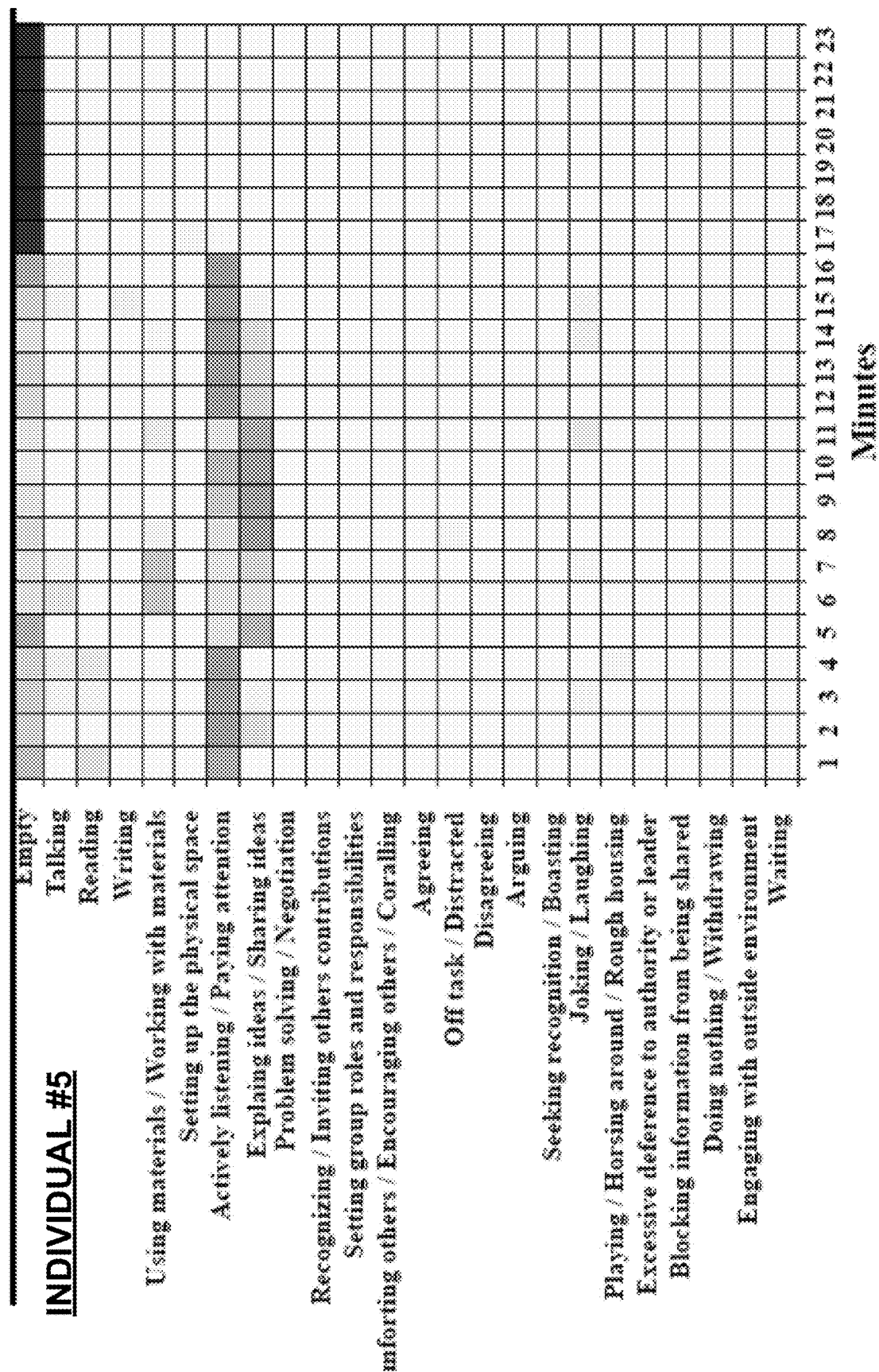

FIGS. 9A-9E illustrate example Level C temporal representations for five individuals, respectively, as well as the resulting Grad-CAM visualization shown at the top of FIG. 9A. For instance, FIGS. 9A-9E represent an input data sample 102 (e.g., video data) associated with the "Progressive" Level A class, e.g., that depicts five individuals (e.g., represented in each of FIGS. 9A-9E, respectively) who completed an assigned task in 16 minutes. As shown at the top of FIG. 9A, the computed Grad-CAM map includes a higher magnitude over the duration where the task was performed (e.g., T=1 to 16) and a lower magnitude after the task was completed (e.g., T=17 to 23). For every minute, about 1,200 Level-C classification codes may be binned, which may be obtained by sampling 0.1-second intervals spread across the primary and secondary classification codes, as described above. With the exception of the "Empty" bin at the top of each temporal representation, FIGS. 9A-9E illustrate how each individual can exhibit multiple different behaviors, as well as the relative magnitude of each identified behavior at any given moment in time.

The systems and techniques of this disclosure are not intended to be limited to the examples explicitly shown described. For instance, the Grad-CAM visualizations of FIGS. 8 and 9A are shown as a function of temporal dimensions. These mappings indicate important temporal instances of a collaboration effort, but do not illustrate important interactions between individuals. For instance, the examples shown in FIGS. 8 and 9A-9E do not explicitly indicate which subset of individuals are interacting, nor how that particular subset of individuals affects the overall group dynamic. This analysis and explanation may be performed by other custom deep-learning architectures and feature-representation spaces. For instance, tools such as LIME and SHAP may be used to compute the relative importances of these different types of input features, providing for better model explainability and interpretability.

As another example, the techniques explicitly described herein include using deep-learning models to map individual roles and behaviors (e.g., Levels B2 and C) to the overall group collaboration (e.g., Level A). However, the techniques of this disclosure include the exploration of other branches of the conceptual model of system 100, as described above with respect to FIG. 1A. For instance, the systems of this disclosure may further be configured to assist and guide individuals to improve the collaboration effort, e.g., by determining, based on identified behaviors, one or more corresponding "corrective" behaviors to perform or roles to assume. In one illustrative example, these recommendation systems could be configured for an educational setting, e.g., to provide a teacher with insight on how different student interactions could be improved to facilitate better group collaboration.

Figure 10:
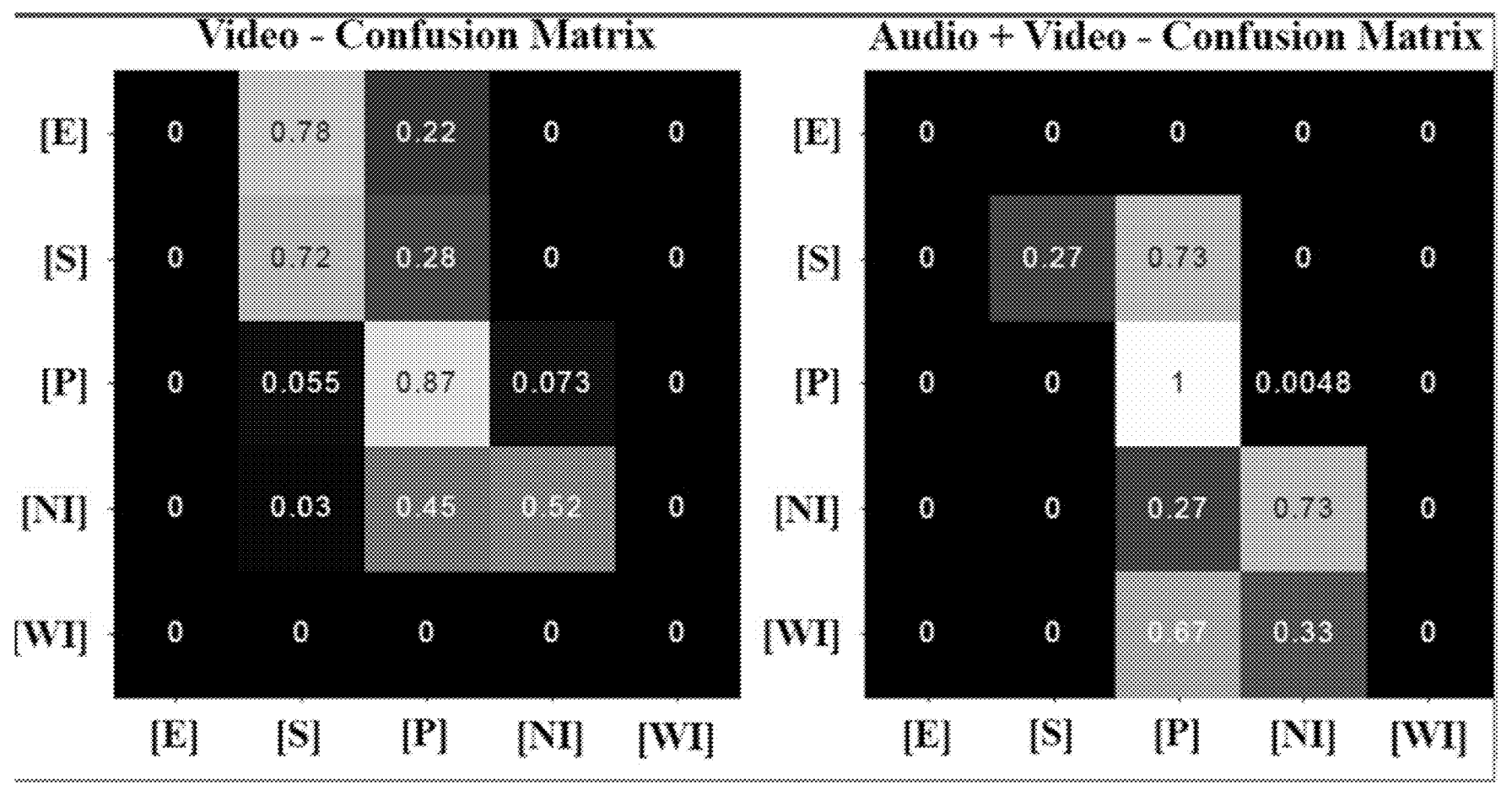

As described above, collaboration assessment system 100 (FIG. 1A) may include one or more Multi-Layer Perceptron (MLP) deep-learning models trained to determine and output a collaboration assessment report 114. FIG. 10 illustrates two examples of aggregate confusion matrices for such MLP classification models, e.g., that have been subjected to class-balancing (e.g., weighting each data sample by a weight that is inversely proportional to the number of data samples corresponding to the data sample's Level A classification code, as described above) during an associated training process. The confusion matrices shown in FIG. 10 are normalized along each row, with the number in each cell representing the percentage of data samples that are classified to each classification code. As illustrated by the matrices shown in FIG. 10, even with these types of class-balancing techniques implemented, in some examples, MLP models may not fully overcome bias (e.g., over-or-underrepresentation of one or more classification codes).

Accordingly, collaboration assessment system 100 may implement mixup-augmentation techniques to generate pseudo training data to address these biases, as described above with respect to example mixup-augmentation equations (1) and (2). Mixup-augmentation equations (1) and (2) each include a $\lambda$ parameter ranging from 0 to 1, inclusive. As shown in FIGS. 11A-11D, $\lambda$ may be obtained via continuous probability "Beta($\alpha$, $\alpha$)" distributions for various values of $\alpha$. More specifically, FIGS. 11A-11D show Beta($\alpha$, $\alpha$) distributions for four different values of $\alpha$=0.1, 0.4, 0.7, and 1.0 respectively. Each Beta distribution plot of FIGS. 11A-11D has a different y-axis range and represents a 500-bin histogram of 200,000 randomly selected values of $\lambda$ between 0 and 1.

As shown in FIG. 11A, for $\alpha$=0.1, most $\lambda$ are located at 0 and 1. As $\alpha$ approaches 1 (FIGS. 11B-11D) then the Beta distribution looks more like a uniform distribution. In some examples herein, an a value of about 0.4 may be selected to produce the $\lambda$ values for mixup-augmentation equations (1) and (2). Apart from improving the classification performance on various image classification benchmarks the mixup-augmentation techniques (e.g., equations (1) and (2) above) also lead to better calibrated deep-learning models of system 100. For example, the predicted softmax scores of a model trained using mixup-augmentation data are better indicators of the probability of a correct prediction by system 100 than models trained in a regular fashion.

Figure 12:
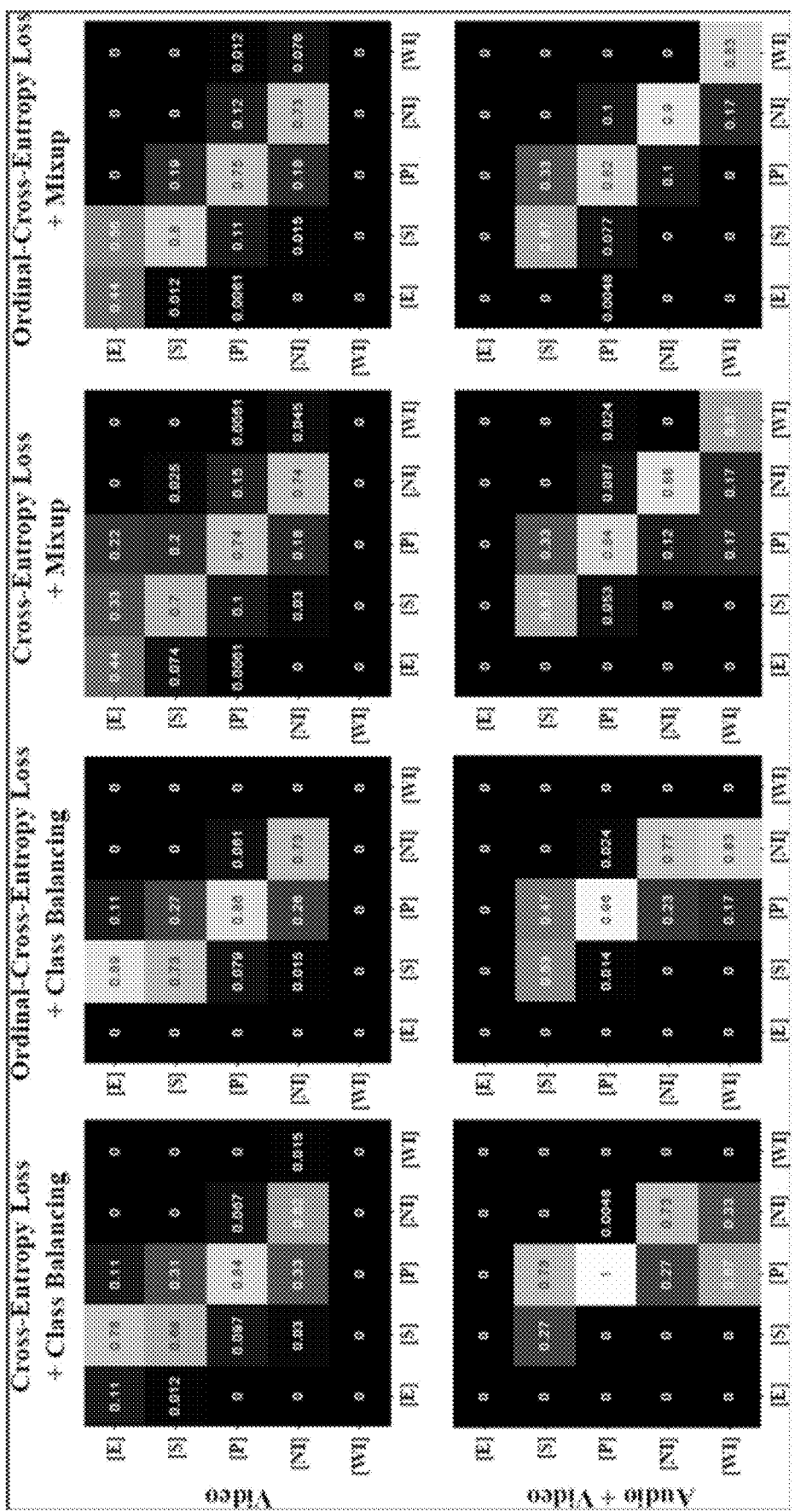
FIG. 12 depicts eight confusion matrices for a histogram-based collaboration assessment model under different input conditions.

FIG. 12 depicts eight example confusion matrices, based on histogram-representation inputs, for collaboration assessment system 100 of FIG. 1A under different conditions, wherein the number in each cell represents a percentage of samples classified to the corresponding Level A classification code. As described above, the combination crossentropy-loss-and-mixup-augmentation technique, and the combination ordinal-cross-entropy-loss-and-mixup-augmentation technique, result in higher-weighted precisions when using the Level B2 histogram input for the video-only input-data setting and the Level B2+C histogram input for the audio-video input-data setting. This higher-weighted precision is illustrated by the confusion matrices shown in FIG. 12. Specifically, FIG. 12 shows confusion matrices for the video-only setting using the Level B2 histogram features (top row of matrices), and for the audio-video setting using the Level B2+C histogram (bottom row of matrices), as these showed the best weighted precision values. As described above, the ordinal-cross-entropy-loss technique may influence significant improvements in terms of weighted F1-scores. However, even with class-balancing, the better MLP models may still be biased toward the class with the most training data samples. The controlled mixup-augmentation variants with either cross-entropy loss or ordinal-cross-entropy loss may result in a better diagonal structure in the corresponding confusion matrix, e.g., indicating more number of "true" positives (e.g., "correct" classifications by collaboration assessment system 100). In the example confusion matrices shown in FIG. 12, there are no test samples for the "Effective" Level A class in the audio-video input-data setting (the top row in each of the bottom four matrices), nor for the "Working Independently" class in the video-only data-input setting (the bottom row in each of the top four matrices). Between cross-entropy loss+mixup-augmentation (third column of matrices), and ordinal-cross-entropy loss+mixup-augmentation (right-most column of matrices), the ordinal-cross-entropy loss may help reduce a spread of test-sample prediction, e.g., only to the nearest neighboring classes.

Figure 13:
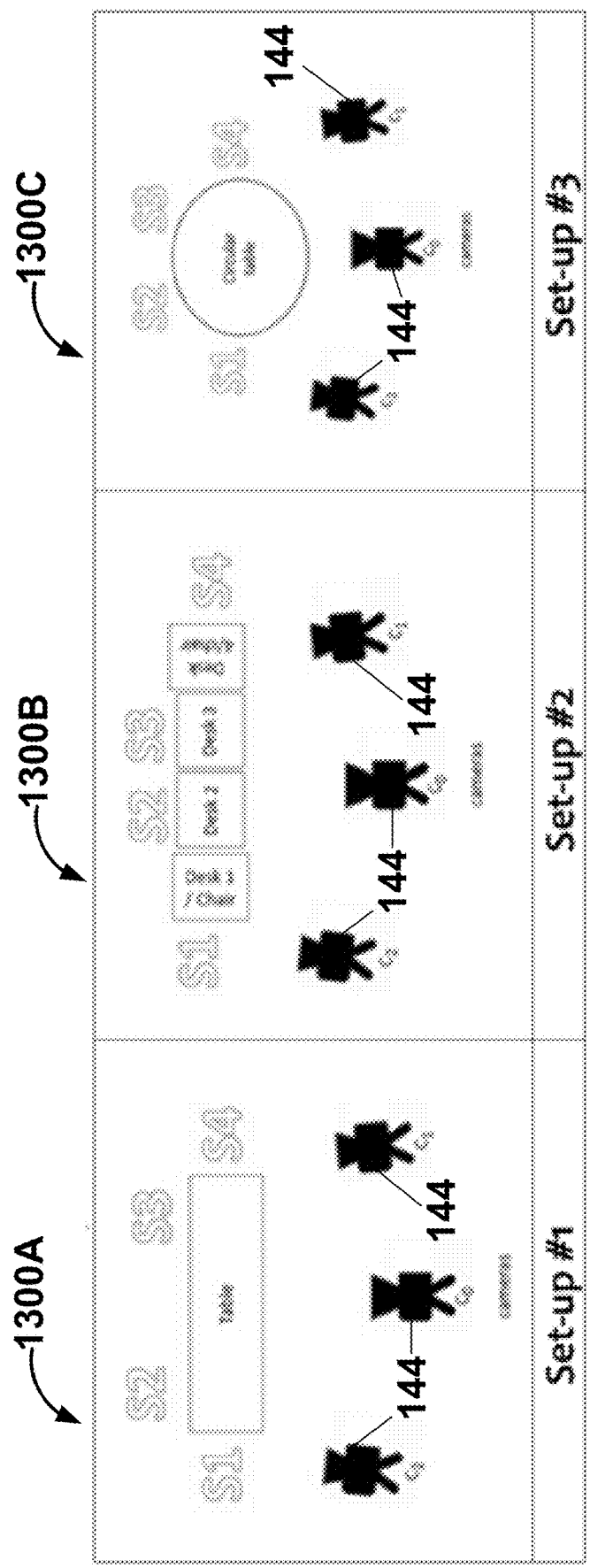
FIG. 13 is a conceptual diagram illustrating three example arrangements of input devices, such as video cameras or other image-capture devices, configured to capture input data for the collaboration assessment system of FIG. 1A.

FIG. 13 is a conceptual diagram illustrating three example arrangements of input devices 144 of FIG. 1A, such as video cameras or other image-capture devices, to capture video-based input data 102 for collaboration assessment system 100. In a first example arrangement 1300A, four individuals S1-S4 are seated at a common rectangular table opposite three input devices 144 ($C_0$-$C_2$). In a second example arrangement 1300B, four individuals S1-S4 are seated at a linear arrangement of four desks, opposite three input devices 144 ($C_0$-$C_2$). In a third example arrangement 1300C, four individuals S1-S4 are seated on a common side of a circular table opposite three input devices 144 ($C_0$-$C_2$).

In one illustrative example of arrangements 1300A-1300C, input devices 144 include Microsoft Kinect cameras, arranged in a generally triangular configuration relative to the group of four individuals S1-S4. In some such examples, collaboration assessment system 100 (e.g., via processing circuitry associated with input devices 144) combines, synchronizes, and calibrates images captured by input devices 144 to generate three-dimensional (3-D) video input data 102 for subsequent behavioral analytics. In some examples, collaboration assessment system 100 is further configured to perform facial recognition and voice recognition on input data 102, e.g., at any of the various levels of machine learning system 130.

Figure 14:
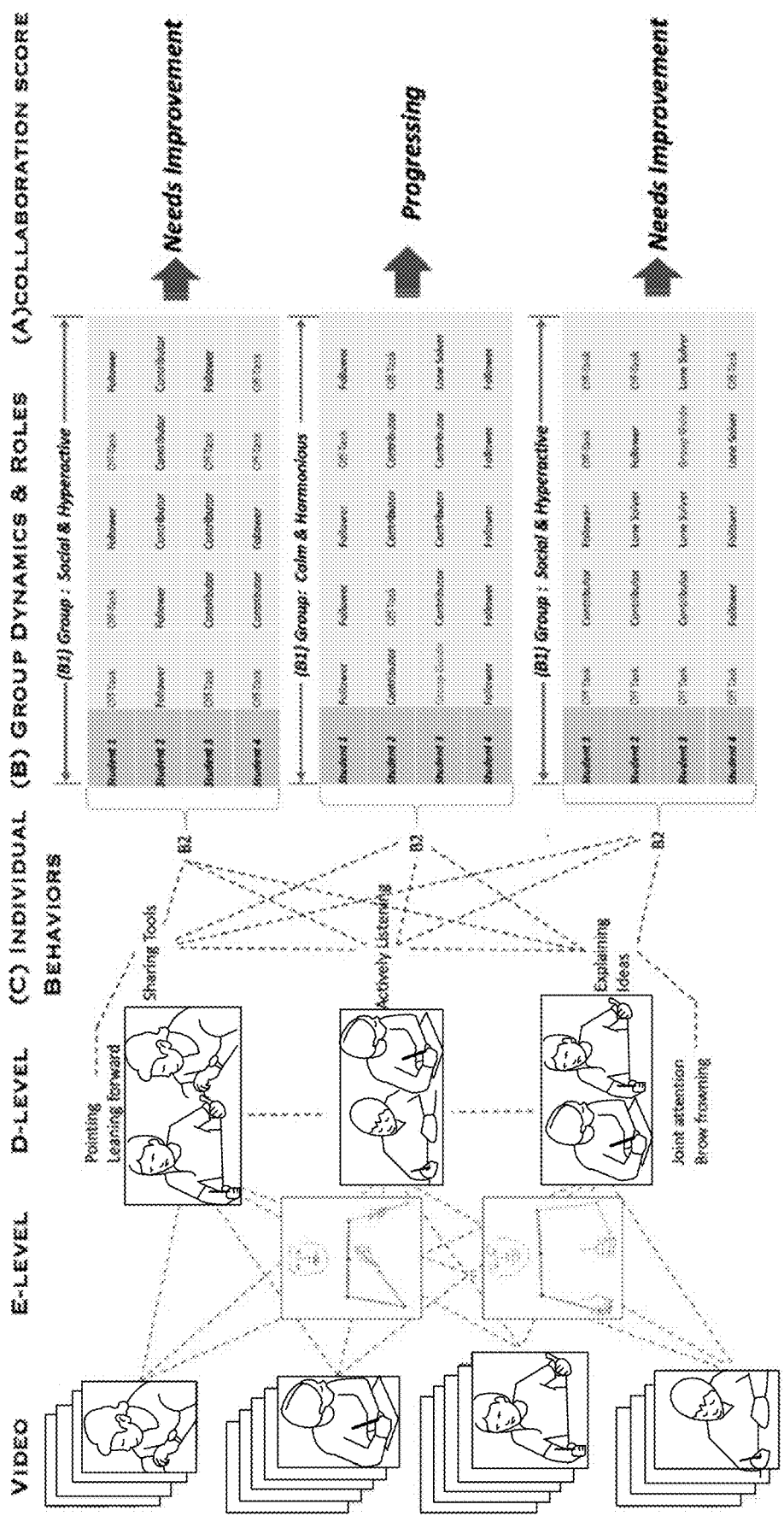
FIG. 14 is a conceptual diagram illustrating an example annotation process, using a conceptual model and behavior codes, that may be performed by the collaboration assessment system of FIG. 1A.

FIG. 14 is a conceptual diagram illustrating an example annotation process, using a conceptual model and behavior codes, that may be performed by machine learning system 130 of collaboration assessment system 100 of FIG. 1A. For instance, system 130 may extract low-level tracking of human head-pose, eye gaze, facial expressions, body-pose and gestures in Level E (e.g., Level E module 104 of FIG. 1A). Level D module 106 of system 130 may use the low-level features from Level E to generate Level D descriptors like joint attention and engagement. Level C module 108 of system 130 may use the Level D descriptors to describe more-complex interactions, such as "sharing tools" or "explaining ideas," in Level C. System 130 may use the complex behaviors from Level C to determine the individual roles of each individual, such as "follower" or "group guide" in Level B2 (module 110B), and group dynamics like "social and hyperactive" in Level B1 (module 110A). All levels intricately come together as an overall collaboration code, such as "Effective" or "Progressing," in Level A (module 112).

Figure 15A:
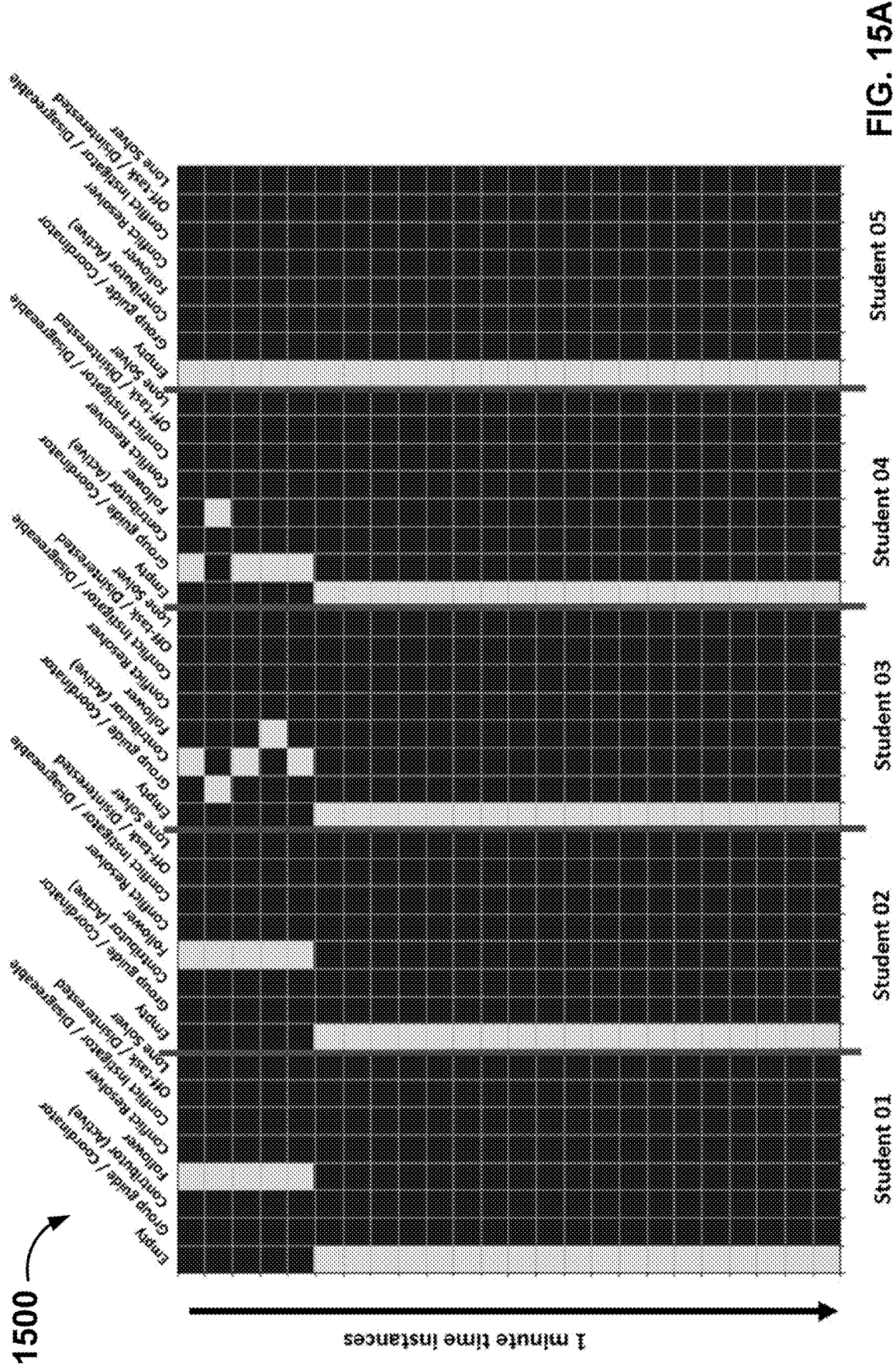
FIGS. 15A-15D are example spatio-temporal representations that may be used as input for one or more machine learning models of the collaboration assessment system of FIG. 1A.

FIG. 15A is an example Level B2 "spatio-temporal" feature representation 1500 of "individual role" features (e.g., annotations), as generated and output by Level B2 module 110B of machine learning system 130 of FIG. 1A. In general, a spatio-temporal feature representation (like that shown in FIG. 15A) differs from a temporal representation (like those shown in FIGS. 3A, 4A, 8 and 9A-9E), in that the left-to-right order of the individuals (Students 01-05) has value. For instance, the left-to-right order of Students 01-05 may reflect of a real-world position of the individuals within the original video input data 102. Preserving the spatial order in this way helps capture the Level B2 individual roles exhibited by each individual in a group when performing a designated collaboration task, e.g., by providing insight into how many individuals were present in the group and how much time it took for the group to finish the collaboration task.

The example spatio-temporal representation 1500 shown in FIG. 15A represents a group of four students 01-05 that finished a collaboration task in 5 minutes. Accordingly, "Student 05" is indicated to be absent in representation 1500. In this example, the longest-recorded collaboration task recorded lasted for 24 minutes and the maximum number of students in a group was 5. Accordingly, the maximum task duration is set to 24 minutes and the number of students in a group is set to 5, e.g., to facilitate comparison of different input-data samples. Similar graphical representations can be obtained for the "individual behavior" outputs of Level C module 108.

Figure 15B:
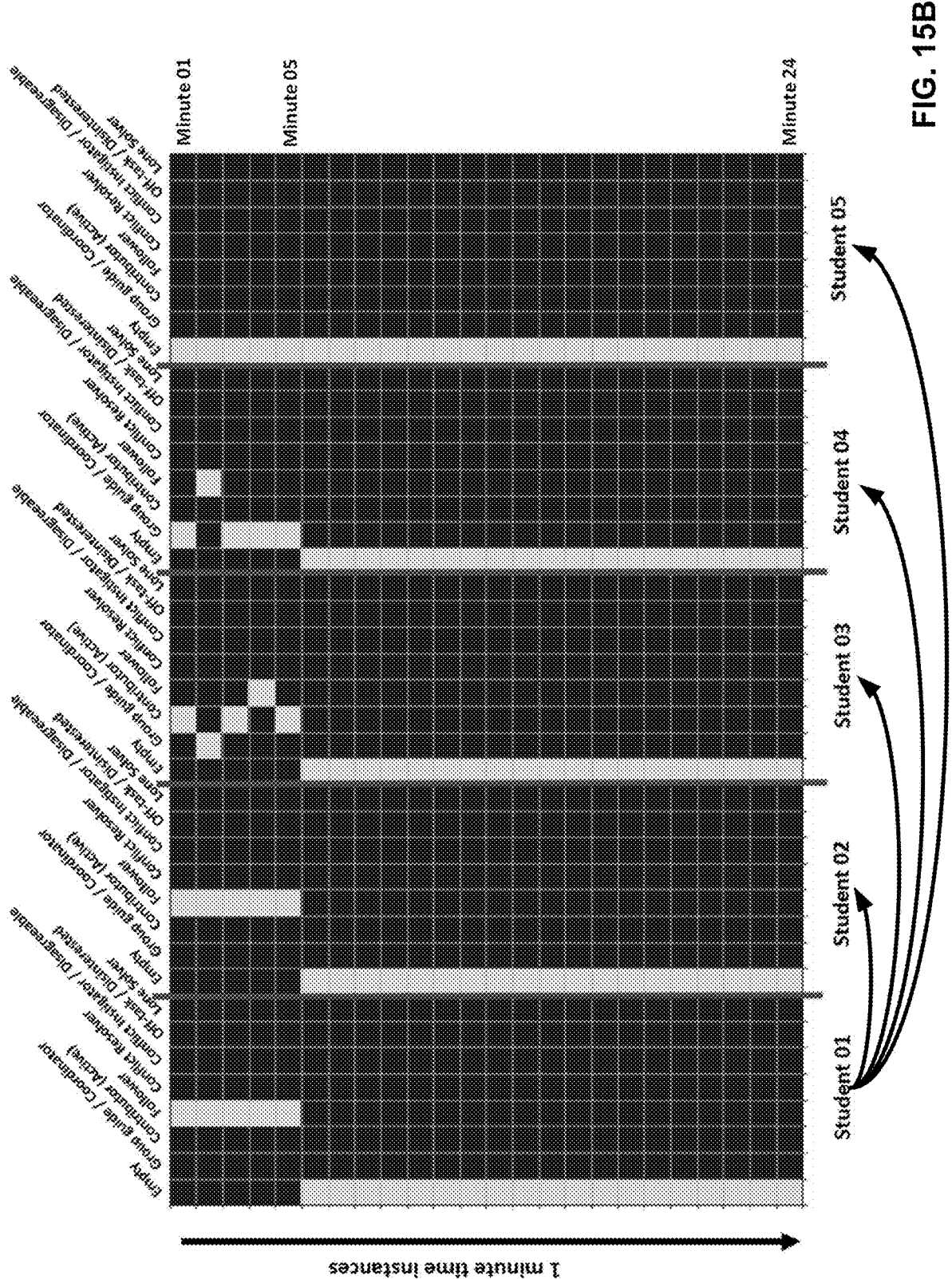

FIG. 15B is a conceptual diagram illustrating a technique for increasing a number of training data samples by permuting (e.g., rearranging) the spatial order of the individuals in the data. For instance, by simply permuting the individuals in a group, collaboration assessment system 100 can increase the number of data samples, e.g., for training data. For the example dataset represented in FIG. 15B, the maximum number of students is five. Accordingly, there are five-factorial (e.g., 5!), or 120 possible variations of each data sample in the dataset, or in other words, enabling the expansion of an initial dataset by 120 times.

Figure 15C:
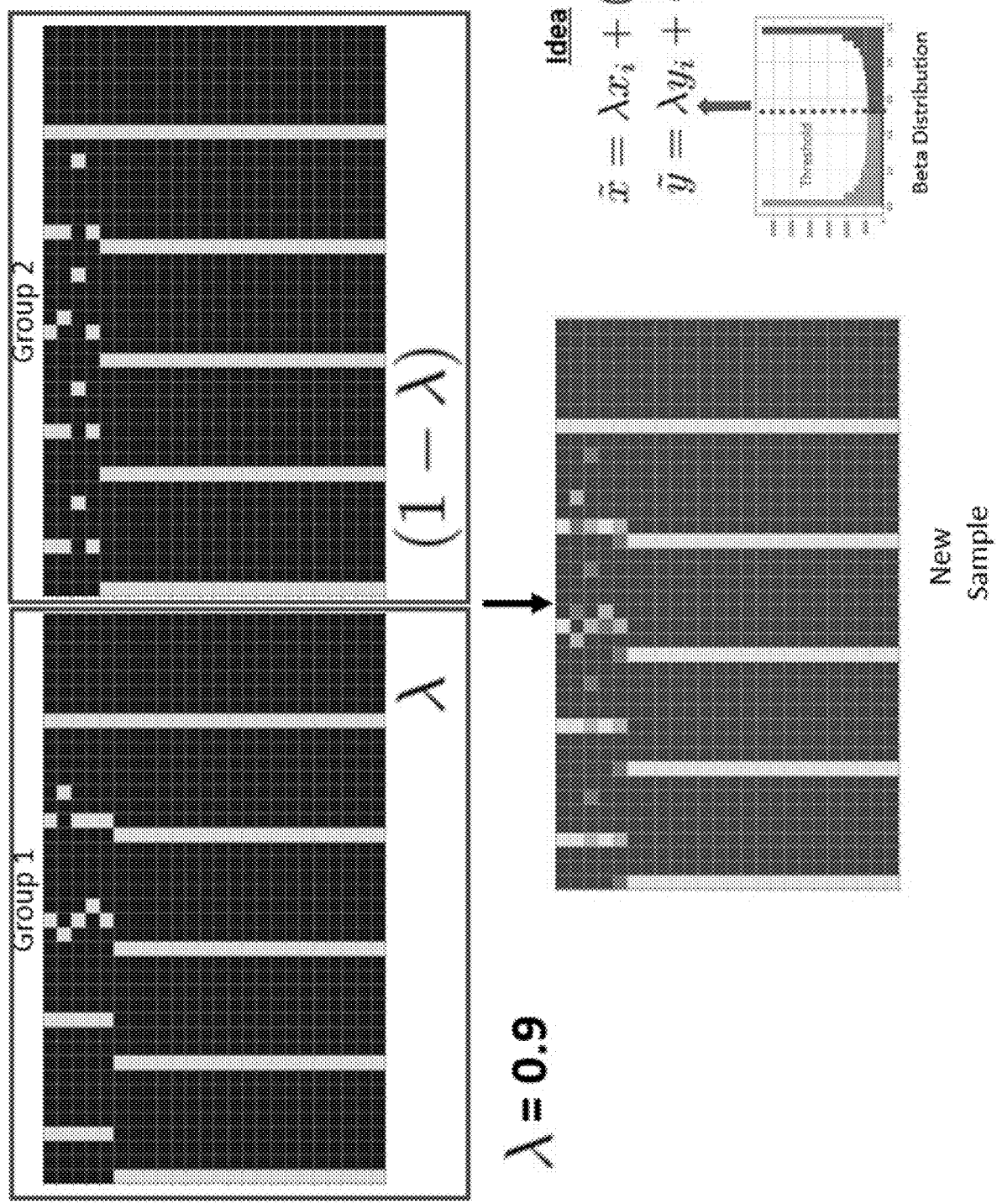

FIG. 15C illustrates a controlled variant of the mixup-augmentation techniques described above with respect to equations (1) and (2) to generate additional training data for machine learning system 130. For instance, a controlled variant of mixup data augmentation in which a threshold value of λ is selected can help further increase the number of data samples, e.g., in addition to or instead of the permutation technique illustrated in FIG. 15B. The described controlled variant of mixup data augmentation can help balance a dataset and avoid bias in the machine-learning-based classification models of system 130.

Figure 15D:
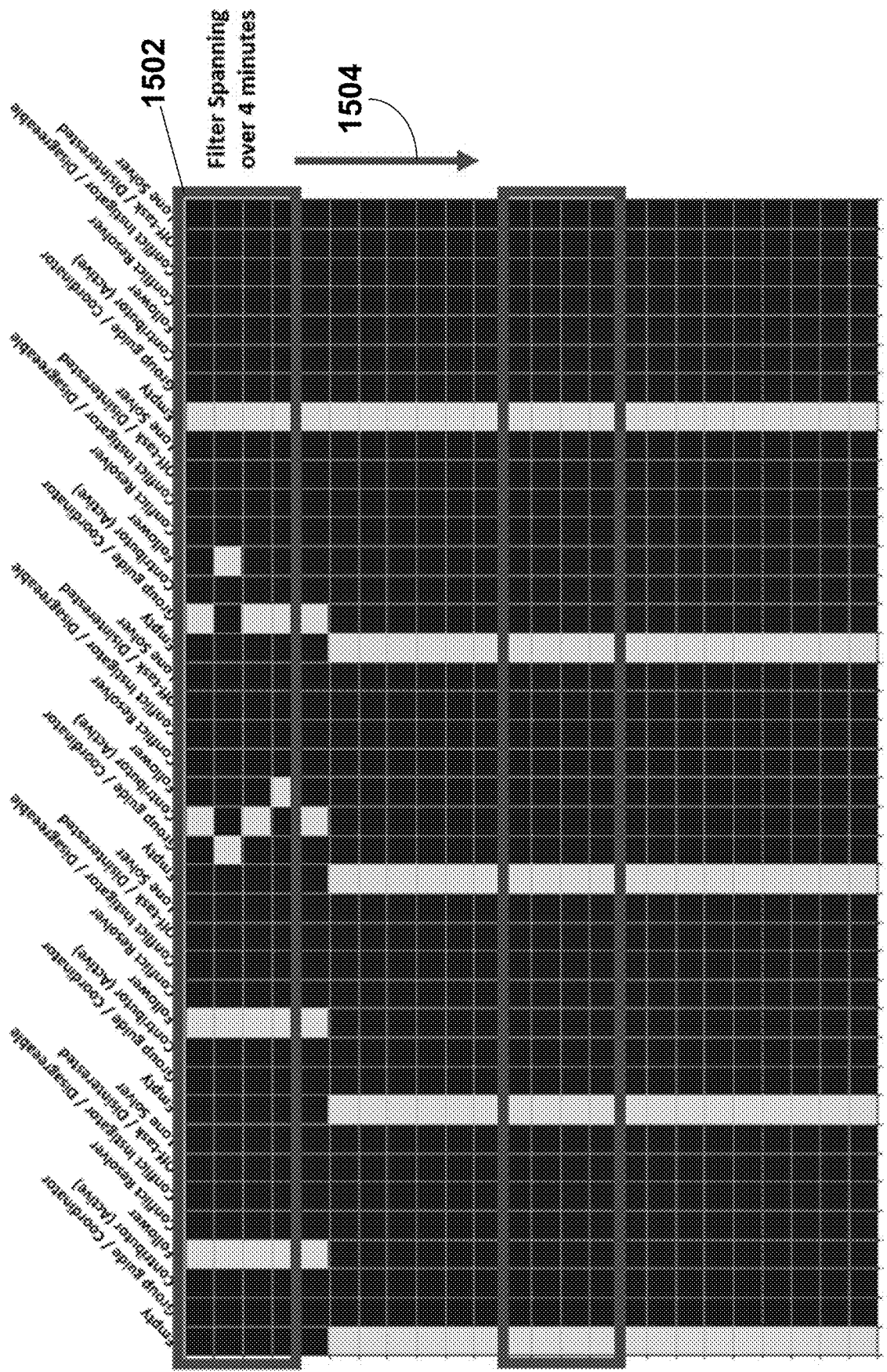

FIG. 15D illustrates another example Level B2 spatio-temporal representation, which may be passed as input into Level A module 112 of FIG. 1A. In some such examples, Level A module 112 includes a deep-learning-based architecture having an input layer, a 2-D convolution layer, a batch-normalization layer, a rectified-linear-unit (ReLU) activation layer, a global-average-pooling layer, and a dense output layer. The 2-D convolution layer may include two parameter settings: (1) a number of convolution filters (n), and (2) a filter width along the temporal dimension (illustrated via filter 1502 in FIG. 15D). For the example depicted in FIG. 15D, one 2-D convolution filter 1502 has a temporal filter width (e.g., "spans") over 4 minutes of the collaboration task. The filter 1502 extends across all individuals of the group and translates along the temporal dimension (e.g., downward, as indicated by arrow 1504). Non-limiting example numbers of filters n may include 1, 6, 24, 96, and 384. Non-limiting examples of temporal widths include 1, 2, and 4.

Figure 16A:
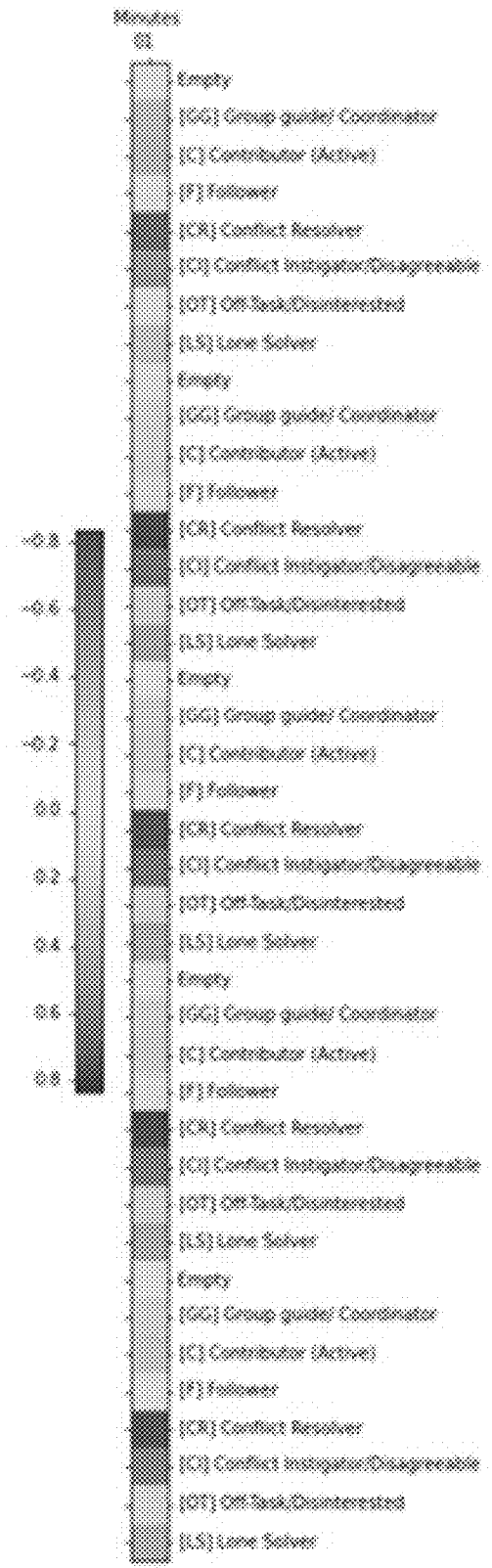
FIGS. 16A-16C are example graphical visualizations generated by the application of an example filter of the kind shown in FIG. 15D to an example spatio-temporal-based deep-learning model of the collaboration assessment system of FIG. 1A.
Figure 16B:
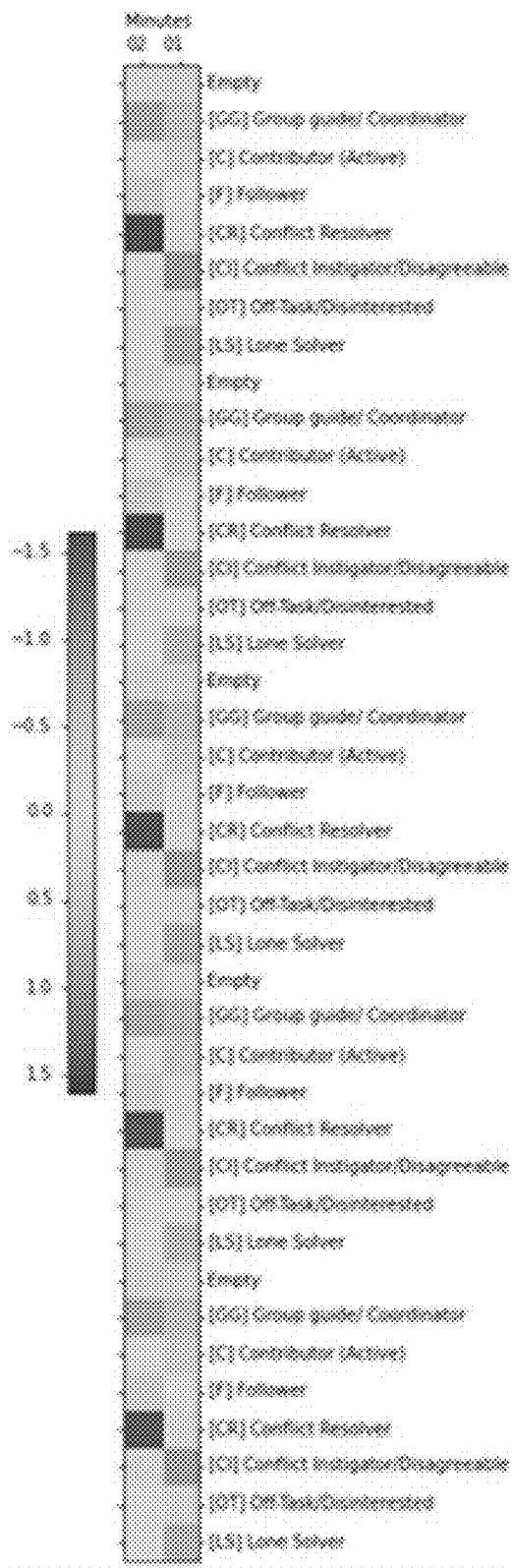
Figure 16C:
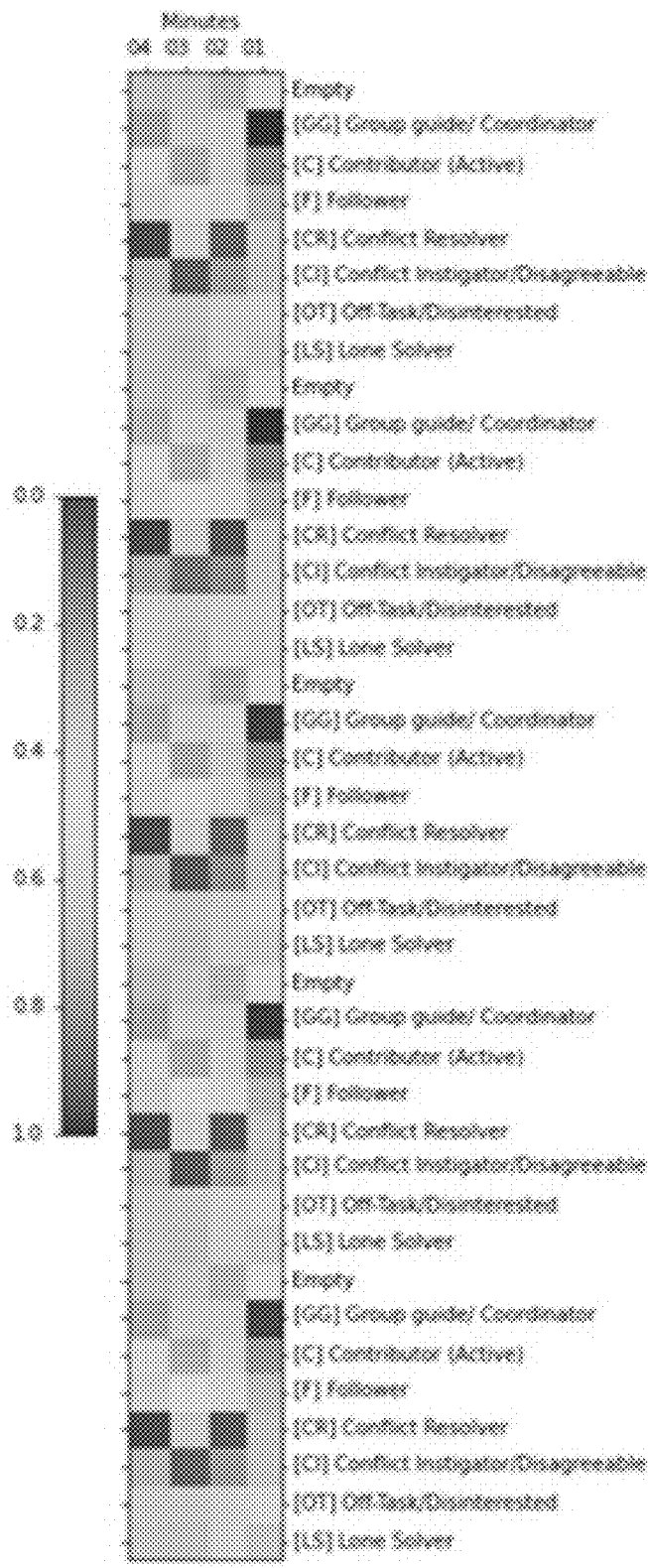

FIGS. 16A-16C are example graphical visualizations generated in association with convolution filter 1502 of FIG. 15D for three different temporal filter widths of 1, 2, and 4, respectively. For instance, as shown in FIGS. 16A-16C, convolution filter 1502 may be "trained" to identify relevant patterns across the individuals of a group (e.g., spatial) and across time (e.g., temporal) that may be used to help differentiate and identify different Level A class labels determined by Level A module 112 of system 100 of FIG. 1A. FIGS. 16A-16C illustrate outputs from three examples of n=1 learnt filter having a temporal filter width of 1, 2, and 4, respectively. The different relative shadings indicate different patterns that the respective trained deep-learning model identifies within the input spatio-temporal graphical representations (e.g., FIG. 15D).

Figure 17:
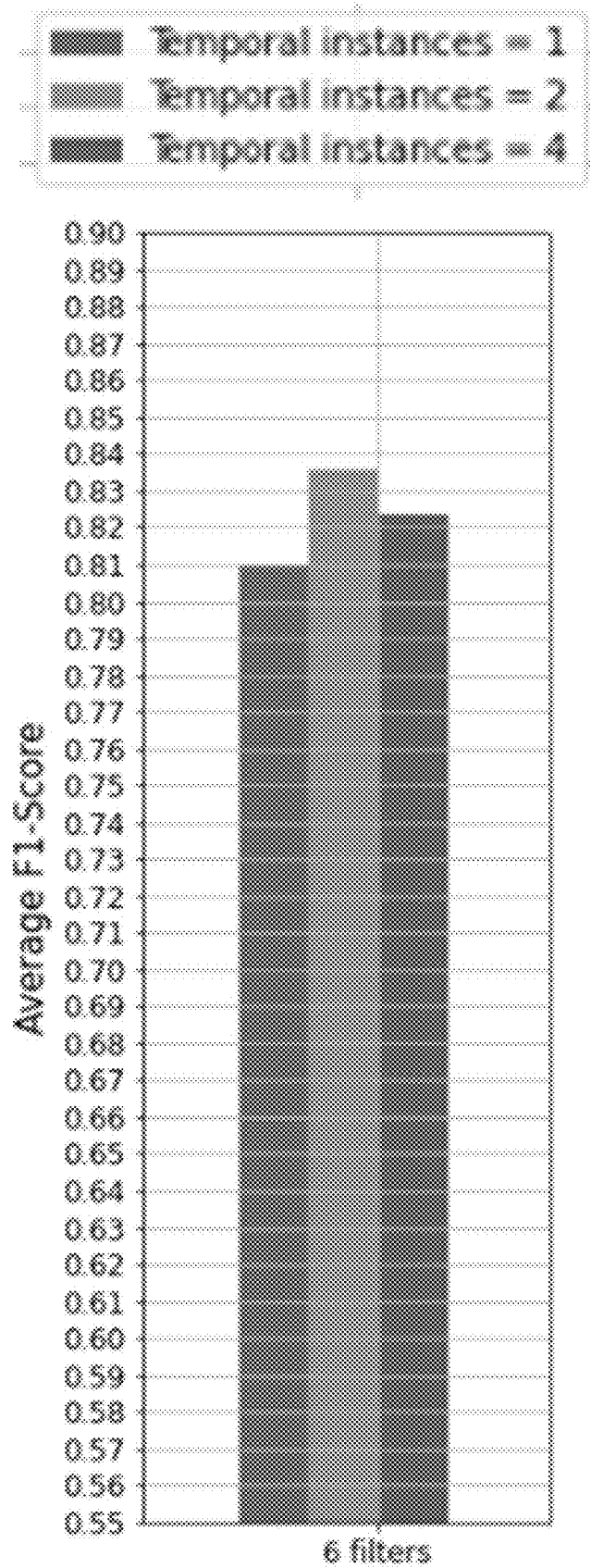
FIG. 17 is a bar graph illustrating an example quantitative analysis of outputs from a spatio-temporal-based machine learning model of the Level-A classification module of the collaboration assessment system of FIG. 1A.
Figure 18A:
FIGS. 18A-18C are confusion matrices illustrating example qualitative analyses of outputs of the spatio-temporal-based machine learning model of the Level-A classification module of FIG. 1A, corresponding to the quantitative analysis shown in FIG. 17.
Figure 18B:
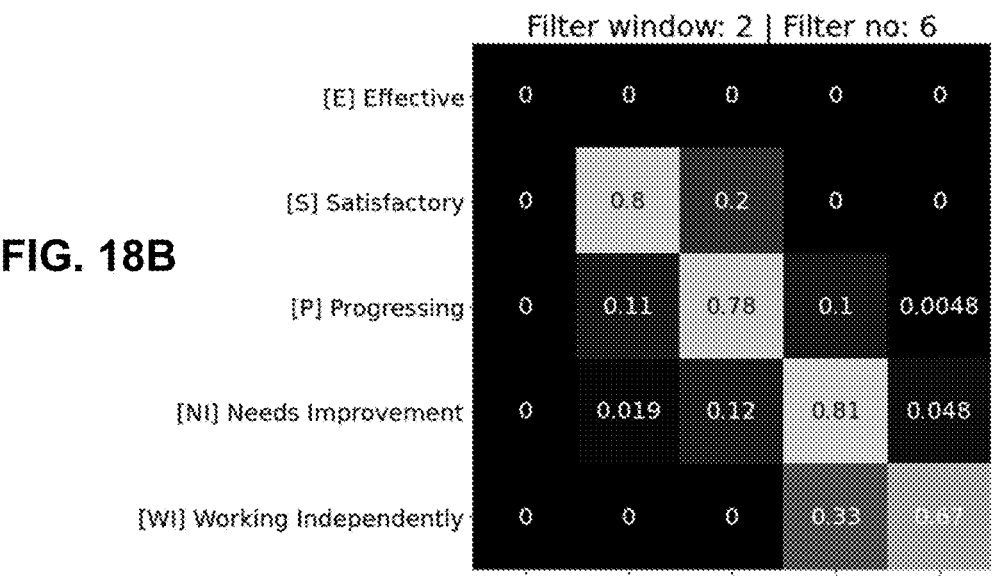
Figure 18C:
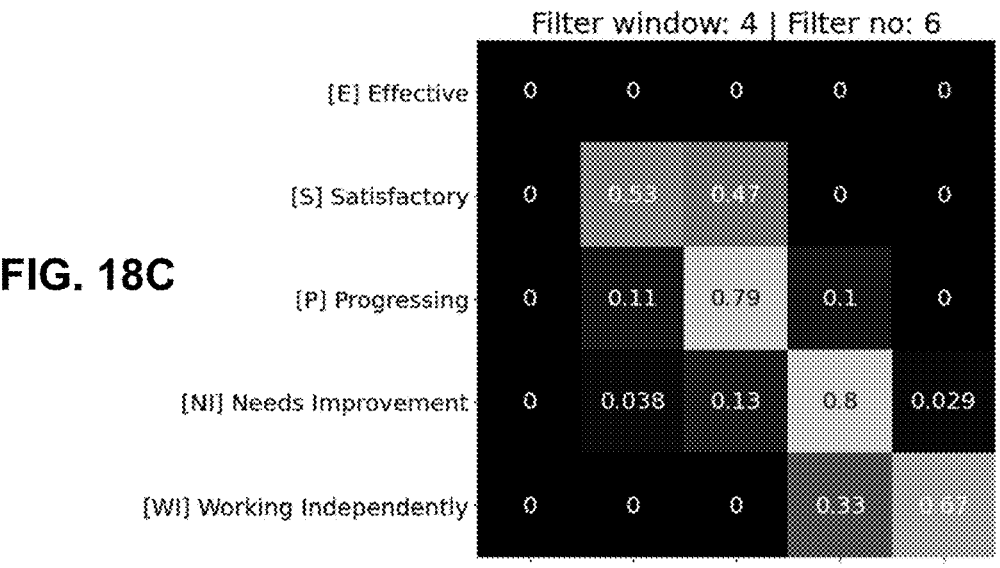

FIG. 17 is a bar graph illustrating an example quantitative analysis, and FIGS. 18A-18C are confusion matrices illustrating corresponding example qualitative analyses, of outputs of an example of Level-A classification module 112 configured to receive and process spatio-temporal representations, such as those shown in FIGS. 15A-15D. For instance, the example Level-A module 112 may be trained using any or all of the data-permutation (FIG. 15B), mixup-augmentation (FIG. 15C), and ordinal-cross-entropy loss techniques, as described herein. More specifically, FIGS. 17 and 18A-18C graphically represent the results of an applied 2-D convolution filter 1502 (FIG. 15D) having n=6 filters for different temporal filter widths of 1, 2, and 4 minutes.

Figure 19:
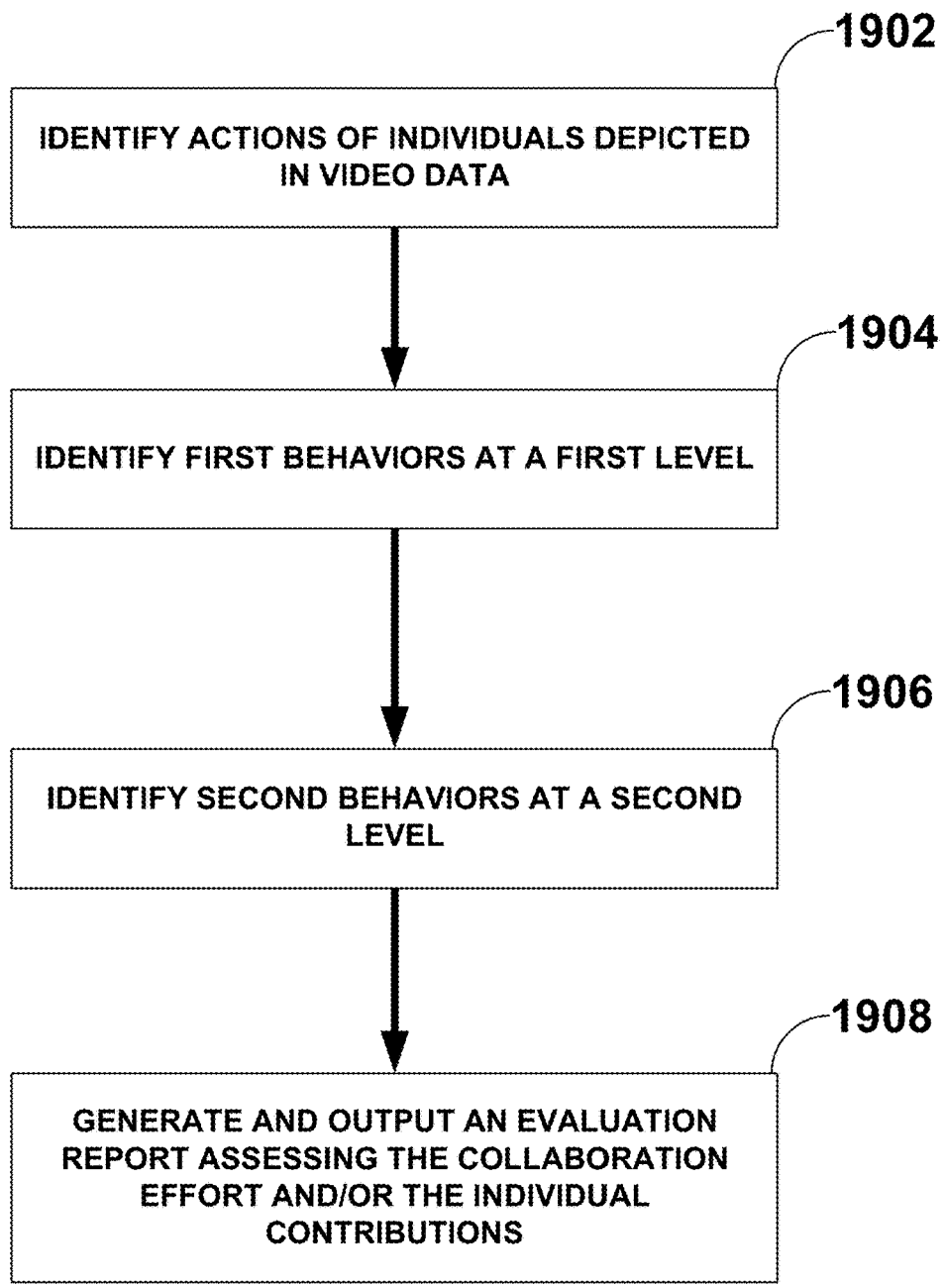
FIG. 19 is a flow diagram illustrating an example computer-implemented technique for evaluating a collaboration effort of two or more individuals.

FIG. 19 is a flow diagram illustrating an example computer-implemented technique for evaluating a collaboration effort of two or more individuals. The technique of FIG. 19 is described with respect to collaboration assessment system 100 of FIG. 1A, but in other examples, may be performed by any suitable computing system. The technique includes identifying, by processing circuitry of a computing system, actions of each of two or more individuals depicted in video data (1902). For instance, the computing system may receive input data 102 that includes video-only data, audio-video data, or a combination thereof, that depicts two or more individuals engaged in a collaborative effort to perform a designated task. The computing system may include a module configured to perform low-level analytics on the received input data 102, such as basic movement tracking and/or facial recognition for the two or more individuals.

The technique further includes identifying, by a first machine-learning model of the computing system, and based at least on the identified actions of each of the two or more individuals depicted in the video data, first behaviors at a first collaboration assessment level (1904). For instance, the computing system may include at least one machine learning model trained to identify (e.g., categorize), based on the low-level actions, one or more types of bodily movements or gestures performed by each of the two or more individuals, and in some examples, a set of individual behaviors associated with the identified actions, gestures, and/or bodily movements. Such bodily movements, gestures, and behaviors may be interrelated via a predetermined taxonomic structure of classification codes.

The technique of FIG. 19 further includes identifying, by a second machine-learning model of the computing system and based at least on the identified actions of each of the two or more individuals depicted in the video data, second behaviors at a second collaboration assessment level different from the first collaboration assessment level (1906). For instance, the computing system may include at least one machine learning model trained to identify (e.g., categorize), higher-level individual "roles" for each of the two or more individuals with respect to the collaborative effort. In some examples, the computing system further includes a machine learning model trained to identify an overall interrelational "dynamic" among the two or more individuals, based on the identified behaviors. Such roles and dynamics may further be included within a common taxonomic structure, e.g., interrelated with the lower-level behaviors, bodily movements, etc.

The technique of FIG. 19 further includes generating and outputting, by the computing system based at least on the first behaviors at the first collaboration assessment level and the second behaviors at the second collaboration assessment level, an indication of at least one of (1) an assessment of a collaboration effort of the two or more individuals and (2) respective assessments of individual contributions of the two or more individuals to the collaboration effort (1908). For example, the computing system may include a third machine learning model trained to categorize or classify the collaborative effort by selecting among an ordinal plurality of labels, e.g., ranging from an "effective" collaboration, to a "working independently" (e.g., zero collaboration). Additionally or alternatively, the third machine learning model may evaluate each individual's contribution to the collaborative effort, and in some examples, output a recommendation for the individual to improve his or her contribution to a subsequent collaborative effort.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A collaboration assessment system to evaluate a collaboration effort of two or more individuals, the collaboration assessment system comprising:
an output device;
an image capture device configured to obtain video data;
a computation engine comprising processing circuitry configured to execute a machine learning system comprising a hierarchical collaboration assessment model having a plurality of machine learning models organized according to a hierarchy, the hierarchy defining a plurality of collaboration assessment levels, wherein each of the plurality of machine learning models comprises one or more neural networks, wherein the processing circuitry executes the machine learning system to:
identify a subset of sample video data included in training data, the subset of sample video data being labeled with an underrepresented classification code of a plurality of classification codes associated with assessing collaboration effort,
generate mixup training data to at least include the training data and pseudo-data created based on the subset of sample video data,
train the one or more neural network of each of the plurality of machine learning models using the mixup training data,
receive temporal data comprising the video data,
apply a first model of the plurality of machine learning models of the hierarchical collaboration assessment model to identify, using the neural network of the first model, at a first collaboration assessment level of the plurality of collaboration assessment levels and based at least on low-level feature tracking of actions of each of the two or more individuals depicted in the video data, first behaviors comprising at least one of bodily movements or facial expressions, and
apply, to the outputs of the first model, a second model of the plurality of machine learning models of the hierarchical collaboration assessment model to identify, using the neural network of the second model and based at least on outputs of the first model and the actions of each of the two or more individuals depicted in the video data, second behaviors at a second collaboration assessment level of the plurality of collaboration assessment levels,
generate, based at least on the first behaviors at the first collaboration assessment level and the second behaviors at the second collaboration assessment level, an indication of at least one of: an assessment of a collaboration effort of the two or more individuals or respective assessments of individual contributions of the two or more individuals to the collaboration effort, wherein the assessment or the respective assessments include a classification code of the plurality of classification codes, and
output the indication via the output device.

2. The collaboration assessment system of claim 1, wherein the first model of the hierarchical collaboration assessment model is trained based on manually annotated training data to identify individual behaviors that are the first behaviors at the first collaboration assessment level,
wherein the second model of the hierarchical collaboration assessment model is trained to identify, based at least in part on the first behaviors output by the first model, individual roles of the two or more individuals within the collaboration effort, and
wherein the processing circuitry further executes the machine learning system to:
receive outputs from the second model, and
apply a third model of the hierarchical collaboration assessment model to determine, based at least in part on the identified individual behaviors and the identified individual roles, the assessment of the collaboration effort of the two or more individuals.

3. The collaboration assessment system of claim 2, wherein the processing circuitry executes the machine learning system to generate the respective assessments of the respective individual contributions of the two or more individuals to the collaboration effort based at least in part on the individual behaviors and the individual roles.

4. The collaboration assessment system of claim 2, wherein the third model of the hierarchical collaboration assessment model is trained to map temporal representations of identified individual behaviors to the assessment of the collaboration effort of the two or more individuals.

5. The collaboration assessment system of claim 2, wherein the third model of the hierarchical collaboration assessment model is trained to map a combination of temporal representations of identified individual roles and temporal representations of identified individual behaviors to the assessment of the collaboration effort of the two or more individuals.

6. The collaboration assessment system of claim 2, wherein the processing circuitry executes the machine learning system to:
determine relative durations for the individual behaviors and the individual roles of the two or more individuals, and
output an indication of the relative durations for the individual behaviors and the individual roles of the two or more individuals as a first justification for the respective assessments of the individual contributions of the two or more individuals.

7. The collaboration assessment system of claim 6, wherein the processing circuitry further executes the machine learning system to:
amalgamate the relative durations of the individual behaviors and the individual roles across the two or more individuals, and
output an indication of the amalgamated relative durations as a second justification for the assessment of the collaboration effort.

8. The collaboration assessment system of claim 1,
wherein the first model of the hierarchical collaboration assessment model comprises a spatio-temporal convolutional neural network, and
wherein the second model of the hierarchical collaboration assessment model comprises a spatio-temporal convolutional neural network.

9. The collaboration assessment system of claim 1, wherein the processing circuitry further executes the machine learning system to determine, based at least on the indication of the assessment of the collaboration effort of the two or more individuals, a customized recommendation for each of the two or more individuals, wherein the customized recommendation indicates a strategy to improve the collaboration effort.

10. The collaboration assessment system of claim 1, wherein the processing circuitry further executes the machine learning system to generate and output, based on outputs of the first model of the hierarchical collaboration assessment model, a justification to include indications of the first behaviors at the first collaboration assessment level.

11. The collaboration assessment system of claim 1, wherein the processing circuitry further executes the machine learning system to expose, for each machine learning model of the plurality of machine learning models, outputs that deliver justifications for decisions.

12. The collaboration assessment system of claim 1,
wherein the processing circuitry further executes the machine learning system to apply relative-correctness training for at least one machine learning model of the plurality of machine learning models, and
wherein the relative-correctness training comprises, for misclassified samples, an indication of how far away a respective sample has been misclassified from a respective ground-truth label for the respective sample.

13. The collaboration assessment system of claim 1, wherein the processing circuitry further executes the machine learning system to train the machine learning system to determine and reduce a magnitude of error between outputs of the machine learning system and true outputs for a set of sample data of the training data.

14. The collaboration assessment system of claim 13, wherein, to reduce the magnitude of error between the outputs of the machine learning system and the true outputs for the training data, the processing circuitry executes the machine learning system to optimize an ordinal cross-entropy-loss function.

15. The collaboration assessment system of claim 1,
wherein to generate the indication of the at least one of: the assessment of the collaboration effort of the two or more individuals or the respective assessments of individual contributions of the two or more individuals to the collaboration effort, the processing circuitry executes the machine learning system to:
select the assessment or the respective assessments from among the plurality of classification codes.

16. The collaboration assessment system of claim 1, wherein the processing circuitry further executes the machine learning system to generate the pseudo-data by combining:
first data randomly selected from the subset of sample video data, wherein the first data is associated with the underrepresented classification code; and
second data randomly selected from the training data, wherein the second data is associated with an adjacent classification code of the plurality of classification codes that is directly adjacent to the underrepresented classification code according to an ordering of the plurality of classification codes.

17. The collaboration assessment system of claim 1, wherein the classification code included in the assessment of the collaboration effort comprises one of:
an effective collaboration;
a satisfactory collaboration;
a progressing collaboration;
a collaboration that needs improvement; or
a collaboration in which the two or more individuals are primarily working independently from each other.

18. The collaboration assessment system of claim 1, wherein the processing circuitry executes the machine learning system to identify the second behaviors based on a predetermined set of taxonomic classification codes.

19. A method of evaluating a collaboration effort of a group of two or more individuals depicted in video data, the method comprising:
identifying, by a machine learning system, a subset of sample video data included in training data, the subset of sample video data being labeled with an underrepresented classification code of a plurality of classification codes associated with assessing collaboration effort, the machine learning system comprising a hierarchical collaboration assessment model having a plurality of machine learning models organized according to a hierarchy, the hierarchy defining a plurality of collaboration assessment levels, wherein each of the plurality of machine learning models comprises one or more neural networks;
generating, by the machine learning system, mixup training data to at least include the training data and pseudo-data created based on the subset of training samples;
training, by the machine learning system, the one or more neural network of each of the plurality of machine learning models using the mixup training data;
receiving, by the machine learning system, temporal data comprising video data;
identifying, by the machine learning system, low-level feature tracking of actions of each of two or more individuals depicted in the video data;
identifying, by the one or more neural networks of a first model of the plurality of machine learning models, at a first collaboration assessment level of the plurality of collaboration assessment levels and based at least on the low-level feature tracking of actions of each of the two or more individuals depicted in the video data, first behaviors comprising at least one of bodily movements or facial expressions;
receiving, by a second model of the plurality of machine learning models, an output of the first model;
identifying, by the one or more neural networks of the second model and based at least on the output from the first model and the low-level feature tracking of actions of each of the two or more individuals depicted in the video data, second behaviors at a second collaboration assessment level of the plurality of collaboration assessment levels;
generating, by the machine learning system, based at least on the first behaviors at the first collaboration assessment level and the second behaviors at the second collaboration assessment level, an indication of at least one of an assessment of a collaboration effort of the two or more individuals or respective assessments of individual contributions of the two or more individuals to the collaboration effort, wherein the assessment or the respective assessments include a classification code of the plurality of classification codes; and outputting, by the machine learning system, the indication via an output device.

20. Non-transitory, computer-readable media comprising instructions for causing one or more programmable processors to:

identify a subset of sample video data included in training data, the subset of sample video data being labeled with an underrepresented classification code of a plurality of classification codes associated with assessing collaboration effort;

generate mixup training data to at least include the training data and pseudo-data created based on the subset of sample video data;

train, using the mixup training data, one or more neural networks included in each of a plurality of machine learning models of a hierarchical collaboration assessment model;

receive temporal data comprising video data;

identify low-level feature tracking of actions of each of two or more individuals depicted in the video data;

execute a first model of the plurality of machine learning models to identify, using the one or more neural networks of the first model and based at least on the low-level feature tracking of actions of each of the two or more individuals depicted in the video data, first behaviors comprising at least one of bodily movements or facial expressions at a first collaboration assessment level of the hierarchical collaboration assessment model;

execute a second model of the plurality of machine learning models to;

identify, using the one or more neural networks of the second model and based at least on a received output of the first model and the low-level feature tracking of actions of each of the two or more individuals depicted in the video data, second behaviors at a second collaboration assessment level of the hierarchical collaboration assessment model;

generate, based at least on the first behaviors at the first collaboration assessment level and the second behaviors at the second collaboration assessment level, an indication of at least one of an assessment of a collaboration effort of the two or more individuals or respective assessments of individual contributions of the two or more individuals to the collaboration effort, wherein the assessment or the respective assessments include a classification code of the plurality of classification codes; and output the indication via an output device.

* * * * *